(12) United States Patent
Ikeda et al.

(10) Patent No.: US 7,639,923 B2
(45) Date of Patent: Dec. 29, 2009

(54) REPRODUCTION DEVICE, OPTICAL DISC, RECORDING MEDIUM, PROGRAM, AND REPRODUCTION METHOD

(75) Inventors: Wataru Ikeda, Osaka (JP); Hiroshi Hamasaka, Hirakata (JP); Kazuhiko Nakamura, Hirakata (JP); Tomoyuki Okada, Nara (JP); Masayuki Kozuka, Neyagawa (JP)

(73) Assignee: Panasonic Corporation, Osaka (JP)

( * ) Notice: Subject to any disclaimer, the term of this patent is extended or adjusted under 35 U.S.C. 154(b) by 498 days.

(21) Appl. No.: 10/528,969

(22) PCT Filed: Sep. 24, 2003

(86) PCT No.: PCT/JP03/12127

§ 371 (c)(1),
(2), (4) Date: Oct. 3, 2005

(87) PCT Pub. No.: WO2004/030356

PCT Pub. Date: Apr. 8, 2004

(65) Prior Publication Data

US 2006/0098936 A1    May 11, 2006

(51) Int. Cl.
 H04N 7/00   (2006.01)
 H04N 5/93   (2006.01)
 G11B 27/00  (2006.01)
 H04N 5/00   (2006.01)

(52) U.S. Cl. .............. 386/95; 386/52; 386/55; 386/125; 386/126

(58) Field of Classification Search ............ 386/95, 386/52, 55, 125–126
See application file for complete search history.

(56) References Cited

U.S. PATENT DOCUMENTS

| 5,434,676 A | 7/1995 | Okamoto et al. |
| 5,696,919 A | 12/1997 | Masuno et al. |
| 5,907,658 A | 5/1999 | Murase et al. |
| 6,215,746 B1 | 4/2001 | Ando et al. |

(Continued)

FOREIGN PATENT DOCUMENTS

EP    0836189 A    4/1998

(Continued)

OTHER PUBLICATIONS

Official Tranlation of JP 2002247526.*

(Continued)

*Primary Examiner*—Thai Tran
*Assistant Examiner*—Daquan Zhao
(74) *Attorney, Agent, or Firm*—Panasonic Patent Center; Dhiren Odedra; Kerry Culpepper

(57) ABSTRACT

A playback apparatus not only plays back an AV stream recorded on a BD-ROM but also downloads an update kit from a WWW server (500) and writes it on a local HD (12). The AV stream stored in the local HD (12) includes an audio stream for an additional language. A control unit (16) reads the AV stream recorded on the BD-ROM and the AV stream recorded in the local HD (12) in units of access units. An audio decoder (6) obtains a necessary audio frame from the access units read from the BD-ROM and the local HD (12) and plays it back. A video decoder (4) obtains video data from the access unit read from the BD-ROM and plays it back.

13 Claims, 64 Drawing Sheets

U.S. PATENT DOCUMENTS

| | | |
|---|---|---|
| 6,288,991 B1 | 9/2001 | Kajiyama et al. |
| 6,456,777 B1 | 9/2002 | Masuno et al. |
| 6,539,168 B2 | 3/2003 | Ando et al. |
| 6,564,006 B1 | 5/2003 | Mori et al. |
| 7,356,247 B2 * | 4/2008 | Hamasaka et al. ............ 386/95 |
| 2001/0008576 A1 | 7/2001 | Otomo et al. |
| 2001/0055466 A1 | 12/2001 | Iwashita |
| 2002/0176693 A1 | 11/2002 | Cho et al. |
| 2002/0194618 A1 | 12/2002 | Okada et al. |
| 2003/0161615 A1 | 8/2003 | Tsumagari et al. |

FOREIGN PATENT DOCUMENTS

| | | |
|---|---|---|
| EP | 1 309 205 | 5/2003 |
| JP | 5-282371 | 10/1993 |
| JP | 07-078242 | 3/1995 |
| JP | 7-226011 | 8/1995 |
| JP | 8-306167 | 11/1996 |
| JP | 10-013809 | 1/1998 |
| JP | 10-108136 | 4/1998 |
| JP | 10-116472 | 5/1998 |
| JP | 2813245 B | 10/1998 |
| JP | 10-327381 | 12/1998 |
| JP | 11-98467 | 4/1999 |
| JP | 11-161663 | 6/1999 |
| JP | 11-191282 | 7/1999 |
| JP | 11-331780 | 11/1999 |
| JP | 2000-057746 | 2/2000 |
| JP | 2000-57746 | 2/2000 |
| JP | 2000-25364 | 9/2000 |
| JP | 2000-253364 | 9/2000 |
| JP | 2002-101390 | 4/2002 |
| JP | 2002-247526 | 8/2002 |
| JP | 2002247526 * | 8/2002 |
| JP | 2003-23604 | 1/2003 |
| JP | 2003-249057 | 9/2003 |
| WO | 98/14942 | 4/1998 |

OTHER PUBLICATIONS

Supplementary European Search Report, dated Jul. 6, 2009, for counterpart European Application No. 03795416.1.

* cited by examiner

FIG.38
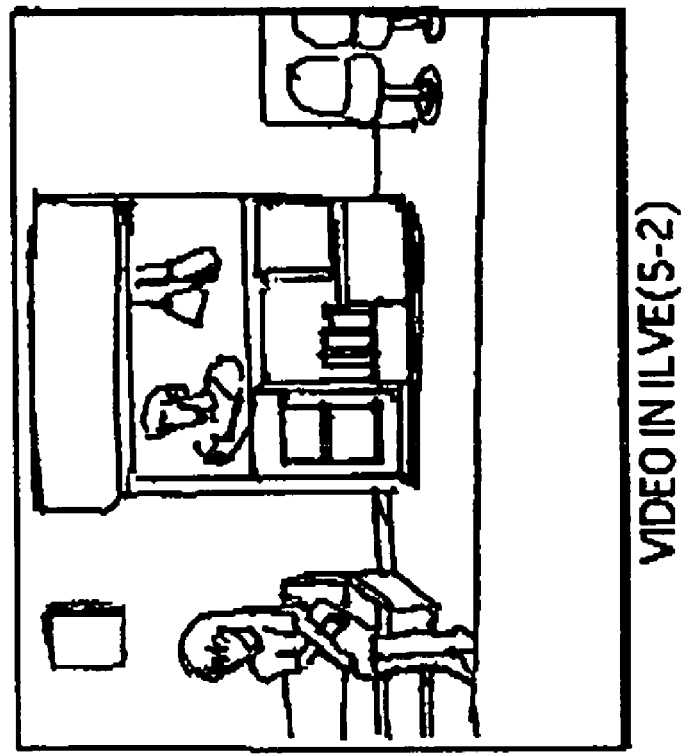
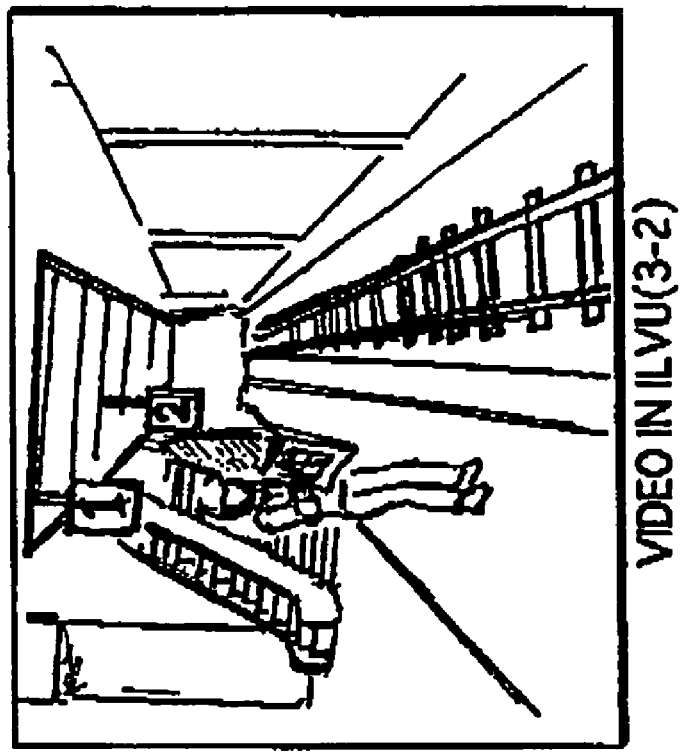

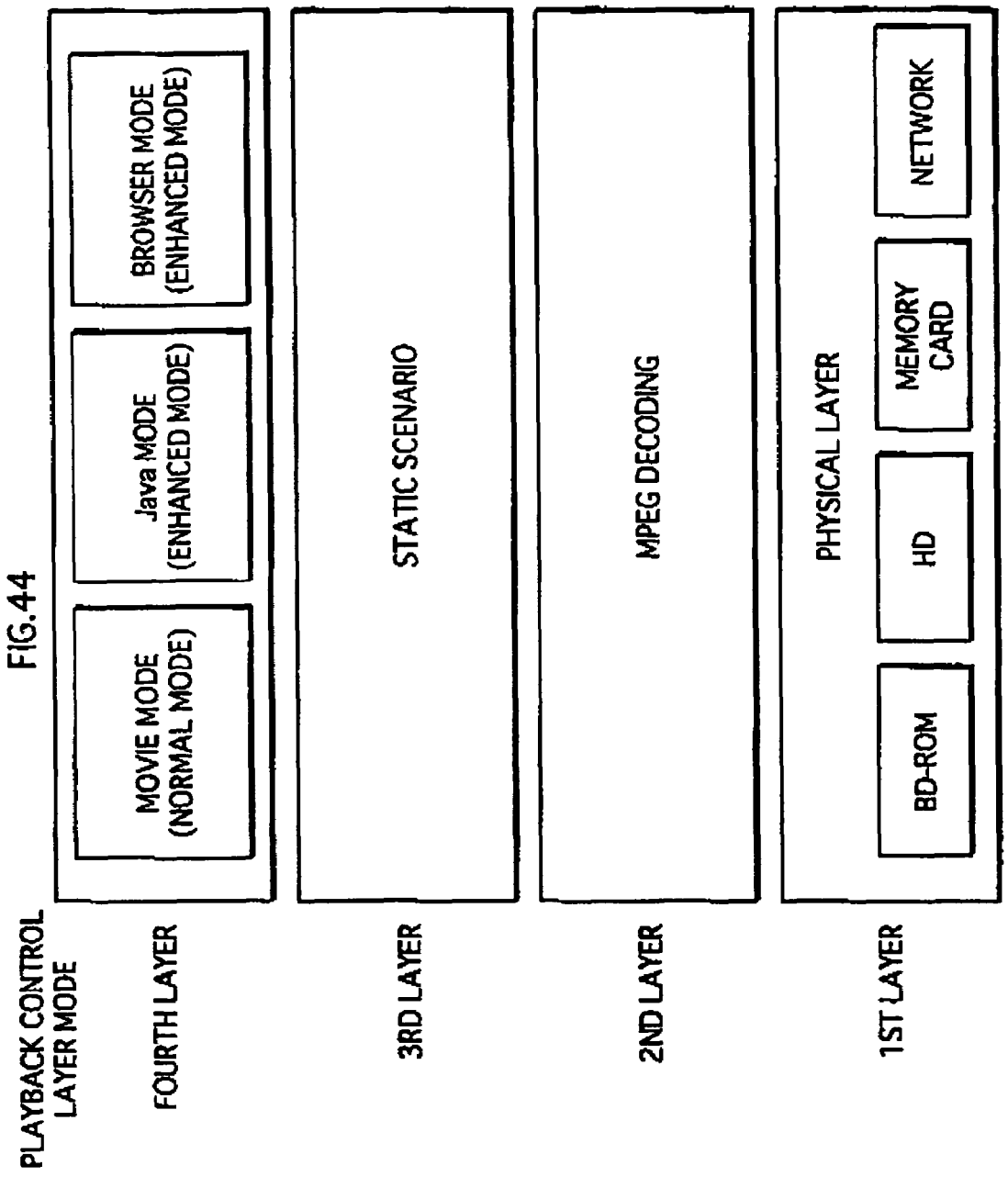

US-RELEASE VERSION

```
function{
 PlayPL(PL#1,Cell#1);
 PlayPL(PL#2,Cell#1);
 PlayPL(PL#3,Cell#1);
}
```

```
function{PlayPL(PL#1,Cell#1)
 if(SPRM(0)=="Japanese"){
 PlayPL(PL#4,Cell#1);
 }else{
 PlayPL(PL#2,Cell#1);}
 PlayPL(PL#3,Cell#1);
}
```

DOWNLOAD

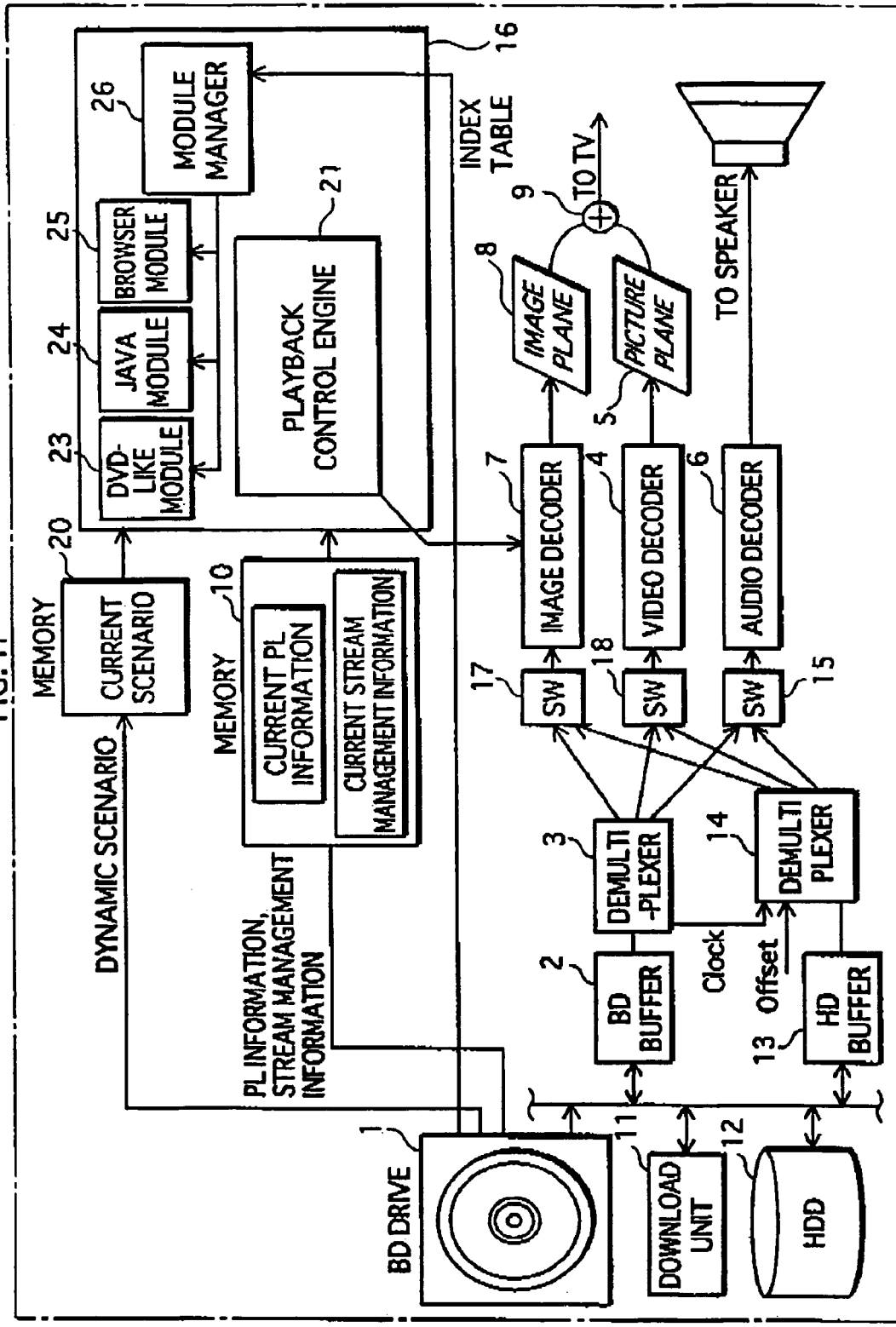

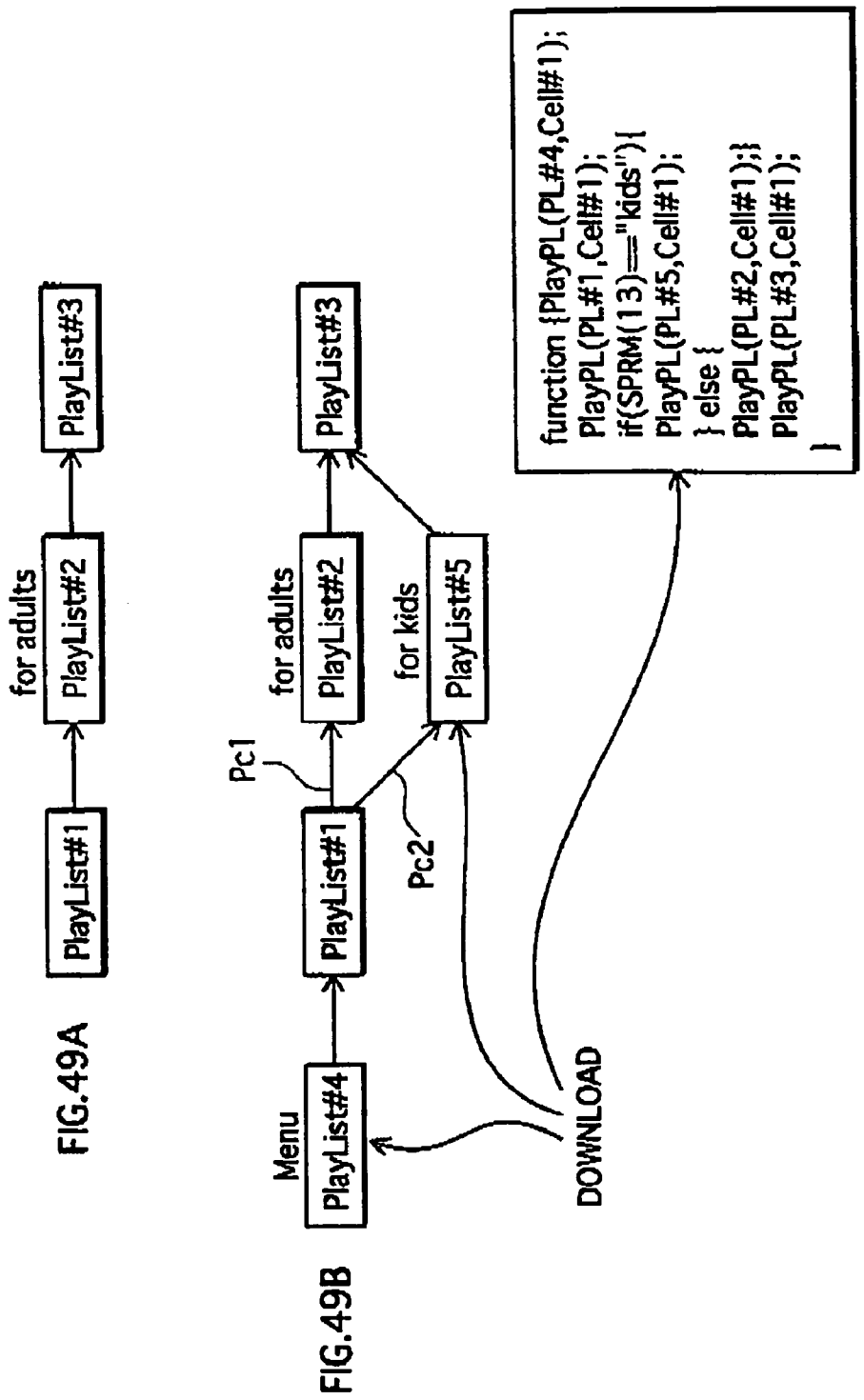

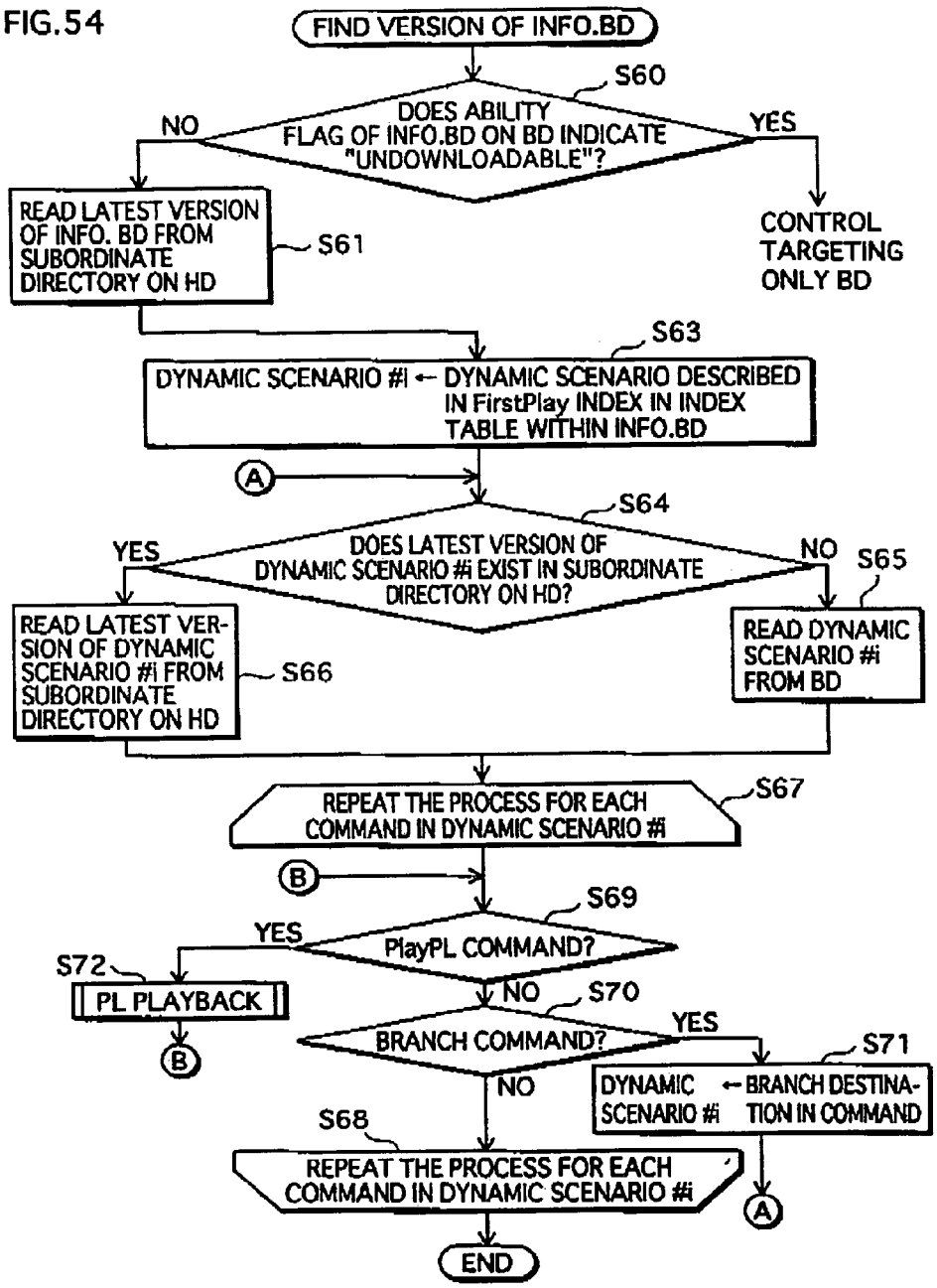

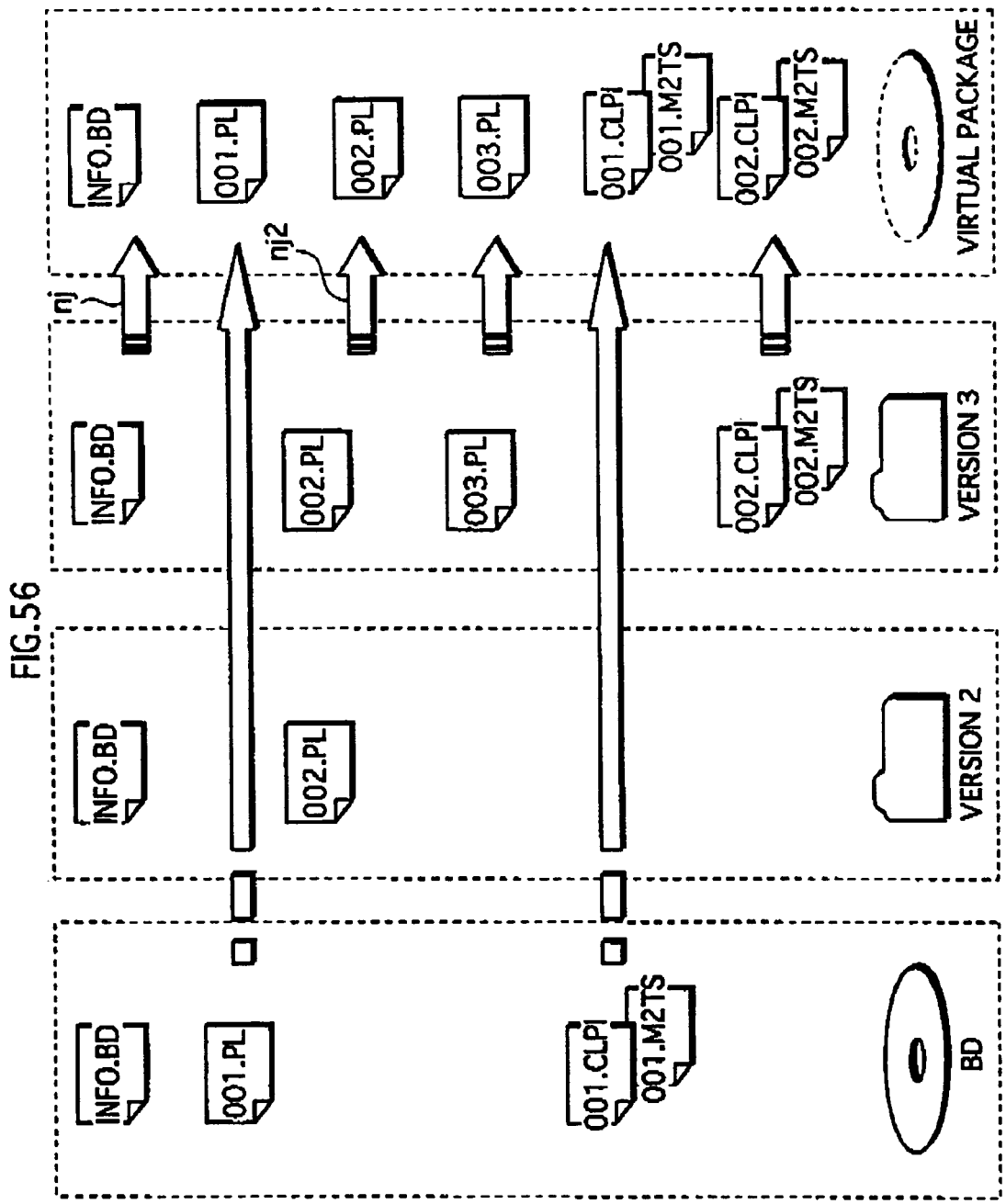

FIG.58

| PACKAGE NAME | RECORDING POSITION INFORMATION | ENDING POSITION INFORMATION |
|---|---|---|
| ABC | ¥ABC | PL#2/Cell#1/00:03:24:00 |
| XYZ | ----- | PL#1/Cell#1/00:13:05:10 |
| WWW | Memory:¥WW | ----- |
| JKF | Server:¥JKF | PL#4/Cell#2/00:01:22:00 |

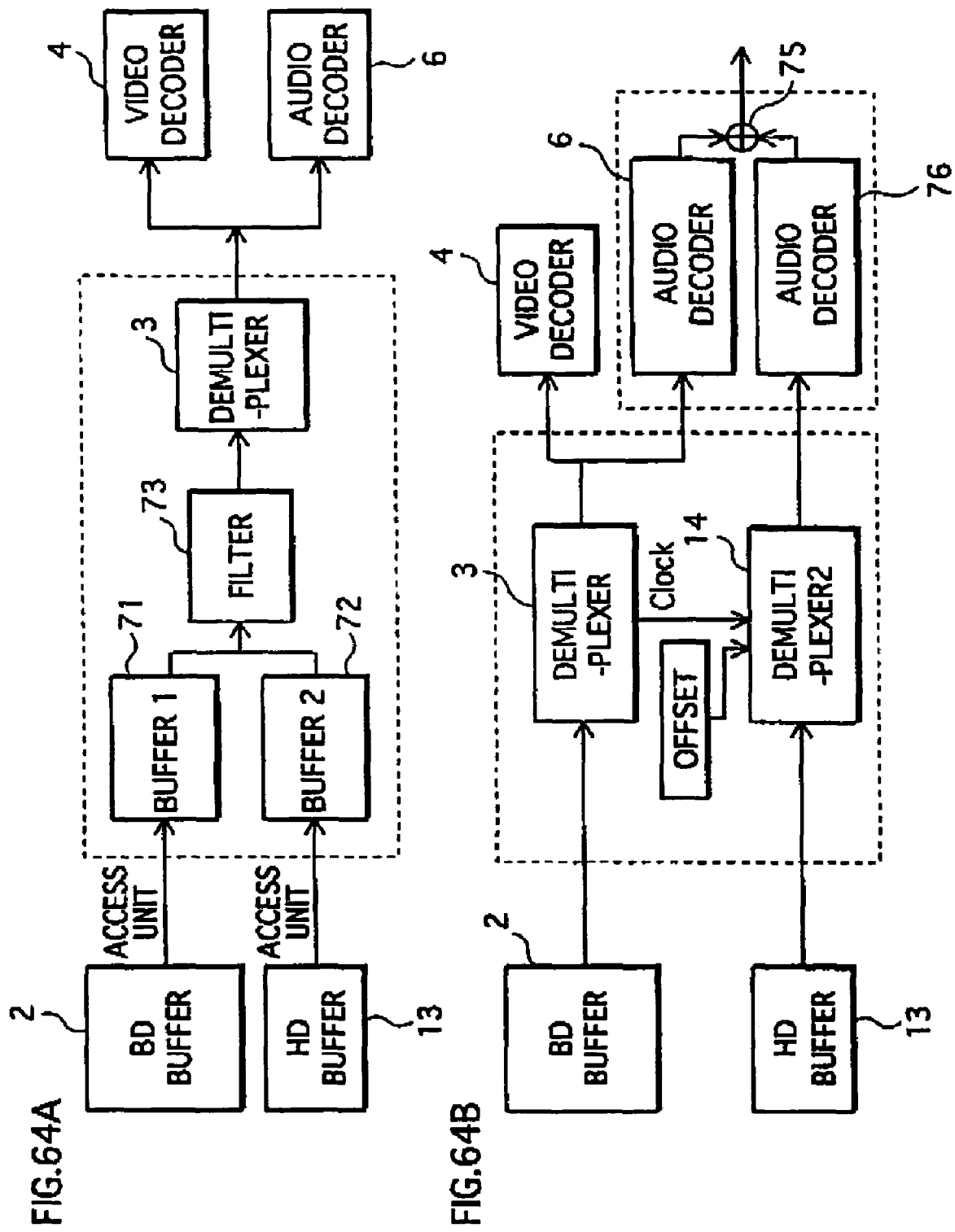

REPRODUCTION DEVICE, OPTICAL DISC, RECORDING MEDIUM, PROGRAM, AND REPRODUCTION METHOD

TECHNICAL FIELD

The present invention relates to playback apparatuses for playing back video data recorded on an optical disc such as a Blu-Ray Disc Read Only Memory (BD-ROM) and to optical discs, and also relates to a technique for playing back movie productions and the like distributed on optical discs.

BACKGROUND ART

When movie productions are to be distributed, a great difficulty is posed by language differences. In order to set aside time for producing audio dubbing and subtitles, the movie industry has adopted a business method by which optical discs are distributed in the U.S.A. first, and distribution timing of optical discs in non-English regions is staggered, for example for Western Europe and Japan, and for Eastern Europe and other Asian countries. (This business method is called "time-shift".) With the use of this time-shift method, movie productions are distributed to each of different regions in the world, with English audio and/or subtitles and the audio and/or subtitles in the native language of the region. It should be noted that Japanese Patent No. 2,821,020, discloses an example of the prior art related to techniques for playing back audio and playing back sub-images on DVDs.

There are users, not so large in number but definitely in any country and region, who desire to own an optical disc in a version that is not distributed in his/her own country or region. A typical example is that there are some users who purchase a translated version of an optical disc in their second language besides English and their native language in order to learn the second language. Inmost cases, however, the places where such discs on which a movie production is recorded in a second language are sold are limited to the areas where the language is spoken, and it is difficult for most users to purchase such a disc in his/her own country. In addition, even if a user orders such a disc from the area where the language is spoken, the user may not be able to play back the disc on the playback apparatus he/she owns, due to the region code restriction.

The second languages users wish to learn are, for example, Japanese, German, French, Chinese, Russian, and there is a wide range in variation of languages for different users. It is a large burden on distributors to keep the lineup of products so as to cover all different languages. It is also an extremely high marketing risk for distributors to bring products in only certain languages into markets. Using discs for learning languages is a mere example, and there are some users in any country for sure who wish to have a disc in a version that is not distributed in their own country. Conventionally, there is no technique that makes it possible for distributors to meet such demand of the users.

DISCLOSURE OF THE INVENTION

An object of the present invention is to provide a playback apparatus that is able to satisfy a user who wishes to have a disc in a version that is not distributed in his/her own country.

The object is achieved by a playback apparatus for an optical disc on which a first digital stream is recorded, the playback apparatus comprising: a first reading unit operable to read the first digital stream, part by part, from the optical disc; a control unit operable to specify, from a secondary recording medium, a second digital stream that is in correspondence with the first digital stream; a second reading unit operable to read the specified second digital stream, part by part, from the secondary recording medium, in accordance with control by the control unit; and a playback unit operable to play back, in synchronization, data included in a part read from the optical disc and data included in a part read from the secondary recording medium.

With this arrangement, on an assumption that the second digital stream is a version for a second language besides a native language, the second digital stream is read from the secondary recording medium, part by part. In parallel, the first digital stream recorded on the optical disc is read, part by part. By taking out necessary pieces of data from a part read from the secondary recording medium and from a part read from the optical disc and having the playback unit play back the pieces of data in synchronization with each other, it is possible to play back the main body of the first digital stream while it is accompanied by playback of audio or a subtitle in the second language version. It is possible to establish a new form of business in which such an additional second digital stream is sold via the Internet so that update kits in a second language version are sold by a small quantity to users in the world who wish to have the second language for the purposes of learning the language. When such a form of business is established, it can be a new source of profits with movie productions.

It is acceptable to have an arrangement wherein the playback unit includes: a first demultiplexer operable to demultiplex the part of the first digital stream to obtain pieces of video data and pieces of first audio data; a second demultiplexer operable to demultiplex the part of the second digital stream to obtain pieces of second audio data; a video decoder operable to decode video data; an audio decoder; and a supplying subunit operable to supply either the pieces of first audio data or the pieces of second audio data to the audio decoder, wherein the playback unit achieves the playback in synchronization by, in a case where the pieces of second audio data are supplied to the audio decoder, synchronizing the decoding of each piece of second audio data by the audio decoder with the decoding of each piece of video data by the video decoder.

With this arrangement, on an assumption that the second digital stream is a version for a second language besides a native language, it is possible to play back the audio data included in the second digital stream in synchronization with the video data included in the first digital stream. Since it is possible to practice listening comprehension in the second language while viewing the moving picture of a movie production, leaning efficiency of the second language will be enhanced. By using this learning efficiency as a selling point, distributors will be able to make large profits by selling the second digital stream as update kits to users in the world who wish to learn the second language.

It is acceptable to have an arrangement wherein the part of the first digital stream and the part of the second digital stream are each a packet sequence, the first demultiplexer performs the demultiplexing at a time indicated by a time stamp on each packet, and the second demultiplexer performs the demultiplexing at a time obtained by adding a predetermined offset to a time indicated by a time stamp on each packet.

With this arrangement, since the two digital streams are synchronized with each other at a stage of being demultiplexed, even if the reading of one digital stream from the optical disc is not performed in parallel with the reading of the other digital stream from the secondary recording medium, it is possible to supply pieces of data to the audio decoder while keeping them in synchronization.

In addition, even if master clocks referred to during the encoding process are different from each other, it is possible to supply pieces of data to the audio decoder while keeping them in synchronization.

It is acceptable to have an arrangement wherein the part of the first digital stream and the part of the second digital stream are each a packet sequence, the video decoder decodes each of the pieces of video data included in the first digital stream at a time indicated by a time stamp on a packet in which the respective piece of video data is included, and the audio decoder decodes each of the pieces of second audio data included in the second digital stream at a time obtained by adding a predetermined offset to a time indicated by a time stamp on a packet in which the respective piece of second audio data is included.

With this arrangement, since the two digital streams are synchronized with each other at a stage of being decoded, even if the reading of one digital stream from the optical disc is not performed exactly in parallel with the reading of the other digital stream from the secondary recording medium, the audio decoder is able to decode the audio in synchronization with the decoding of the video data. In addition, even if master clocks referred to during the encoding process are different from each other, the audio decoder is able to decode the audio while keeping it in synchronization.

It is acceptable to have an arrangement wherein the playback apparatus comprises a system register that stores therein a parameter showing a status setting of the playback apparatus, wherein whether the audio decoder decodes the pieces of first audio data belonging to the first digital stream or the pieces of second audio data belonging to the second digital stream is determined according to the parameter in the system register.

With this arrangement, depending on the status setting of the playback apparatus, it is possible to switch between the audio in the first digital stream and the audio in the second digital stream; therefore, it is possible to treat the second digital stream on the secondary recording medium and the first digital stream on the optical disc altogether as one.

It is acceptable to have an arrangement wherein the secondary recording medium has playlist information recorded thereon, the playlist information showing a starting point and an ending point of a playback section in the first digital stream in correspondence with a starting point and an ending point of a playback section in the second digital stream, the playback apparatus comprises a playback control unit operable to interpret the playlist information, and the readings by the first and the second reading units and the playback by the playback unit are performed based on a result of the interpretation by the playback control unit.

With this arrangement, it is possible to, not only bring the first and second digital streams in correspondence with each other, but also to specify, in a case where a logical playback section is specified in the first digital stream, a section in the second digital stream that corresponds to the logical playback section in the first digital stream; therefore, it is possible to realize synchronized playback in units of logical sections.

It is acceptable to have an arrangement wherein the package management information further includes alternative information, the playback control unit checks, prior to the interpretation of the playlist information, if the playlist information is damaged, and in a case where the playlist information is damaged, the playback control unit interprets playlist information indicated by the alternative information.

With this arrangement, it is possible to recover data in a case where the playlist information on the secondary recording medium is damaged; therefore, it is possible to assure stable playback.

It is acceptable to have an arrangement wherein the secondary recording medium has a program recorded thereon, the program showing a procedure for playback control of the first and the second digital streams using the playlist information, the playback apparatus comprises an execution module for executing the program recorded on the secondary recording medium, and the playback control unit interprets the playlist information based on a function call within the program.

With this arrangement, by referring to the program, it is possible to add, in a post factum manner, what procedure is used to perform the playback using the playlist information, after the optical disc is released. Thus, it is beneficial for after-sales services provided after the optical disc is sold.

It is acceptable to have an arrangement wherein the secondary recording medium has a plurality of package areas each of which is assigned to a different one of a plurality of optical discs to be mounted to the playback apparatus, when an optical disc is mounted to the playback apparatus, the control unit controls the first reading unit so that medium information is read from the mounted optical disc and specifies, out of the plurality of package areas in the secondary recording medium, a package area that corresponds to the read medium information, and the second digital stream read by the second reading unit exists in the specified package area.

With this arrangement, it is possible to have a plurality of optical discs mounted to the playback apparatus and to record an updated version of each of the optical discs.

It is acceptable to have an arrangement wherein the optical disc has playlist information, a program, and package management information recorded thereon, the playlist information shows a starting point and an ending point of a playback section in the first digital stream in correspondence with a starting point and an ending point of a playback section in the second digital stream, the program shows a procedure for playback control of the first and the second digital streams using the playlist information, the package management information is management information for the first digital stream, the second digital stream, the playlist information, and the program, the control unit controls the second reading unit so that any of the playlist information, the program, and the package management information that exists within the package area is read from the package area into the memory, and the control unit controls the first reading unit so that any of the playlist information, the program, and the package management information that does not exist in the package area is read from the optical disc into the memory.

It is also acceptable to have an arrangement wherein in a case where the playlist information or the program having an identification number in common is recorded both on the optical disc and in the package area, the control unit controls the second reading unit so that the playlist information or the program recorded in the package area is read into the memory, and in a case where the playlist information or the program having an identification number is recorded only on the optical disc, the control unit controls the first reading unit so that the playlist information or the program recorded on the optical disc is read into the memory.

With this arrangement, if a new updated version does not include one or more of the playlist information, the program, and the package management information, it is possible to use data on the optical disc to supplement what is missing; therefore, there is no need to transmit all of the data to the user as an updated version. Accordingly, since it is possible to minimize the volume of what is supplied to the user as an updated version, the technique is suitable for transmission of updated versions via the Internet.

The playback apparatus described above needs to perform the reading from the secondary recording medium in parallel with the reading from the optical disc. In a case where the secondary recoding medium is an HD, an HD scan needs to be performed because it is necessary to (i) check if an updated version exists in a directory somewhere in the HD and (ii) determine, if there are more than one updated version, which is the newest updated version. When such an HD scan needs to be performed, it takes a while between the loading of the optical disc and the start of the actual reading in parallel. The user who has loaded the optical disk onto the playback apparatus may feel an urge to view the movie production recorded on the optical disc as soon as possible. Users find it quite unpleasant to have a delay in the playback processing of an optical disc, due to whether there is a possibility of upgrading to a higher version or not.

In order to solve the problem mentioned here, the present invention provides an optical disc on which a first digital stream and a flag are recorded, the flag indicating whether or not there is a possibility an updated version of what is recorded on a recording medium is supplied, wherein the updated version includes a second digital stream and correspondence information which shows the first digital stream on the optical disc in correspondence with the second digital stream.

With this arrangement, when an optical disc that has completely no possibility of being upgraded to a higher version is loaded, it is possible to start the playback of the digital streams recorded on the optical disc immediately after the optical disc is loaded, without performing an HD scan.

BRIEF DESCRIPTION OF THE DRAWINGS

FIG. 38 shows what video display is achieved as a result of the output switching shown in FIG. 37;

FIG. 44 shows the details of the fourth layer in a layer model;

FIG. 47 shows the internal structure of the playback apparatus according to the fifth embodiment;

FIG. 49A and FIG. 49B schematically show the playback procedure realized with a dynamic scenario recorded on a BD-ROM and a dynamic scenario included in an update kit;

FIG. 54 shows the processing procedure by the module manager 26 according to the sixth embodiment;

FIG. 56 schematically shows the process of reading files stored on a BD-ROM, in the Version 1 directory, and in the Version 2 directory;

FIG. 58 shows the structure of a virtual package table for INFO.BDs;

FIG. 64A and FIG. 64B show variations for the internal structure of the playback apparatus 200.

BEST MODE FOR CARRYING OUT THE INVENTION

First Embodiment

Figure 1:
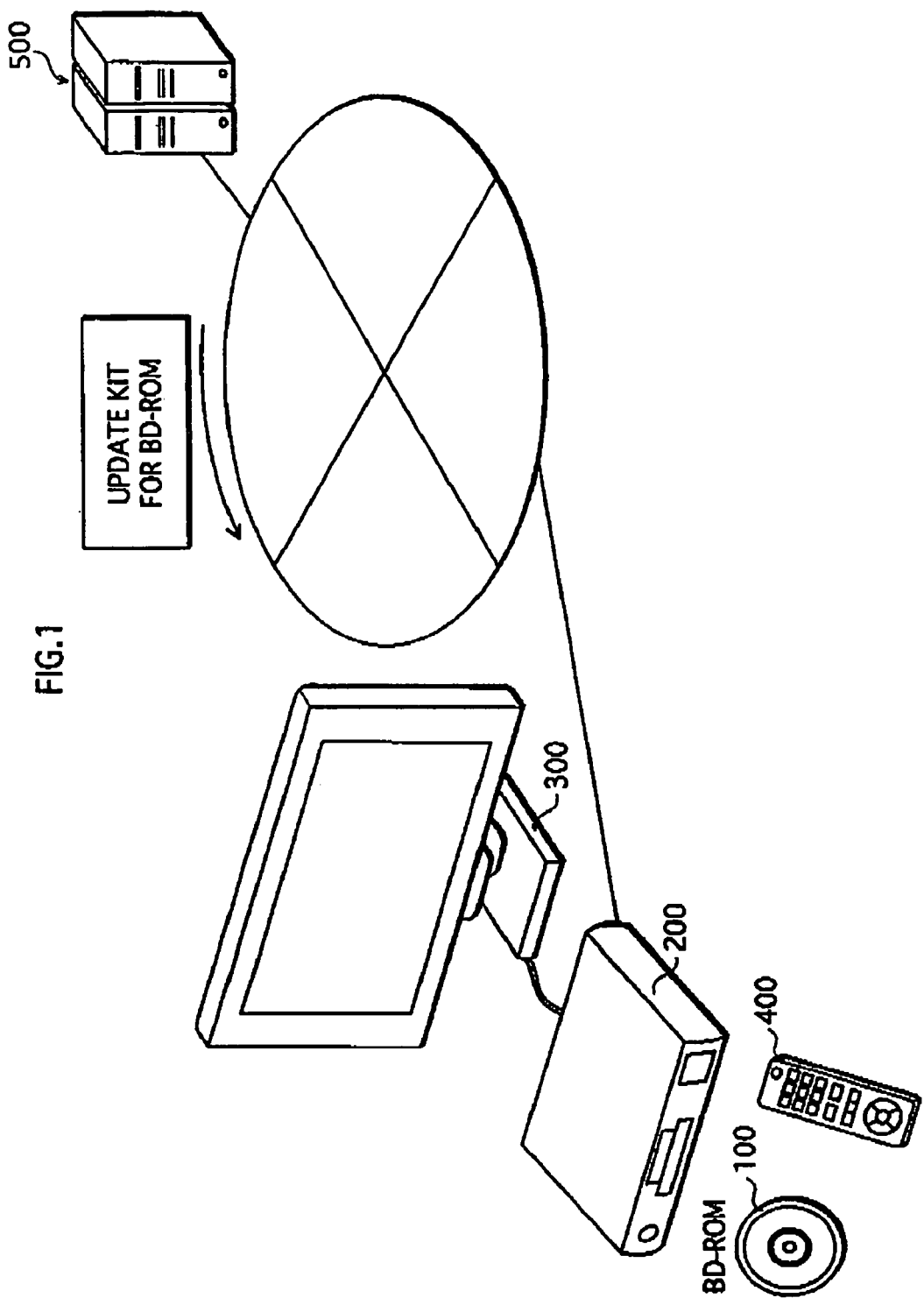
FIG. 1 shows an embodiment related to the usage of the playback apparatus of the present invention.

The following describes an embodiment of the recording medium according to the present invention. First of all, among different actions with the playback apparatus of the present invention, an embodiment of usage will be explained. FIG. 1 shows an embodiment related to the usage of the playback apparatus of the present invention. In FIG. 1, the playback apparatus of the present invention is the playback apparatus 200. The playback apparatus 200, the television 300, and the remote controller 400 form a home theater system. The BD-ROM 100 is a recording medium to supply a movie production to this home theater system. The playback apparatus 200 serves to play back the movie production recorded on the BD-ROM 100, according to a user operation on the remote controller 400.

The home theater system is characterized with that the playback apparatus 200 is connected with a WWW server 500 via a network. In response to a request from the playback apparatus 200, the WWW server 500 transmits an update kit for what is recorded on the BD-ROM 100 to the playback apparatus 200. When the update kit has been transmitted, the playback apparatus 200 dynamically combines the update kit with what is recorded on the BD-ROM 100 and performs the playback of a package in a virtual version (called a "virtual package").

A virtual package is a package being virtual to be supplied to a user in which what is recorded on the BD-ROM 100 is dynamically combined with an update kit. In contrast to a virtual package, what is recorded on a BD-ROM as a whole is called a BD-ROM package.

The following describes a BD-ROM package, with reference to FIGS. 2 through 11.

Figure 2:
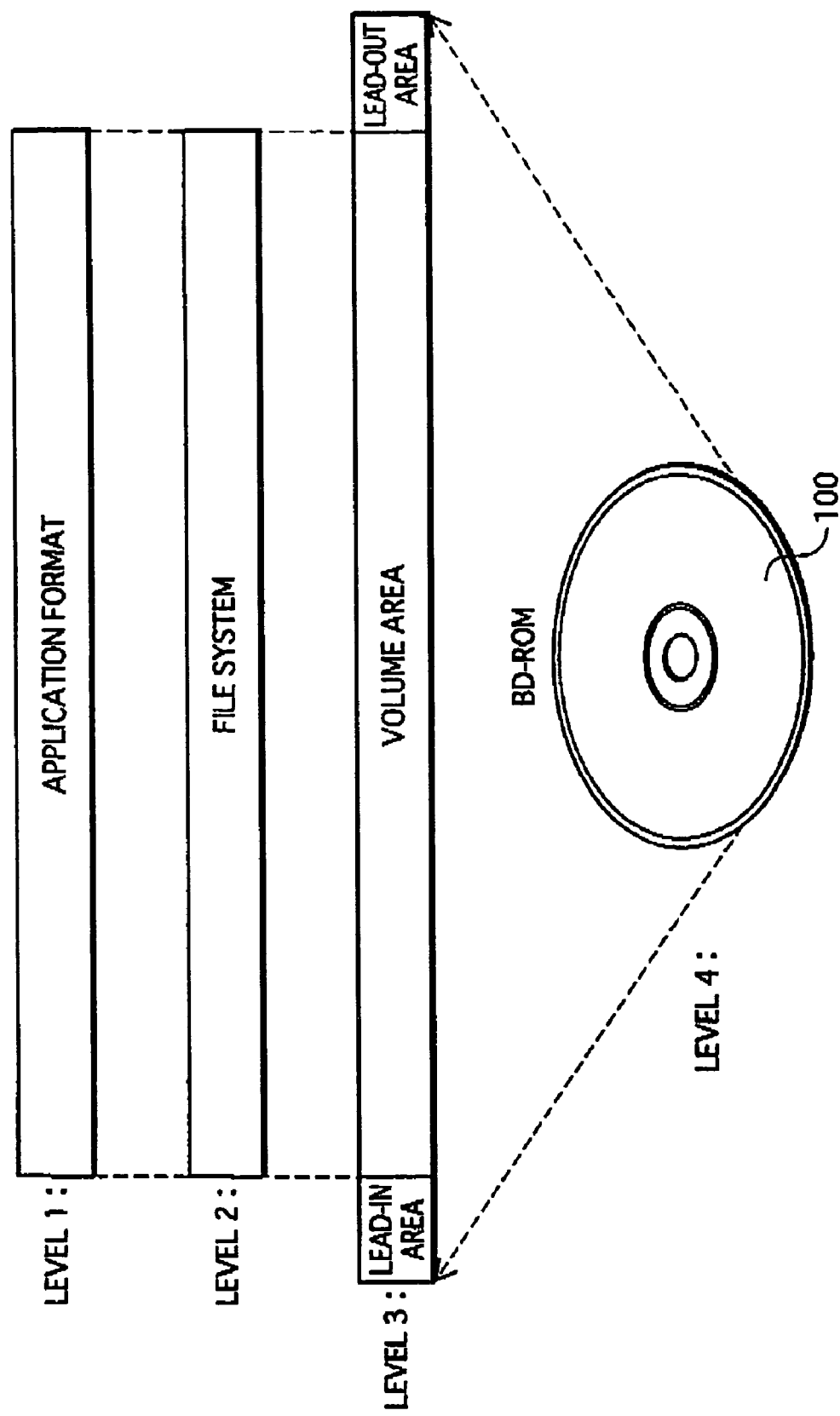
FIG. 2 shows the configuration of a BD-ROM.

FIG. 2 shows the structure of a BD-ROM. In the drawing, the level 4 shows the BD-ROM, and the level 3 shows the track on the BD-ROM. In the drawing, the track that actually forms a spiral from the inner circumference to the outer circumference of the BD-ROM is shown as being stretched sideways. The track includes a lead-in area, a volume area, and a lead-out area. The volume area shown in the drawing has a layer model with a physical layer, a file system layer, and an application layer. An optical disc according to the present embodiment can be industrially manufactured by forming a data format as shown in FIG. 2 on an application layer of a BD-ROM.

Figure 3:
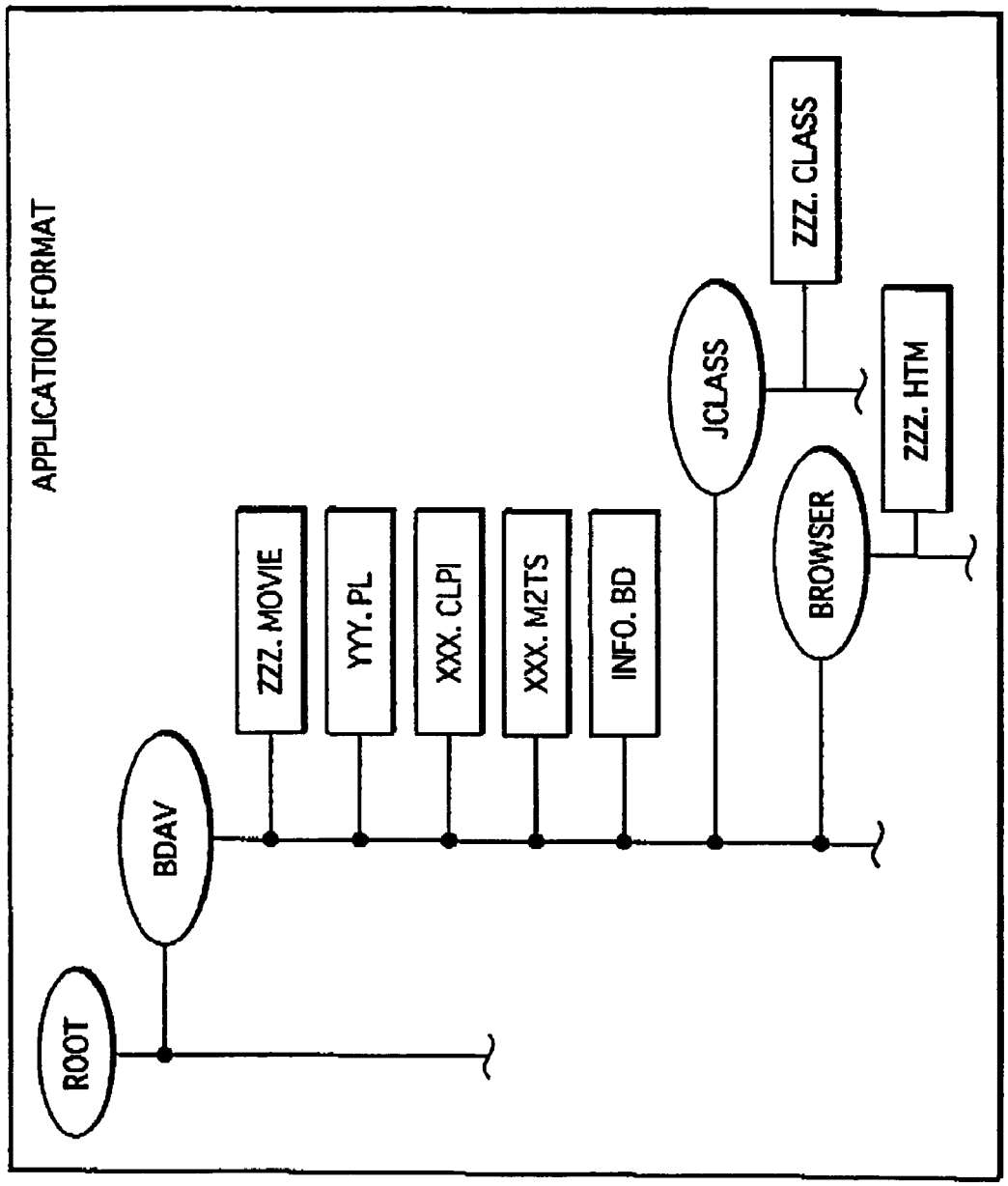
FIG. 3 represents an application format of a BD-ROM, using a directory structure.

FIG. 3 represents an application format of a BD-ROM, using a directory structure. As shown in the drawing, below a ROOT directory in the BD-ROM is a BD-AV directory, and below the BD-AV directory is a JCLASS directory and a BROWSER directory.

Subordinate to the BD-AV directory are disposed files such as INFO. BD, XXX. M2TS, XX. CLPI, YYY. PL, and ZZZ. MOVIE. Subordinate to the JCLASS directory is disposed a file called ZZZ. CLASS, and subordinate to the BROWSER directory is disposed a file called ZZZ.HTML.

Figure 4:
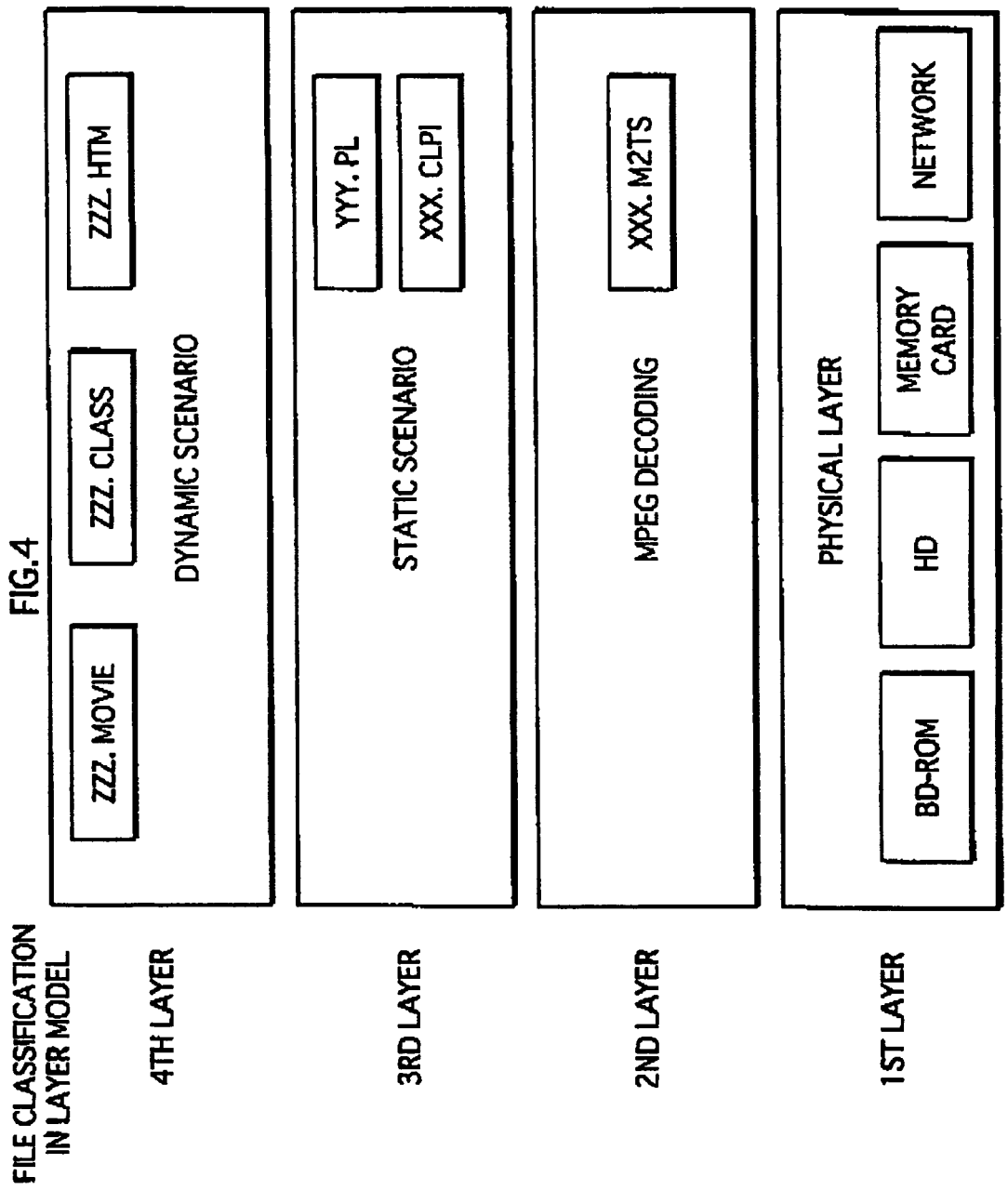
FIG. 4 is a classification diagram in which files are classified in terms of their functions.

FIG. 4 is a classification diagram in which files are classified in terms of their functions. In the drawing, the hierarchy formed with the first, second, third, and fourth layers symbolically shows the classifications in the diagram. In the drawing, XXX.M2TS is grouped in the second layer. XXX. CLPI and YYY.PL are grouped in the third layer (static scenarios). ZZZ.MOVIE, which is subordinate to the BD-AV directory, ZZZ. CLASS, which is subordinate to the JCLASS directory, ZZZ.HTM, which is subordinate to the BROWSER directory are grouped in the fourth layer.

Figure 5:
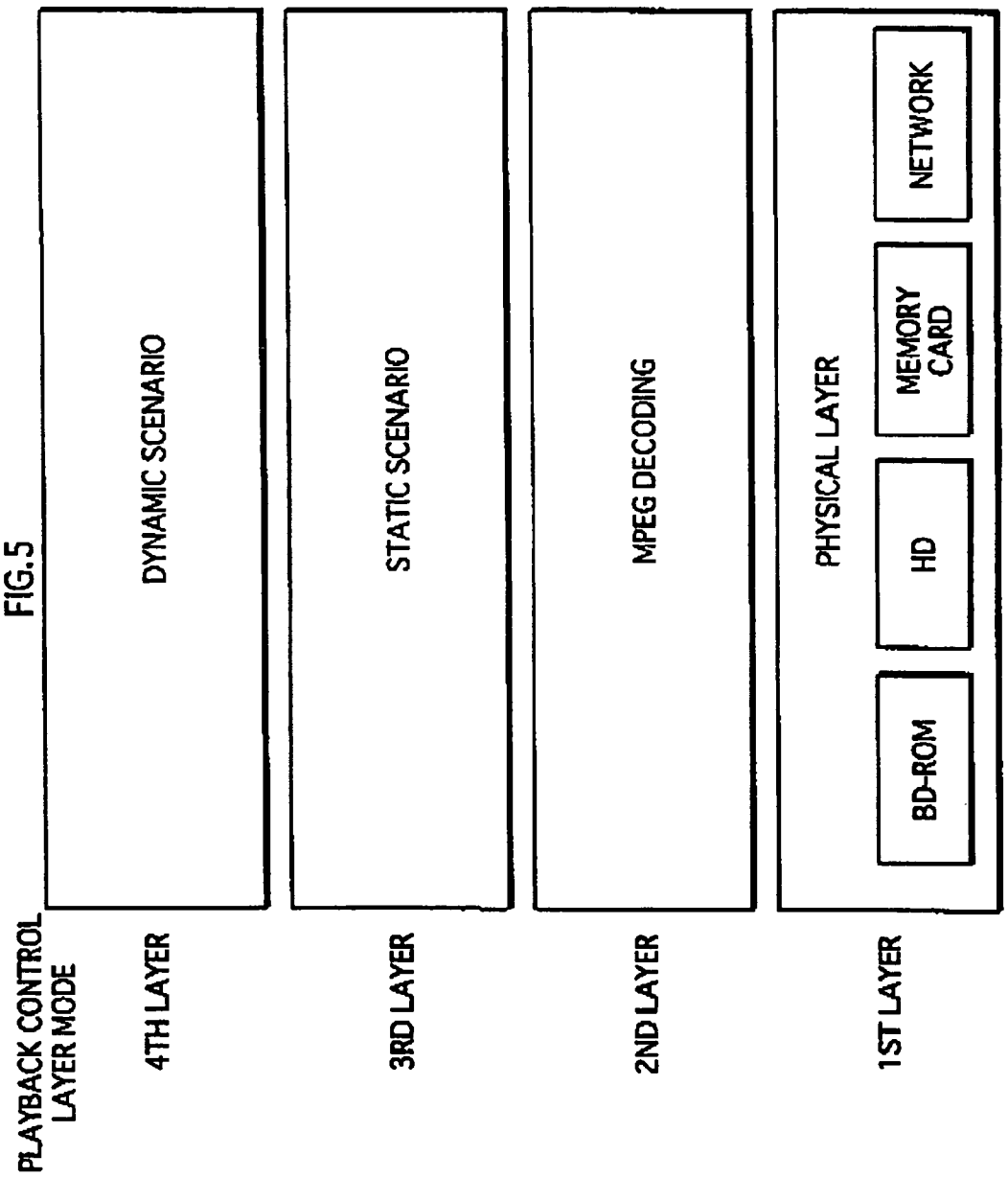
FIG. 5 shows a layer model of software targeted by a BD-ROM.

The classifications in the drawing (the first to fourth layers) target a layer model such as shown in FIG. 5. A layer model in control software that is targeted by a BD-ROM is described below while referring to FIG. 5.

The first layer in FIG. 5 is a physical layer in which supply controls relating to streams targeted for processing are implemented. As shown in the first layer, target streams have as their supply source not only BD-ROMs but also HDs (hard disks), memory cards, networks and other kinds of recording and communication media. Controls (disk access, card access and network communication) directed towards the supply source such as HDs, memory cards, and networks are implemented on the first layer.

The second layer is a decoding format layer. This second layer is where the decoding format used in decoding streams supplied by the first layer is defined. The MPEG-2 decoding format is employed in the present embodiment.

The third layer (static scenarios) defines the static scenarios of streams. Static scenarios are playback path information and stream management information defined in advance by the disk creator, the third layer (static scenarios) being where playback controls based on these static scenarios are defined.

The fourth layer is for realizing dynamic scenarios in streams. Dynamic scenarios are scenarios for dynamically changing the progress of playback as a result of user operations, the apparatus status, and the like, the fourth layer being where playback controls based on these dynamic scenarios are defined. Files relating to streams and static scenarios are described below in accordance with this layer model.

Firstly, a stream (XXX.M2TS) belonging to the second layer is described.

Figure 6:
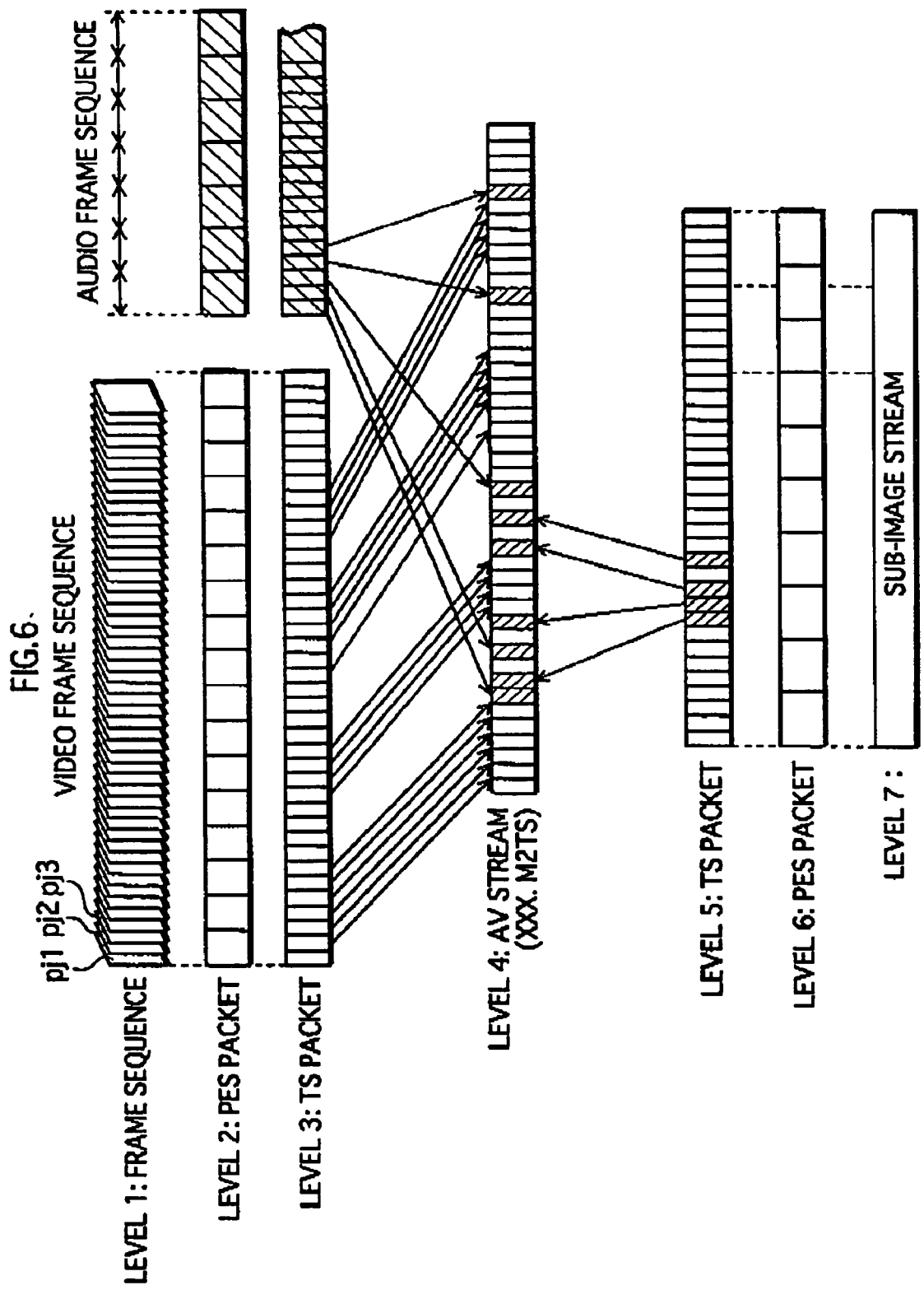
FIG. 6 schematically shows how an AV stream is structured.

The AV stream (XXX.M2TS) is an MPEG-TS (transport stream) format digital stream obtained by multiplexing a video stream, one or more audio streams, and one or more sub-image streams. Video streams show the moving image portions of a movie, audio streams show the audio portions of a movie, and sub-image streams show the subtitles of a movie. FIG. 6 schematically shows how an AV stream is structured.

An AV stream (the level 4) is formed by converting a video stream comprising a plurality of video frames (pictures pj1, pj2, pj3) and an audio stream comprising a plurality of audio frames (the level 1) into a PES packet sequence (the level 2), which is then converted to TS packets (the level 3). Likewise, a sub-image stream (the level 7) is converted into a PES packet sequence (the level 6), which is converted to TS packets (the level 5), and they are then multiplexed. The multiplexing involves arranging TS packets storing video frames and TS packets storing audio frames, so that audio frames are positioned close to video frames that are to be read from the BD-ROM at the same time as the audio frames.

Figure 7:
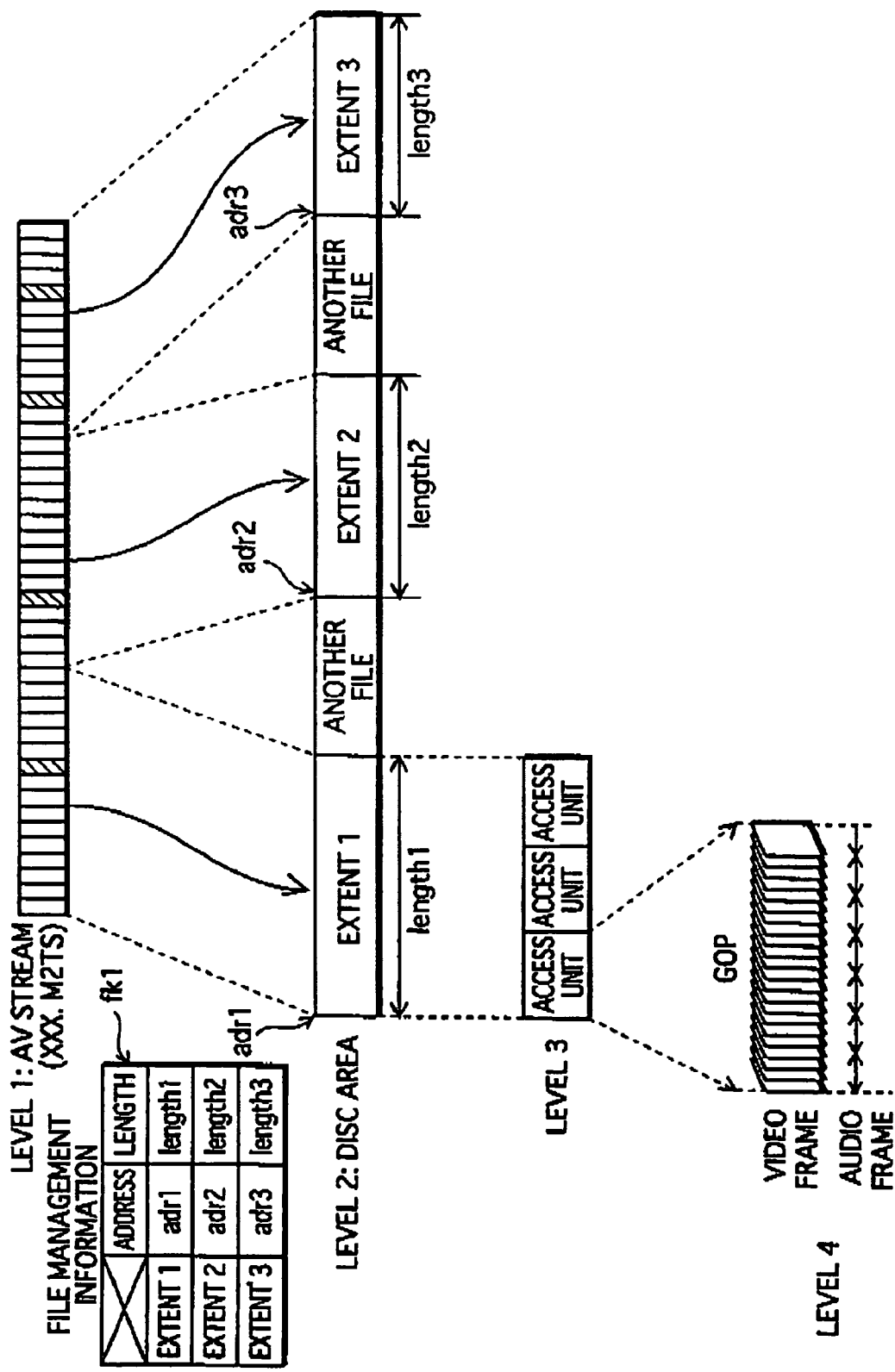
FIG. 7 schematically shows how an AV stream is recorded on a BD-ROM.

An AV stream generated through the above process is portioned into a plurality of extents and recorded in an area of a BD-ROM, in the same manner as normal computer files. FIG. 7 schematically shows how an AV stream is recorded on a BD-ROM.

The length of each of the extents constituting the AV stream and at which address in the BD-ROM each of the extents is recorded are described in the file management information fk1.

The file management information fk1 describes, for each of the extents 1, 2, and 3 that are obtained by portioning the AV stream, the address of the extent (adr 1, adr 2, and adr 3) and the length of the extent (length 1, length 2, and length 3). An AV stream comprises one or more ACCESS UNITs, and can be cued in these ACCESS UNITs. An ACCESS UNIT is the smallest decoding unit that includes a single GOP (group of pictures) and audio frames to be read at the same time as the GOP. GOPs include bi-directionally predictive (B) pictures, which are compressed using time-correlation characteristics with images to be played in a past direction and a future direction, predictive (P) pictures, which are compressed using time-correlation characteristics with images to be played in a past direction, and intra (I) pictures, which are compressed using spatial-frequency characteristics (i.e. not time-correlation characteristics) in the images of individual frames.

Moreover, the file name "XXX" in XXX.M2TS abstracts the 3-digit identification number appended to the AV stream in the BD-ROM. That is, the AV stream in the drawing is uniquely identified using the "XXX". Thus, the description of the stream (XXX.M2TS) is completed. It should be noted that the 3-digit number referred to here is merely exemplary, and may be any length.

Static Scenarios

The files (XXX.CLPI, YYY.PL), which are static scenarios, are described next.

Figure 8:
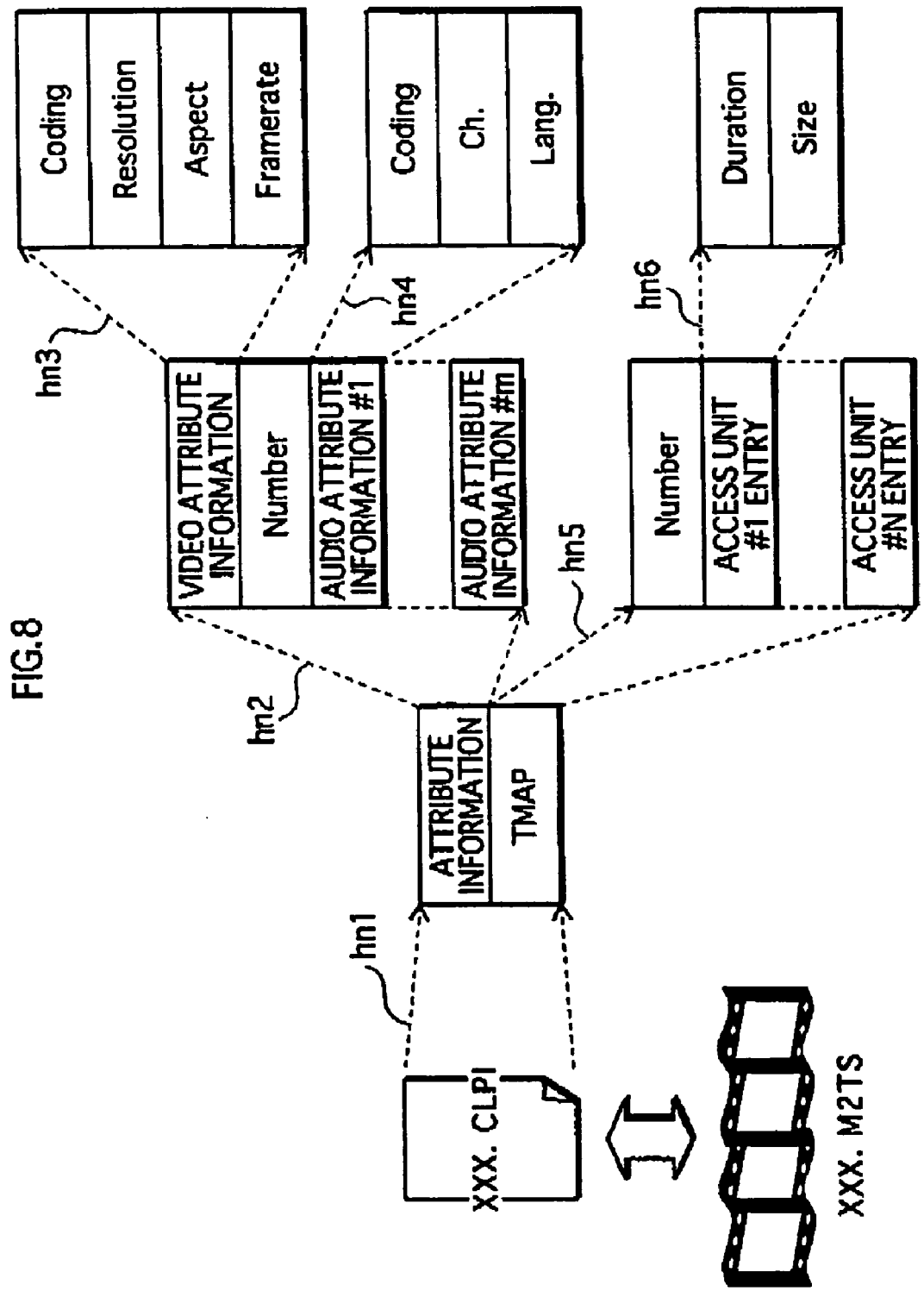
FIG. 8 shows the internal structure of stream management information.

Stream management information (XXX.CLPI) is management information relating to individual AV streams. FIG. 8 shows the internal structure of stream management information. An AV stream is obtained by multiplexing video and audio streams, and since an AV stream can be cued in ACCESS UNITs, management items of the stream management information include what attributes the video and audio streams have and where the cue positions are in the AV stream. The leaders in the drawing highlight the stream management information structure. As shown by the leader hn1, the stream management information (XXX.CLPI) comprises "attribute information" relating to video and audio streams, and "TMAP", which is a reference table for cueing ACCESS UNITS.

Attribute information (Attribute), as shown by the leader hn2, comprises attribute information relating to a video stream (Video attribute information), an attribute information number (Number), and attribute information relating to each of a plurality of audio streams multiplexed on the AV stream (Audio attribute information #1-#m). The management information on video streams, as shown by the leader hn3, shows the compression format used to compress the video stream (Coding), and the resolution (Resolution), the aspect ratio (Aspect), and the frame rate (Framerate) of individual pieces of picture data structuring the video stream.

On the other hand, attribute information relating to the audio streams (Audio attribute information #1-#M), as shown by the leader hn4, shows the compression format used to compress the respective audio streams (Coding), and the channel number (Ch.) and the corresponding language (Lang.) of respective audio streams.

The time map (TMAP) is a reference table for referring indirectly to the addresses of a plurality of cue positions using time information, and, as shown by the leader hn5, comprises a plurality of pieces of ENTRY information (ACCESS UNIT #1 ENTRY information, ACCESS UNIT #2 ENTRY information, ACCESS UNIT #3 ENTRY information, . . . ) and an entry information number (Number). Each piece of ENTRY information, as shown by the leader hn6, shows a playback time period (Duration) of a corresponding ACCESS UNIT in correspondence with the data size (Size) of the corresponding ACCESS UNIT. Because of employing a variable-length coding compression format, it is possible to cue from an arbitrary playback time to a piece of picture data in an ACCESS UNIT corresponding to the playback time by referring to the ENTRY information of the ACCESS UNIT, even when sizes and playback times of ACCESS UNITs that include GOPs are not uniform. Moreover, the filename "XXX" of XXX.CLPI uses the same name as the AV stream to which the stream management information corresponds. In other words, the file name of the AV stream in the drawing, being "XXX", corresponds to the AV stream "XXX.M2TS". Thus concludes the description of the stream management information. Playlist information is described next.

Figure 9:
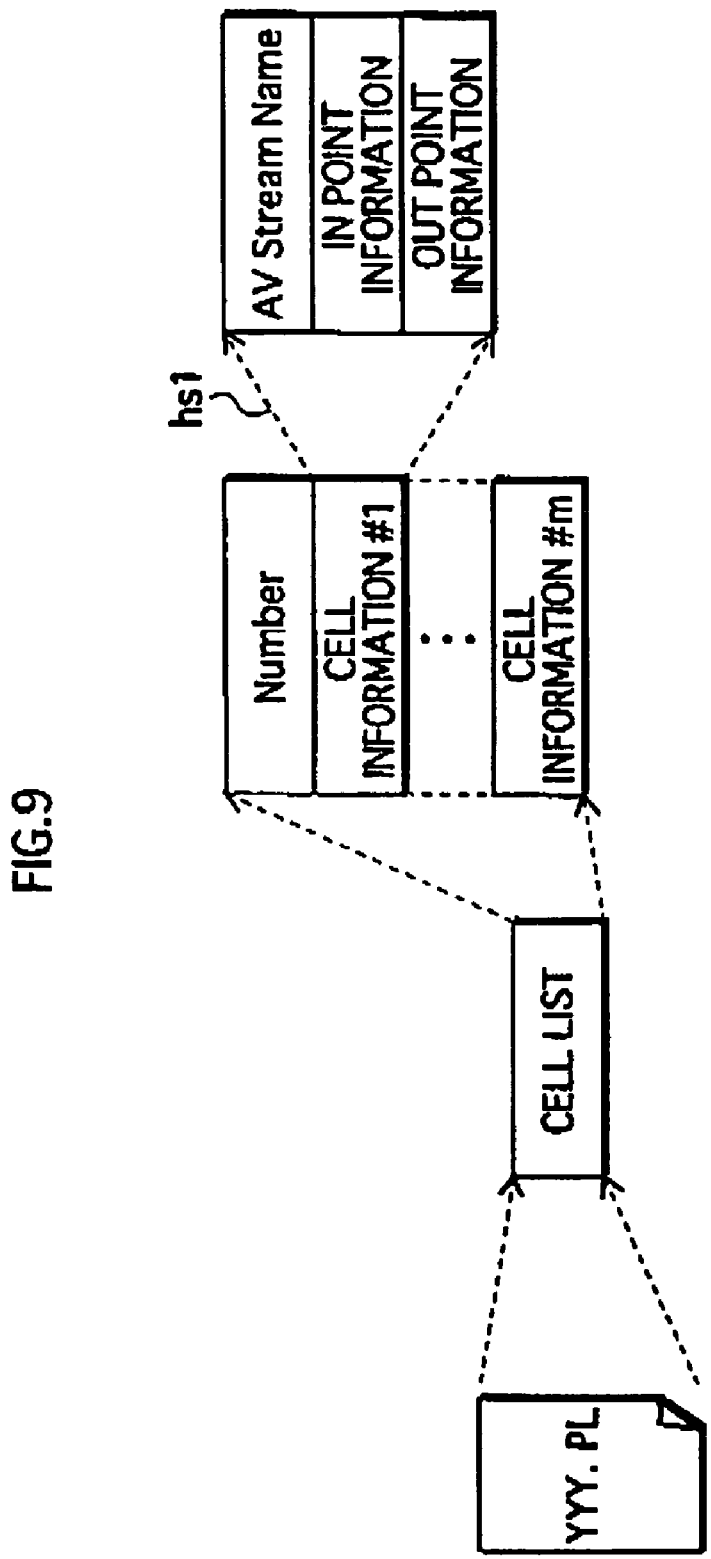
FIG. 9 shows the internal structure of PL information.

YYY.PL (PlayList information) is a table structuring a PlayList, which is a playback path, and comprises a CellList. FIG. 9 shows the internal structure of PL information.

The CellList includes a plurality of pieces of CELL information (CELL information #1, #2, #3, . . . #n) and a CELL information number (NUMBER). Each piece of CELL information is pointer information that defines one or more playback logical sections structuring a PlayList. The structure of CELL information is highlighted by the leader hs1. The CELL information is, as shown by the leader ha1, structured from an "AV Stream Name" showing the name of the AV stream to which the In-point and out-point of a playback section belong, "IN point information" showing the start of a playback section, and "Out point information", showing the end of the playback section.

Figure 10:
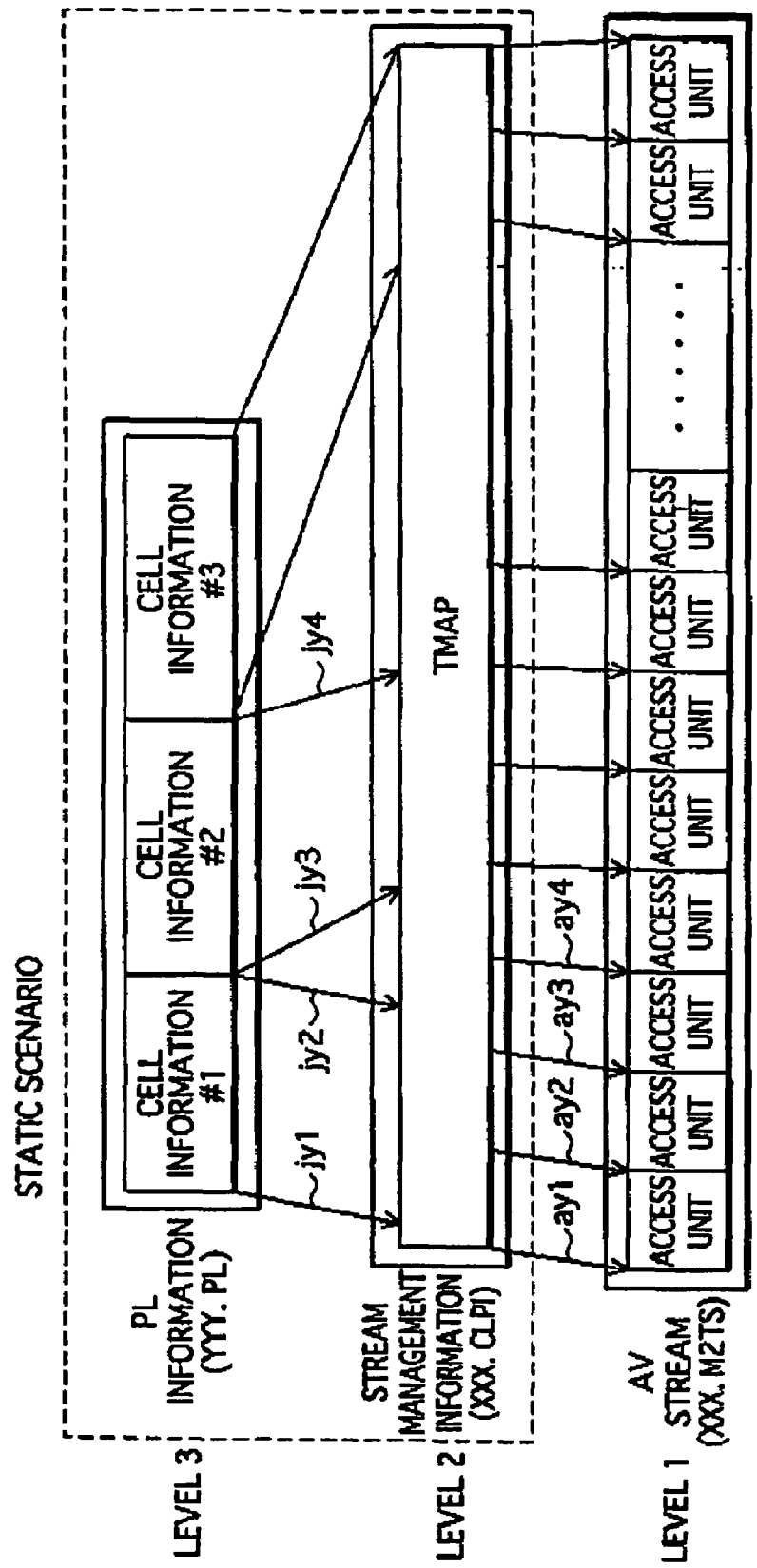
FIG. 10 schematically shows an indirect reference with PL information.

A characteristic of the CELL information is the notation. That is, playback sections are defined by an indirect referencing format that uses a time map as a reference table. FIG. 10 schematizes indirect referencing using PL information. The AV stream in the drawing is structured from a plurality of ACCESS UNITs. The TMAP in the stream management information specifies the sector addresses of the ACCESS UNITS, as shown by the arrows ay1, ay2, ay3, and ay4. Arrows jy1, jy2, jy3, and jy4 in the drawing schematically show the referencing of ACCESS UNITs using CELL information. In other words, this shows that referencing with the CELL information (the arrows jy1, jy2, jy3, and jy4) involves indirect referencing in which the addresses of ACCESS UNITs included in the AV stream are specified via the TMAP.

Figure 11:
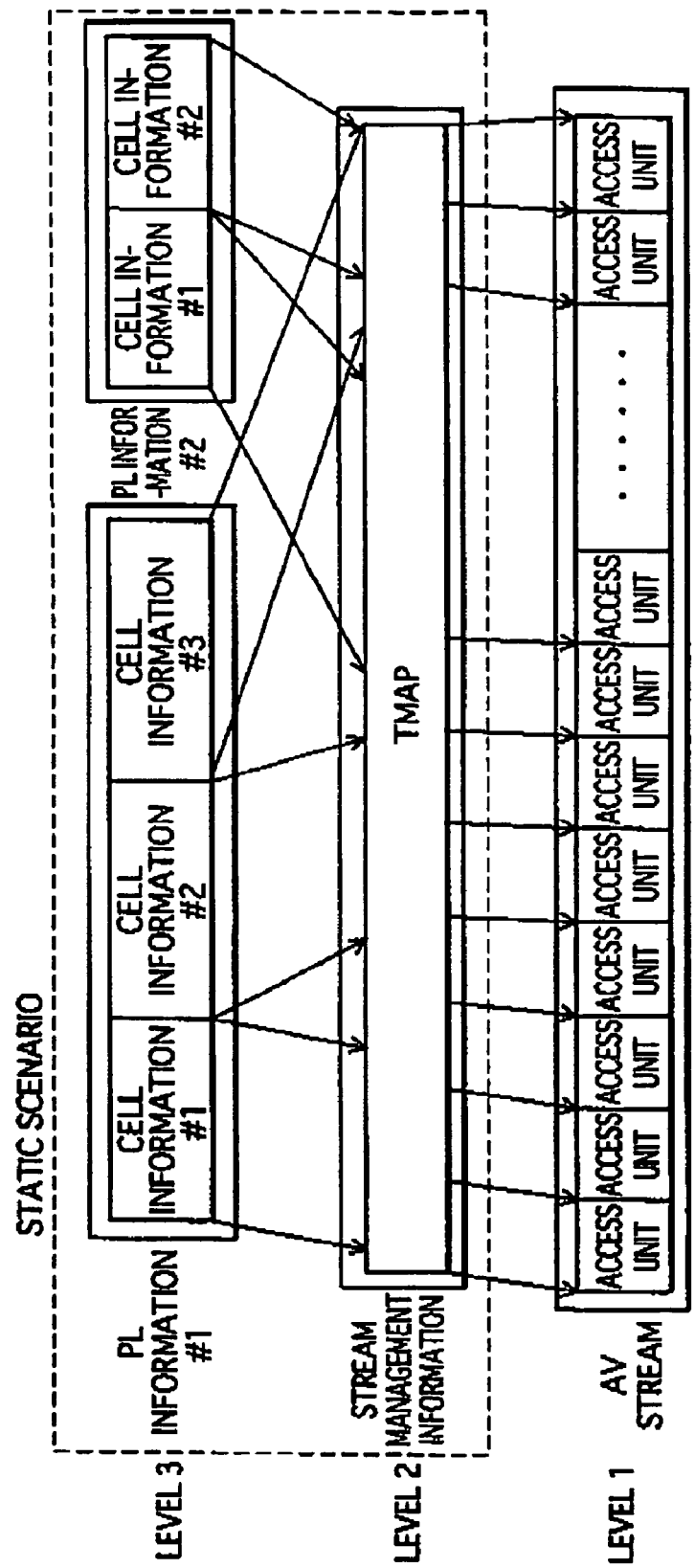
FIG. 11 shows an example in which a PL different from the PL shown in FIG. 10 is defined.

Playback sections on a BD-ROM formed from groupings of CELL information, stream management information, and AV stream are called "CELLs". Logical playback units on a BD-ROM that are formed from groupings of PL information, stream management information and AV stream are called "PlayLists" (abbreviated as "PL"). Movie productions recorded on a BD-ROM are structured in these logical playback units (PLs). Since movie productions on a BD-ROM are structured in logical playback units, it is possible to easily create, as distinct from the main movie production, movie productions from scenes in which only certain characters appear, for instance, by defining the PLS specifying only such scenes in which those characters appear. FIG. 11 shows an example in which a PL (the PL information #2) different from the PL information (the PL information #1) shown in FIG. 10 is defined.

The greatest merit of static scenarios is being able to increase the range of a moviemaker's expression, since the variations of a movie production increase simply by defining different pieces of PL information.

As another example of playback units on a BD-ROM, there are "chapters" besides PLs and CELLs. A "chapter" is constituted with one or more CELLS.

It should be noted that the file name "YYY" in PL information abstracts the 3-digit identification number provided for the PL information in the BD-ROM. That is, the PL information in the drawing is uniquely identified using the identification number "YYY". It should be noted that an identification number of PL information is expressed as "YYY" in order to indicate that the identification number of PL information has a different numbering system from the identification number XXX of AV streams and AV stream management information. (The 3-digit number referred to here is merely exemplary, and may be any length.)

Figure 12:
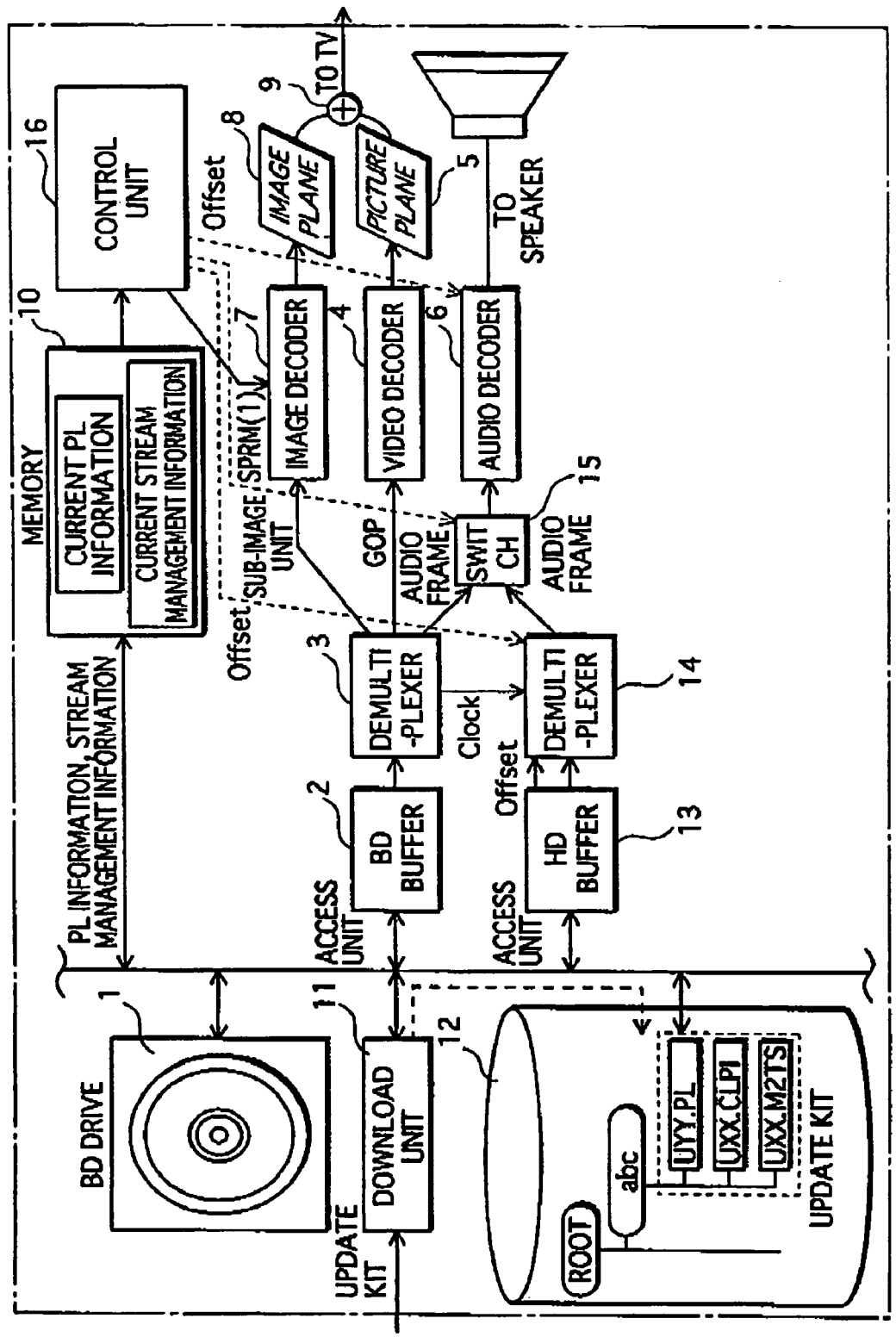
FIG. 12 shows the internal structure of the playback apparatus 200.

Thus, the description of the BD-ROM package is completed. The following describes the internal structure of the playback apparatus 200. FIG. 12 shows the internal structure of the playback apparatus 200. AS shown in the drawing, the playback apparatus 200 comprises a BD drive 1, a BD buffer 2, a demultiplexer 3, a video decoder 4, a picture plane 5, an audio decoder 6, an image decoder 7, an image plane 8, an adder 9, a static scenario memory 10, a download unit 11, a local HD 12, an HD buffer 13, a demultiplexer 14, a switch 15, and a control unit 16.

The BD drive 1 performs loading/ejecting of BD-ROMs, and accesses loaded BD-ROMs.

The BD buffer 2 is a FIFO memory, and ACCESS UNITs read from a BD-ROM are stored in a first-in-first-out manner.

The demultiplexer 3 takes ACCESS UNITs out of the BD buffer 2 and demultiplexes the ACCESS UNITs so as to obtain video frames and audio frames that constitute GOPs. The demultiplexer 3 outputs the video frames to the video decoder 4, the audio frames to the audio decoder 6, and the sub-image stream to the image decoder 7. The demultiplexing process performed by the demultiplexer 3 includes a conversion processing to convert TS packets into PES packets. The demultiplexing process performed by the demultiplexer 3 is to take PES packets, which are the payloads, out of TS packets constituting an AV stream that has been read from a BD-ROM, to then take the main-body data (including three kinds of data such as video frames, audio frames and sub-image units), which is the payload, out of the PES packets, and to output the main-body data to the video decoder 4, the audio decoder 6, and the image decoder 7, based on the TS packets attached to the TS packets. In a case where the PID (Packet ID) attached to a TS packet indicates a video stream, the main-body data of the PES packet is outputted to the video decoder 4. In a case where the PID indicates an audio stream, the main-body data is outputted to the audio decoder 6. The demultiplexing process of TS packets is performed with reference to a time stamp such as PCR (Program Clock Reference) or ATS (Arrival Time Stamp) that is attached to each TS packet. That is to say, when the clock inside the playback apparatus reaches the time indicated by the time stamp on a TS packet, the demultiplexer 3 demultiplexes the TS packet as described above.

The video decoder 4 decodes the video frames outputted from the demultiplexer 3 and writes pictures in an uncompressed format into the video plane 15.

The picture plane 5 is a memory for storing pictures in an uncompressed format.

The audio decoder 6 decodes the audio frames outputted from the demultiplexer 3 and outputs audio data in an uncompressed format.

The image decoder 7 expands sub-image streams that have been compressed and encoded and writes the expanded sub-image streams to the image plane 8. As a result of the decoding of the sub-image streams, menus and sub-images are displayed on a screen.

The image plane 8 is a memory having an area for one screen of image. Expanded sub-image streams are arranged on the image plane 8.

The adder 9 combines the picture data in an uncompressed format stored in the picture plane 5 with the expanded image in the image plane 8 and outputs the combined.

The static scenario memory 10 is a memory for storing "current PL information" and "current stream management information". "Current PL information" denotes a piece of PL information that is currently a target of processing, among a plurality of pieces of PL information recorded on a BD-ROM. "Current stream management information" denotes a piece of stream management information that is currently a target of processing, among a plurality of pieces of stream management information recorded on a BD-ROM.

The download unit 11 performs FTP (File Transfer Protocol) communication with the WWW server 500 and downloads an update kit from the WWW server 500 so as to write the downloaded update kit to the local HD 12.

The local HD 12 is a built-in disc device into which the update kit is written. In the drawing, a directory structure is drawn to fit inside the local HD 12. In the directory structure in the local HD 12, subordinate to the ROOT directory is disposed the directory "abc" in which the update kit is disposed. The directory name "abc" in the drawing is the same name as the volume label of the BD-ROM that corresponds to the update kit. That is to say, in the local HD 12, the update kit is recorded into the directory named "abc", which is the same name as the volume label "abc".

When downloading the update kit, the download unit 11 reads the volume label of the BD-ROM "abc" and generates a directory having the same name "abc" in the local HD 12. Subsequently, the download unit 11 accesses the www server 500, downloads the update kit, and writes the downloaded update kit to the directory "abc" having the directory name being the same as the volume label.

Inside the box with broken lines in the drawing shows the files constituting the update kit. As shown with the box with broken lines, the update kit is constituted with an additional AV stream "UXX.M2TS", additional stream management information "UXX.CLPI", and PL information for updating "UYY.PL".

The HD buffer 13 is a buffer into which one of the ACCESS UNITs constituting the additional stream (UXX.M2TS) recorded in the local HD 12 is read, every time one of ACCESS UNITS constituting the AV stream recorded on a BD-ROM is read into the BD buffer 2.

The demultiplexer 14 demultiplexes the ACCESS UNIT that is in an MPEG-TS format and has been read into the HD buffer 13 so as to obtain data before being multiplexed (In the case of the present embodiment, the data is audio frames).

The switch 15 selectively outputs, to the audio decoder 6, one of the audio frames in the access unit read into the BD butter 13 and the audio frames in the access unit read into the BD buffer 2. The switching between the outputs is performed by the switch 15 based on SPRM (1) (audio stream number). SPRM (1) is a register by which the status of the playback apparatus is shown.

The control unit 16 is a typical computer system that includes a CPU, a ROM storing programs, and a RAM. The control unit 16 realizes computation or processing of information that suits the purpose of usage through collaboration of the program and the hardware resources after the program stored in the ROM is read into the CPU. The purpose of usage may be, for example, (i) to play back PLs recorded on a BD-ROM, (ii) to download an update kit from the WWW server 500, (iii) to play back a virtual package in which a BD-ROM package and an update kit is combined. When a specific means in which a program and hardware resources (the BD drive 1-the switch 15) collaborate achieves computation or processing of information that suits the purpose of usage, a specific information processing apparatus (the playback apparatus 200) that suits the purpose of usage is structured.

The control unit 16 has a built-in register (player register) that shows the status setting of the playback apparatus 200. The player register has 32 System Parameter Registers and 32 General Purpose Registers. What is meant by the set values (SPRM) of the Player Status Registers are shown below. In the following section, SPRM(x) denotes a value set in an x'th Player Status Register.

SPRM(0): Reserved;
SPRM(1): The stream number of an audio stream to be decoded;
SPRM(2): The stream number of a sub-image stream to be decoded;
SPRM(3): The number for an angle setting by the user;
SPRM(4): The number of a title currently being a target of playback;
SPRM(5): The number of a chapter currently being a target of playback;
SPRM(6): The number of a PL currently being a target of playback;
SPRM(7): The number of a CELL currently being a target of playback;
SPRM(8): The time information indicating a current playback point of time;
SPRM(9): The count value of the navigation timer;
SPRM(10): The number of a button currently being selected;
SPRM(11)-SPRM(12): Reserved;
SPRM(13): A parental level setting by the user;
SPRM(14): Setting related to image playback by the playback apparatus;
SPRM(15): Setting related to audio playback by the playback apparatus;
SPRM(16): A language code indicating the audio setting on the playback apparatus;
SPRM(17): A language code indicating the subtitle setting on the playback apparatus;
SPRM(18): A language setting for menu drawing;
SPRM(19)-SPRM (31): Reserved Here, SPRM(10) is updated every time each piece of picture data belonging to an AV stream is displayed. That is to say, when the playback apparatus has a new piece of picture data displayed, SPRM(10) is updated to a value that indicates the display starting time (Presentation Time) of the new piece of picture data. By referring to SPRM(10), it is possible to find out the current playback point of time.

When setting SPRM, the control unit 16 displays a menu. This menu is for receiving an audio setting, a subtitle setting, an angle setting, and a parental setting from the user. When the user performs an operation on the menu, a value stored in a register is updated according to the operation on the menu. SPRM is updated not only via the menu, but also when the user performs an operation on the remote controller 400.

Thus, the description of the playback apparatus according to the present embodiment is completed.

The following describes AV streams, stream management information, and PT information in an update kit stored in the local HD 12.

Figure 13:
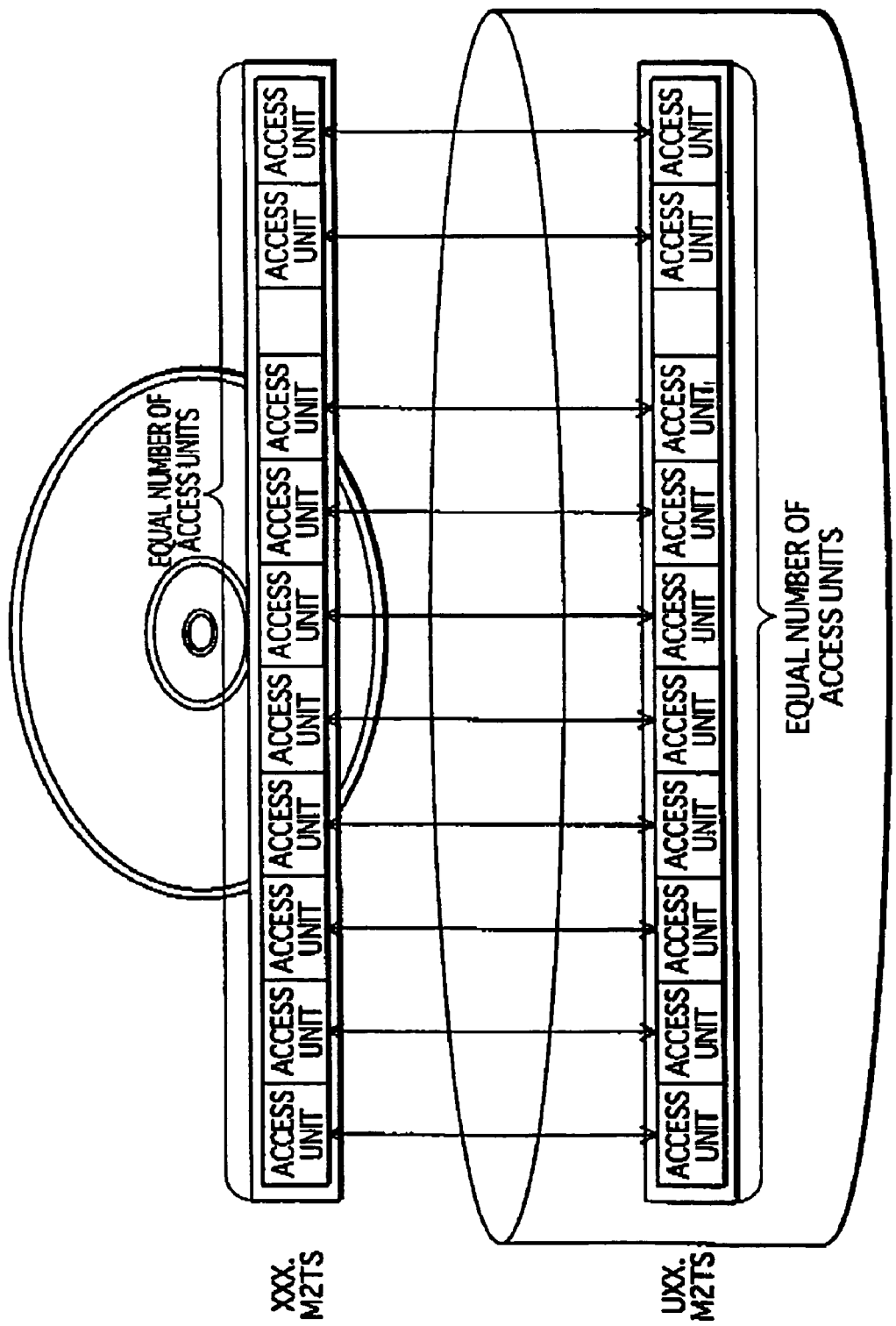
FIG. 13 shows in comparison an AV stream in a BD-ROM package and an AV stream in an update kit.

The AV stream (UXX.M2TS) in an update kit is for adding new audio to the AV stream recorded on a BD-ROM. FIG. 13 shows in comparison an AV stream in a BD-ROM package and an AV stream in an update kit. The AV stream in an update kit is made up of ACCESS UNITs that are equal in number to the ACCESS UNITs that make up an AV stream in a BD-ROM package.

Figure 14:
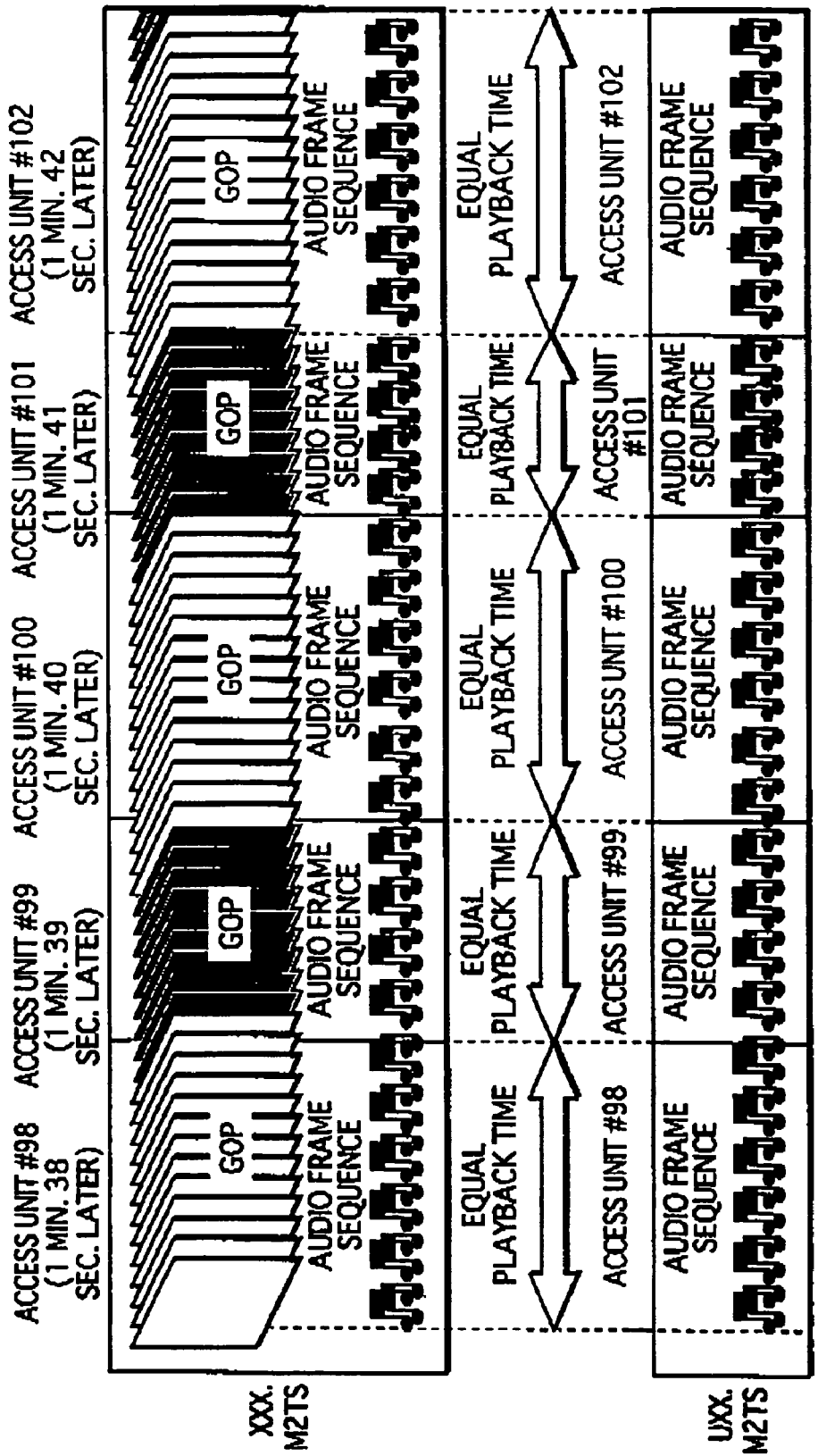
FIG. 14 shows in comparison the substance of an ACCESS UNIT in a BD-ROM package (XXX. TS) and the substance of an ACCESS UNIT in an update kit (UXX. TS)

FIG. 14 shows in comparison the substance of an ACCESS UNIT in a BD-ROM package (XXX.TS) and the substance of an ACCESS UNIT in an update kit (UXX.TS). The upper level of FIG. 14 is an ACCESS UNIT on a HD-ROM. The lower level is an ACCESS UNIT in an update kit. In the drawing, the ACCESS UNITs #98, #99, #100, #101, and #102 are to be played back 1 minute and 38 seconds, 1 minute and 39 seconds, 1 minute and 40 seconds and 1 minute and 41 seconds after the beginning of the playback of the AV stream, respectively. (In this example, the playback time of one ACCESS UNIT is approximated to one second).

As we focus on the ACCESS UNITS, the ACCESS UNIT #100 on the BD-ROM side includes a GOP to be played back at 1 minute and 40 seconds and an audio frame sequence (musical note symbols in the drawing) to be read at that time. On the other hand, the ACCESS UNIT #100 on the update kit side includes an audio frame to be played back at 1 minute and 40 seconds. The white bold arrow in the drawing shows the playback time of each ACCESS UNIT. The playback time is different from one ACCESS UNIT to another because since the playback time of each ACCESS UNIT is based on the GOP. Each of the ACCESS UNITs in an update kit has a playback time that is the same as the corresponding ACCESS UNIT recorded on the BD-ROM.

Because of an arrangement wherein the AV stream in the update kit includes ACCESS UNITS which are equal in number to the ACCESS UNITS in the AV stream recorded on the BD-ROM, and wherein the ACCESS UNITs in the AV stream in the update kit includes audio frames having the equal time length to the audio frames included in the ACCESS UNITs recorded on the BD-ROM, the ACCESS UNITs in the AV stream recorded on the BD-ROM are in one-to-one correspondence with the ACCESS UNITs in the AV stream in the update kit. Thus, the description of the AV stream in the update kit is completed. The following describes the stream management information in the update kit.

Figure 15:
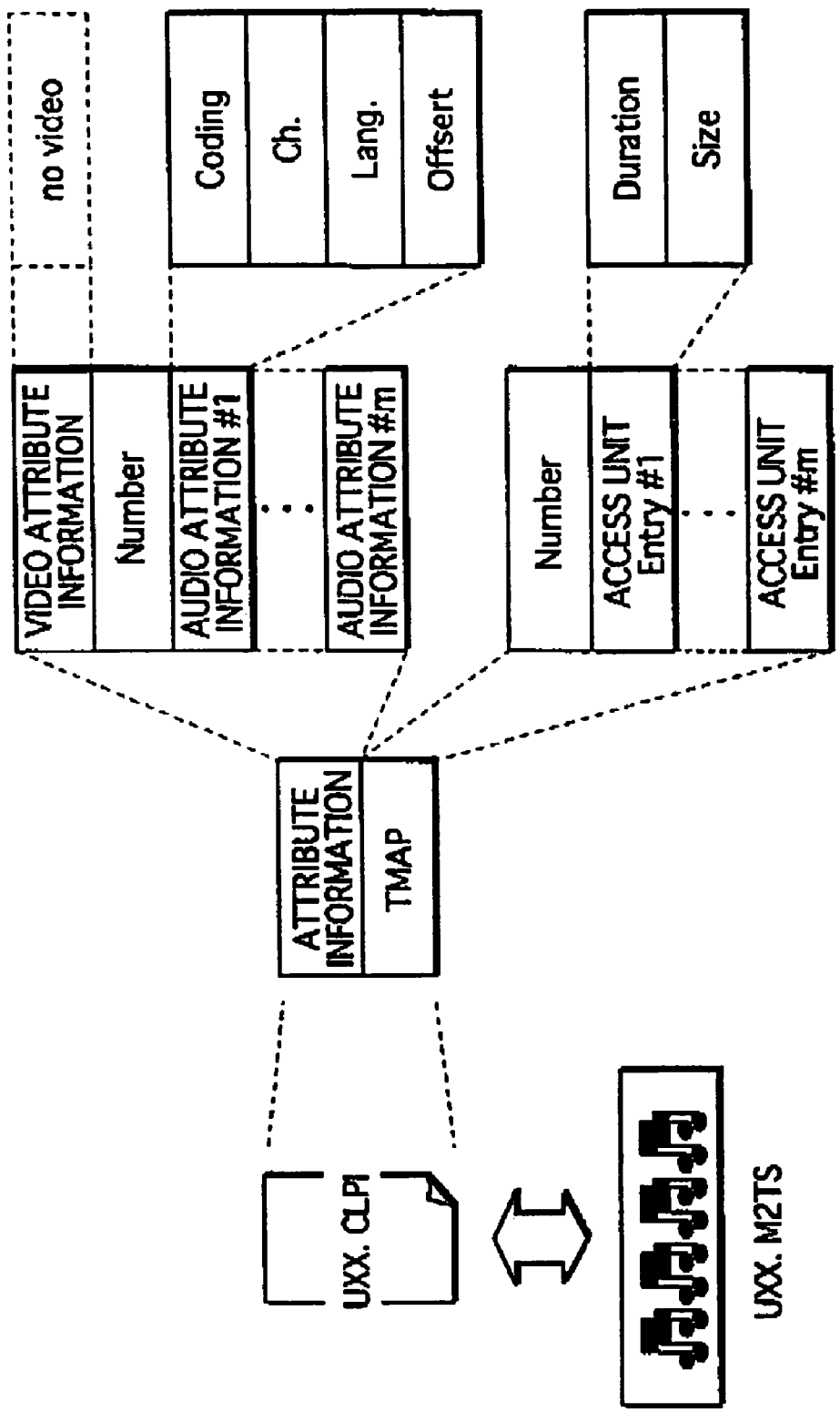
FIG. 15 shows stream management information in an update kit.
Figure 16:
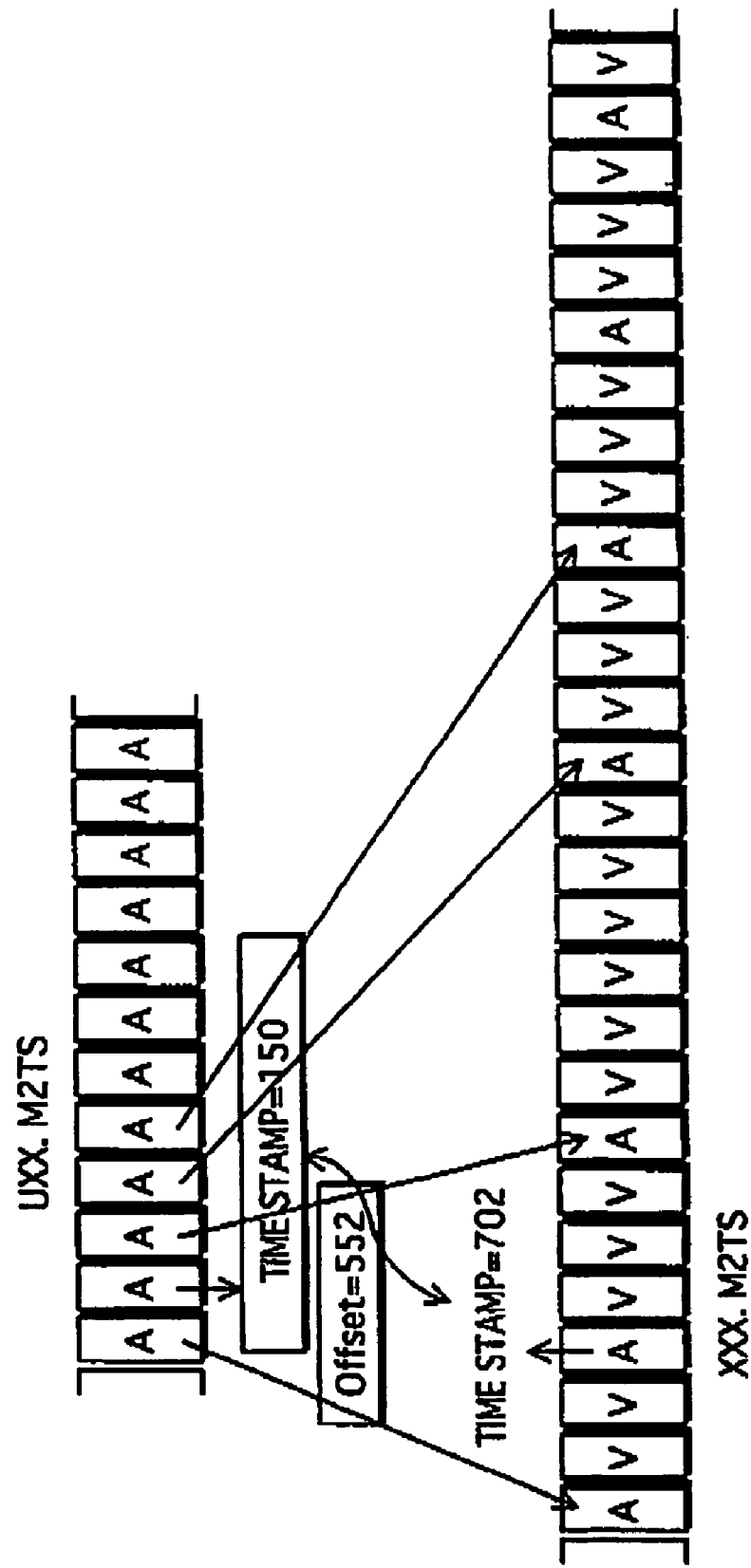
FIG. 16 shows in comparison packets that constitute an ACCESS UNIT on a BD-ROM and packets that constitute an ACCESS UNIT in an update kit.

The stream management information in the update kit (UXX. CLPI) is related to AV streams with only audio and is supplied by the WWW server 500 along with the AV stream with only audio. FIG. 15 shows stream management information in an update kit. This stream management information also has a TMAP, like the one shown in FIG. 8, in which the data size and the starting time of each ACCESS UNIT are described. Since a TMAP that is similar to the one for the AV stream recorded on the BD-ROM exists, the AV stream in the update kit can be cued in ACCESS UNITS. The stream management information is different from different from the stream management information in FIG. 8 in that, since no video stream is multiplexed, (i) the video attribute is set as "no video" and (ii) "Offset" is added to the audio attribute. The following explains "Offset" added to the audio attribute, with reference to FIG. 16. FIG. 16 shows in comparison packets that constitute an ACCESS UNIT on a BD-ROM and packets that constitute an ACCESS UNIT in an update kit. In the drawing, "V" denotes a video packet, and "A" denotes an audio packet. A time stamp is given to each of these packets. The time stamp is time information for informing the playback apparatus of the processing timing, i.e. when processing should be performed. A time stamp with the value "702" is given to an audio packet positioned first in an ACCESS UNIT in the AV stream released on a BD-ROM. Time stamps with larger values such as "703", "704", "705", "706" and so on are given to the audio packets that follow this audio packet. On the other hand, a time stamp with the value "150" is given to an audio packet positioned first in an ACCESS UNIT in an AV stream in the update kit. Time stamps with values such as "151", "152", "153", "154", "155" and so on are given to the audio packets that follow this audio packet, so that the more later the audio packet is positioned, the larger the value of the time stamp is.

There are differences between the time stamps because of the difference between the master clocks at the times of encoding, The master clocks are clock signals which are referred to at the time of encoding in order to give a time stamp. Because of this reference to each master clock, the plurality of audio packets in an AV stream have time stamps that have serial values attached. However, when an AV stream in the update kit and an AV stream recorded on the SD-ROM are compared, the master clocks to be referred to as the time stamps are given are different between the former case and the latter case. Thus, the values of the time stamps given to the respective audio packets are naturally different between those cases. Since the time stamps on the audio packets included in the respective ACCESS UNITs are largely different, it is not possible to switch between the audios in those two AV streams, as the way they are. Accordingly, the differences between the time stamps are described in "Offset" in the stream management information.

Because the offsets are described in the stream management information, even if the master clock to be referred to is different, it is possible to play back, in synchronization, the audio packets in the AV stream recorded on the BD-ROM with the audio packets in the AV stream in the update kit. Thus, the description of the stream management information in the update kit is completed. The following describes the PL information in the update kit (UYY. PL).

Figure 17:
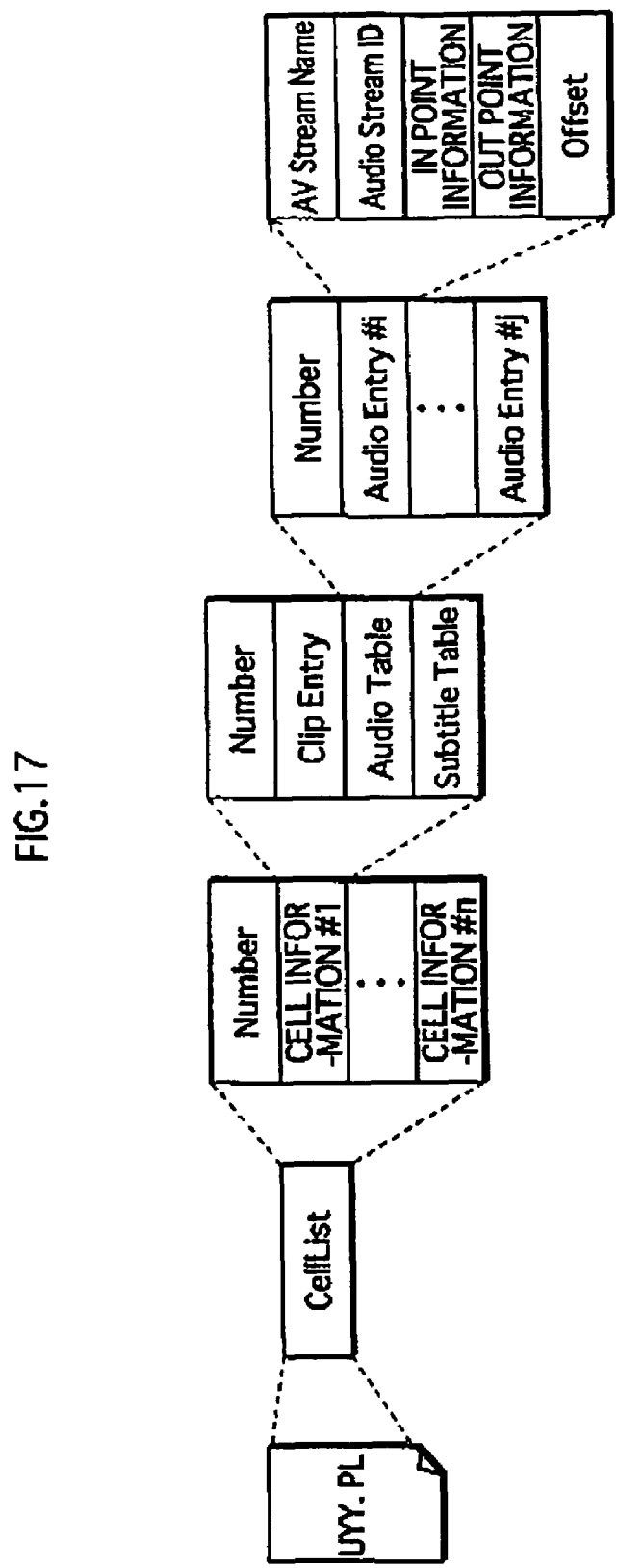
FIG. 17 shows the internal structure of PL information (UYY.PL)

The PL information in the update kit (UYY. PL) is to be used in place of the PL information on the BD-ROM. The PL information in the update kit is different from the PL information recorded on the BD-ROM in that the PlayLists in the PL information are defined by arranging a bundle of playback sections in accordance with the order in which they are played back. "A bundle of playback sections" means playback sections that are defined on a plurality of AV streams and are to be played back in synchronization with one another. FIG. 17 shows the internal structure of PL information (UYY.PL). Each piece of CELL information in FIG. 17 is constituted with "Clip Entry" indicating the AV stream on the BD-ROM, "Audio Table", "Subtitle Table" and "Number" indicating the number of Clip Entries.

"Clip Entry" includes "AVStream Name", "In point information", and "out point information" of the CELL information on the BD-ROM. They are the same as the "Cell Entries" of the CELL information shown in FIG. 9. The Audio Table is made up of a plurality of Audio Entries (Audio Entries #1-#n). Each of the Audio Entries defines (i) which stream is an audio stream that can be played back in the CELL, (ii) to which AV stream, the audio stream belongs, and (iii) from where to where in the stream forms a playback section, using the file name of the AV stream (AVStream Name), the identifier of the audio stream (Audio Stream ID), the information indicating the starting point of the playback section in the AV stream (In point information), the information indicating the ending point of the playback section in the AV stream (Out point information), and the offset (Offset).

For example, the AV stream #1 is recorded on the BD-ROM, and the AV stream #2 is downloaded by the playback apparatus as an update kit and stored in the local HD 12. As additional information, it is assumed that the AV stream #1 includes moving pictures (video) and English audio, whereas the AV stream #2 includes Japanese audio, which is a second language. The Japanese audio is stored in an AV stream being different from the one in which the video is stored, so that it is possible to distribute the Japanese audio in an update kit. In such a case, it is arranged so that Clip Entry #1 in the Cell defines the playback section on the AV stream #1, and Audio Entry #1 describes the AV Stream Name and the Audio Stream ID for the AV stream that is for the Japanese audio. By distributing the piece of PL information that includes CELL information described as above along with AV stream #2 from the WWW server 500 and combining the PlayLists recorded on the BD-ROM, it is possible to enable users to view a movie production in a version with the Japanese audio.

Figure 18:
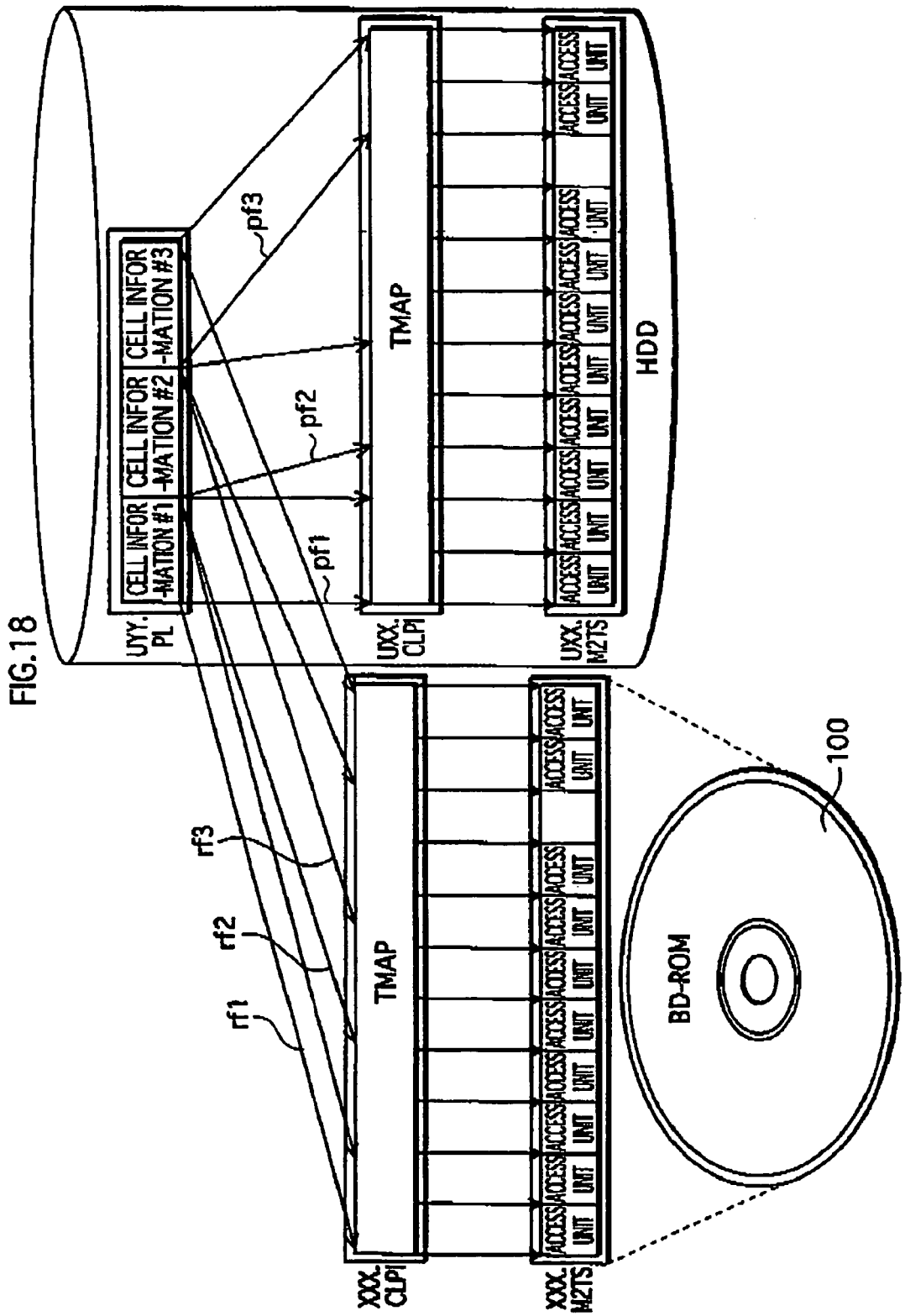
FIG. 18 shows an indirect reference with UYY.PL, describing in the same manner as FIG. 10.

FIG. 18 shows an indirect reference with UTT.PL, describing in the same manner as FIG. 10. In the drawing, the PL information in the update kit has Clip Entry and Audio Entry. The arrows rf1, rf2, and rf3 in the drawing indicate the specifications of playback sections with Clip Entries. The arrows pf1, pf2, and pf3 in the drawing indicate the specifications of playback sections with Audio Entries. In other words, each of pieces of CELL information constituting the PL information in FIG. 16 specifies two playback sections in the two AV streams. Because one piece of CELL information specifies two playback sections, the PL information is able to define a playback path that is made up of a bundle of playback sections that area playback section on the BD-OM and a playback section in the HD. Thus, the description of the update kit stored in the local HD 12 is completed.

The letter "U" is used in the file names of AV streams, the stream management information, and the PL information in an update kit, namely "UXX.M2TS", "UXX.CLPI", "UYY.PL", merely for convenience sake and for the purpose of distinguishing the AV streams, the stream management information, and the PL information in the update kit from those on the BD-ROM. In actuality, AV streams, the stream management information, and the PL information in an update kit have the file names that are the same as the ones on the BD-ROM. The data on the update kit and the data on the BD-ROM are brought into correspondence with each other with the use of the file names, To bring an AV stream recorded on the BD-ROM (an optical disc) and an AV stream in an HD (a secondary recording medium) into correspondence means (i) to bring them into correspondence with the use of PL information included in the update kit and (ii) to bring them into correspondence with the use of sameness between the file names of the files included in an update kit and the file names of the files recorded on the optical disc.

The following describes the demultiplexing process performed by the demultiplexer 14 in a case where an AV stream in an update kit is read. The demultiplexing process performed by the demultiplexer 14 is to take PES packets, which are the payloads, out of TS packets constituting an AV stream that has been read from an HD, to then take the main-body data, which is the payload, out of the PES packets, and to output the main-body data to the audio decoder 6, according to the time stamp attached to each TS packet. The demultiplexing processing is performed by the demultiplexer 14 with reference to a time stamp, such as PCR (Program Clock Reference) or ATS (Arrival Time Stamp), that is attached to each TS packet and the offsets included in the stream management information. When a clock inside the playback apparatus reaches the time obtained by adding an offset to the time indicated by a time stamp on a TS packet, the demultiplexer 14 demultiplexes the TS packet, as described above. The time obtained by adding the offset to the time indicated by the time stamp is the same as the time obtained by adding the values of the times stamps on the TS packets read from BD-ROM. Accordingly, as a result of the processing performed by the demultiplexer 14 described above, the demultiplexing of the TS packets read from the BD-ROM are in synchronization with the demultiplexing of the TS packets read from the HD.

The following describes the synchronization processing performed by the audio decoder 6 in the case where the audio stream in the update kit is read from the local HD 12. When decoding audio frames read from a BD-ROM, the audio decoder 6 refers to PTSs (Presentation Time Stamps) attached to PES packets. That is to say, when the clock inside the playback apparatus reaches the time indicated by a PTS on a PES packet, the audio decoder 6 decodes the audio frames. On the other hand, when decoding audio frames read from the HD, the audio decoder 6 refers to PTSs (Presentation Time Stamps) attached to PES packets and the offsets in the stream management information. That is to say, when the clock inside the playback apparatus reaches the time obtained by adding an offset to the PTS attached to a PES packet, the audio decoder 6 decodes the audio frames. The time obtained by adding an offset to the time indicated by a PTS is substantially the same as the time indicated by a PTS attached to the video packet read from the BD-ROM. Accordingly, as a result of the processing performed by the audio decoder 6 described above, the playback outputs for the video frames read from the BD-ROM are in synchronization with the playback outputs for the audio frames read from the HD. The synchronization between the audio and the image is maintained due to the processing performed by the demultiplexer 14 and the audio decoder 6 described above.

The data is read from the BD-ROM and from the HD in units of ACCESS UNITs; however, the data is supplied from the demultiplexer 3 and from the demultiplexer 14 to the audio decoder 6, with no regard to ACCESS UNITS. The reason is because the demultiplexing processing performed by the demultiplexer 3 and the demultiplexer 14 is to convert an ACCESS UNIT which is a TS packet sequence into a PES packet sequence and to convert them into audio frames and video frames: therefore, the data is supplied to the audio decoder 6 in units of frames that are included in each PES packet or each TS packet. Since PES packets and TS packets are the units of processing, when a part of an audio frame is included in a PES packet, the included part is outputted to the audio decoder 6. When a plurality of audio frames are included in a PES packet, the plurality of audio frames are supplied to the audio decoder 6. The audio decoder 6 first stores those supplied audio frames or part of an audio frame into a built-in memory within the audio decoder 6 and then processes them. There would be a problem with the case where an audio frame is divided into portions and stored into a plurality of ACCESS UNITS. The following discussion is based on an assumption that the first half of an audio frame is stored in a TS packet sequence constituting an ACCESS UNIT and the second half of the audio frame is stored In a TS packet sequence constituting the following ACCESS UNIT.

It is not rare that one audio frame is divided into portions and stored into a plurality of access UNITs. During the demultiplexing process onto AV streams, this could happen on a regular basis. The reason for this is that since the data size of a payload of a PES packet is a non-integer multiple of the data size of an audio frame, there is always some part of audio frame that cannot fit into one TS packet or one PES packet.

The following discusses the case where an audio switching processing is performed due to an update of SPRM(1), after the PES packet in which the first half of the audio frame is stored is demultiplexed and outputted to the audio decoder 6, but before the PES packet in which the second half of the audio frame is stored is demultiplexed. In such a case, to the audio decoder 6, after the first half of the audio frame is supplied, another audio frame from another audio stream is to be supplied. Although the audio decoder 6 has obtained the first half, the audio decoder 6 is not able to obtain the second half; therefore, the audio decoder 6 is not able to properly perform the decoding, and there is a possibility that the user experiences an unpleasant noise such as "thunk". In order to prevent this from occurring, it is necessary to employ a mute processing on the playback output from the audio decoder 6 for a short period of time after the audio is switched. As a result of this mute processing, although there will be a little "no-sound" period immediately after the audio is switched, it becomes possible to freely switch audio, for example, from the audio on the BD-ROM to the audio on HD, or from the audio on the MD to the audio on the BD-ROM.

At last, the following describes more in detail the control procedure performed by the control unit 16 of the present embodiment.

Figure 19:
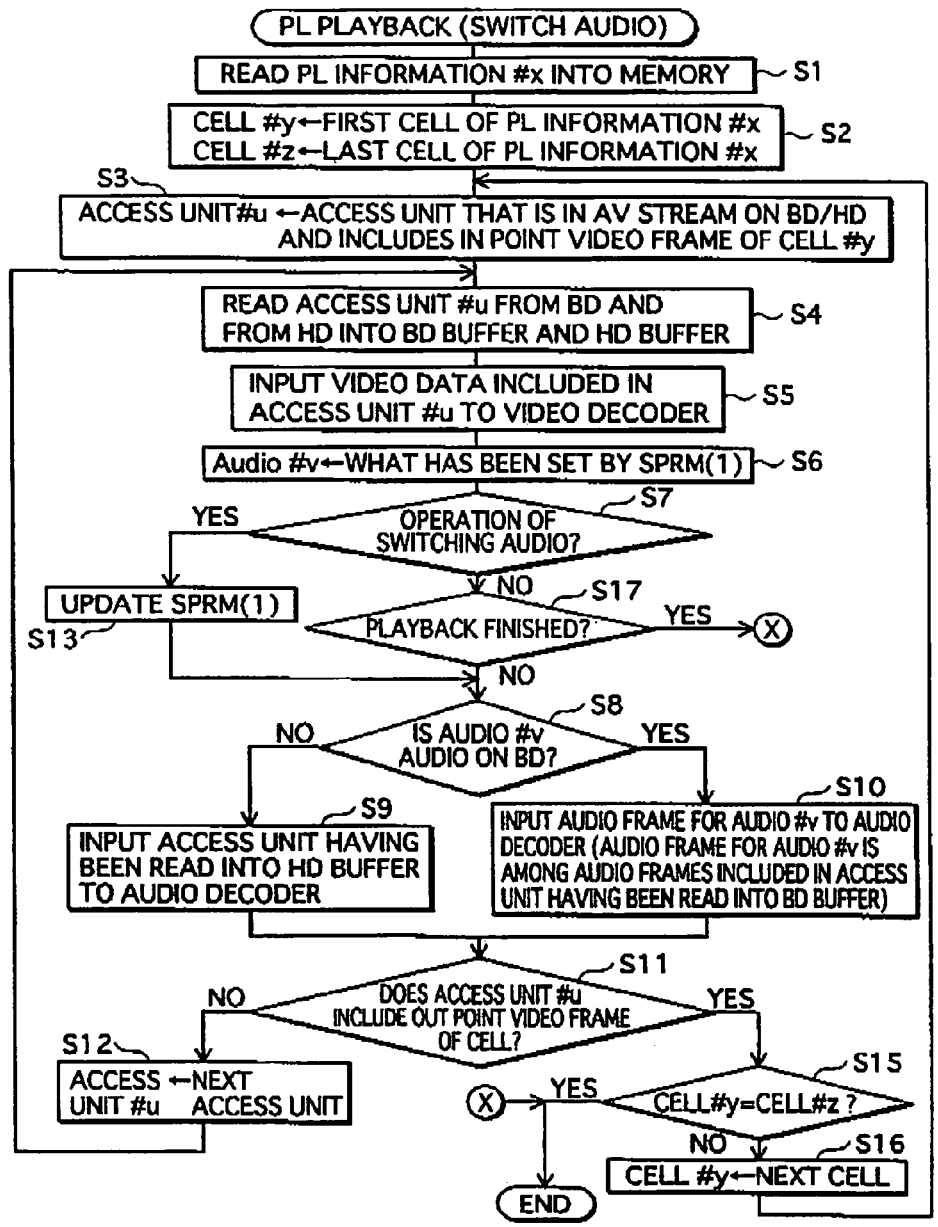
FIG. 19 is a flowchart that shows the processing procedure performed by the control unit 16 according to the first embodiment.

When a BD-ROM is mounted to the playback apparatus 200, the control unit 16 reads a volume label from the BD-ROM and specifies a directory that matches the read volume label among a plurality of directories in the local HD 12. The processing after that is performed on a basis that the files in the specified directory represent an update kit. The processing is realized by having a computer execute the processing procedure shown in the flow chart in FIG. 19.

The flow chart forms a loop processing in which the processing from Steps S2 through S16 is repeated for each of the CELLS belonging to the PL #x. Now, the CELL being the processing target will be referred to as "CELL #y" which is a CELL at a y'th position in a PL. To be specific, the PL information #x is read into the memory (Step S1). The first CELL of the PL information #x is set as the CELL #y, and the last CELL of the PL information #x is set as the CELL #z (Step S2). Subsequently, the ACCESS UNITS belonging to the CELL #y is read from the SD-ROM and from the local HD 12 in parallel, and the video decoder 4 and the audio decoder 6 are instructed to decode the ACCESS UNITs (Step S3 to Step S12). When all the ACCESS UNITs in the CELL have been decoded (Step S11: YES), it is judged whether the CELL #y has reached the CELL #z (Step S15), and the next CELL is set as CELL #y (Step S16).

Among Steps from S3 to S16, Steps S4 through S12 represent a loop processing for reading each of the ACCESS UNITS belonging to the CELL #y from the ED-ROM and from the local HD 12. In this loop processing, the ACCESS UNIT to be a reading target will be referred to as "ACCESS UNIT #U" which is an ACCESS UNIT at a u'th position in an AV stream. In Step S3, prior to the loop processing in Steps S4 through S12, the ACCESS UNITs that are in the AV streams on the BD-ROM and in the RD and each include the In point video frame of the CELL #y are set as the ACCESS UNITs #u.

The loop processing in Steps S4 through S12 is to repeat the processing as follows: to read the ACCESS UNITS #u from the BD-ROM and from the ED into the BD buffer 2 and into the ED buffer 13, respectively (Step S4), and to input the video frames constituting each ACCESS UNIT #u to the decoder (Step S5), and after Steps S6 and S7, to input the audio frames constituting each ACCESS UNIT #u to the decoder (Step S8 through Step S1).

The reading of an ACCESS UNIT from the BD-ROM and the reading of an ACCESS UNIT from the HD do not have to be performed at the same time. The reading from one of them may be earlier or later than the reading from the other. The reason for this is that (i) since the ACCESS UNITs read from the BD-ROM and from the HD are once stored in the BD buffer 2 and the HD buffer 13 so that the speed is adjusted, and (ii) the demultiplexing processing performed by the demultiplexer 3 and the demultiplexer 14, and the decoding processing performed by the video decoder 4 and the audio decoder 6 are performed in synchronization.

When data is read from the BD-ROM to the BD buffer 2, the control unit 16 monitors the amount of the data stored in the SD buffer 2 so that when the amount of the data stored is insufficient, more ACCESS UNITs are read from the BD-ROM to the BD buffer 2 to avoid the insufficiency. Also for the HD, the reading is controlled in accordance with the amount of the data stored in the buffer.

The audio switching processing performed in Steps S0 through S10 is to, in accordance with the audio setting from the user, input, to the audio decoder 6, the audio frames in the ACCESS UNIT having been read into the BD buffer 2 (Step S9), or to input the audio frames in the ACCESS UNIT having been read into the HD buffer 13 (Step S10). The variable "Audio #v" in the drawing represents the audio set in SPRM (1) by the user. With regard to the variable "Audio #v", in the case where the user performs an operation for switching the audio (Step S7: YES), SPRM(1) is updated (Step S13).

In the case where the variable "Audio #v" indicates an audio stream on the BD-ROM side (Step S8: YES), among the audio frames in the ACCESS UNIT having been read into the SD buffer 2, the audio frame that corresponds to the variable "Audio #v" is inputted to the decoder (Step S9). In the case where the variable "Audio #v" indicates an audio stream on the local HD 12 side (Step SB: NO), the audio frames in the ACCESS UNIT in the HD buffer is inputted to the decoder (Step S10).

In Step S11, it is judged whether the condition for ending the loop processing is met. In the case where the ACCESS UNIT #u includes the Out point video frame of the CELL (Step S11: YES), the loop processing will be repeated. When the requirement in this step is not met, the next ACCESS UNIT in the AV stream is set as the ACCESS UNIT #u (Step S12), and the procedure returns to Step S4. Step S15 is a judgment step which is to be executed in a case where the processing in Steps S3 through S12 is repeated for ACCESS UNITs belonging to one piece of CELL information. In Step S15, it is judged whether or not the CELL information #y being the current processing target is the last CELL information #z. In the case where the CELL information #y being the current processing target is not CELL #z, the next CELL is set as the CELL #y (Step S16). Then, the procedure advances to step s3 so that the processing in Steps S3 through S15 is performed on the ACCESS UNITs belonging to the CELL #y.

Figure 20:
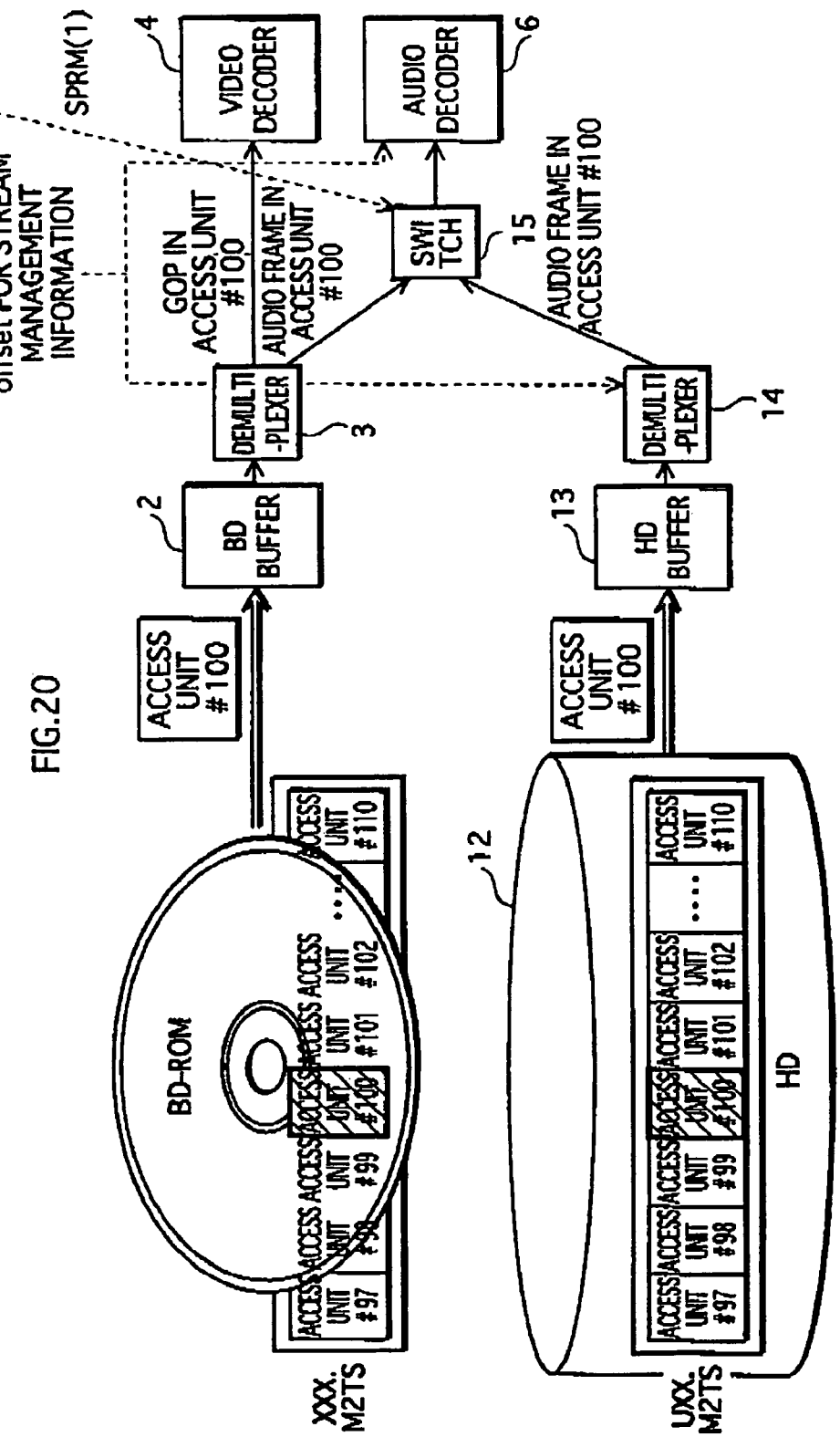
FIG. 20 shows the reading process in Steps S4 through S11.

FIG. 20 shows the reading process in Steps S4 through S11. In the drawing, the ACCESS UNITs #100 are read from the BD-ROM and from the local HD 12 into the BD buffer 2 and into the HD buffer 13 in Step S4. The switch 15 outputs the ACCESS UNIT #100 from the BD buffer 2 to the audio decoder 6 according to the judgment in Step S8. The switch 15 switches between (a) outputting the audio frames in the ACCESS UNIT #100 from the BD buffer 2 to the audio decoder 6 and (b) outputting the audio frames in the ACCESS UNIT #100 from the HD buffer 13 to the audio decoder 6, according to the SPRM (1).

Figure 21:
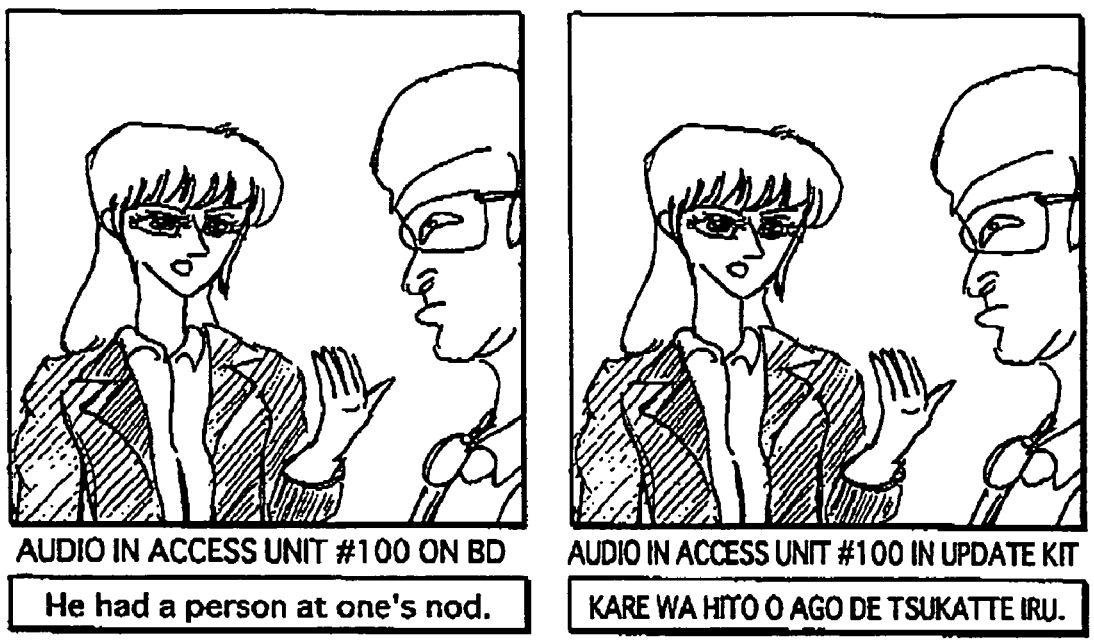
FIG. 21 shows what kind of audio playback is achieved as a result of the output switching shown in FIG. 20.

FIG. 21 shows what kind of audio playback is achieved as a result of the output switching shown in FIG. 20. In the case where the switch 15 outputs the ACCESS UNIT from the BD-ROM to the audio decoder 6, playback is achieved as shown on the left side of FIG. 21, i.e. the playback is accompanied by an English line "He had a person at one's nod". On the other hand, in the case where the switch 15 outputs the ACCESS UNIT from the HD to the audio decoder 6, playback is achieved as shown on the right side of FIG. 21, i.e. the playback is accompanied by a Japanese dubbed audio "Kare wa hito o ago de tsukatte iru".

As explained above, according to the present embodiment, ACCESS UNITs that are in one-to-one correspondence with each other are read in parallel from the BD-ROM and from the local HD 12, and the decoder is instructed to selectively play back one of these ACCESS UNITs, therefore, switching of the audio is realized. Creators of a movie production are able to, even after the movie production is distributed on a BD-ROM, supply additional audio to users by distributing it via the WWW server 500.

Further, since the update kit includes only additional audio, even if a public circuit exists between the playback apparatus 200 and the WWW server 500, the time required for downloading the update kit is short.

It should be noted that, in the first embodiment, a built-in HD inside the playback apparatus is used for storing the update kit; however, it is acceptable that the update kit is stored in a portable recording medium.

Second Embodiment

Figure 22:
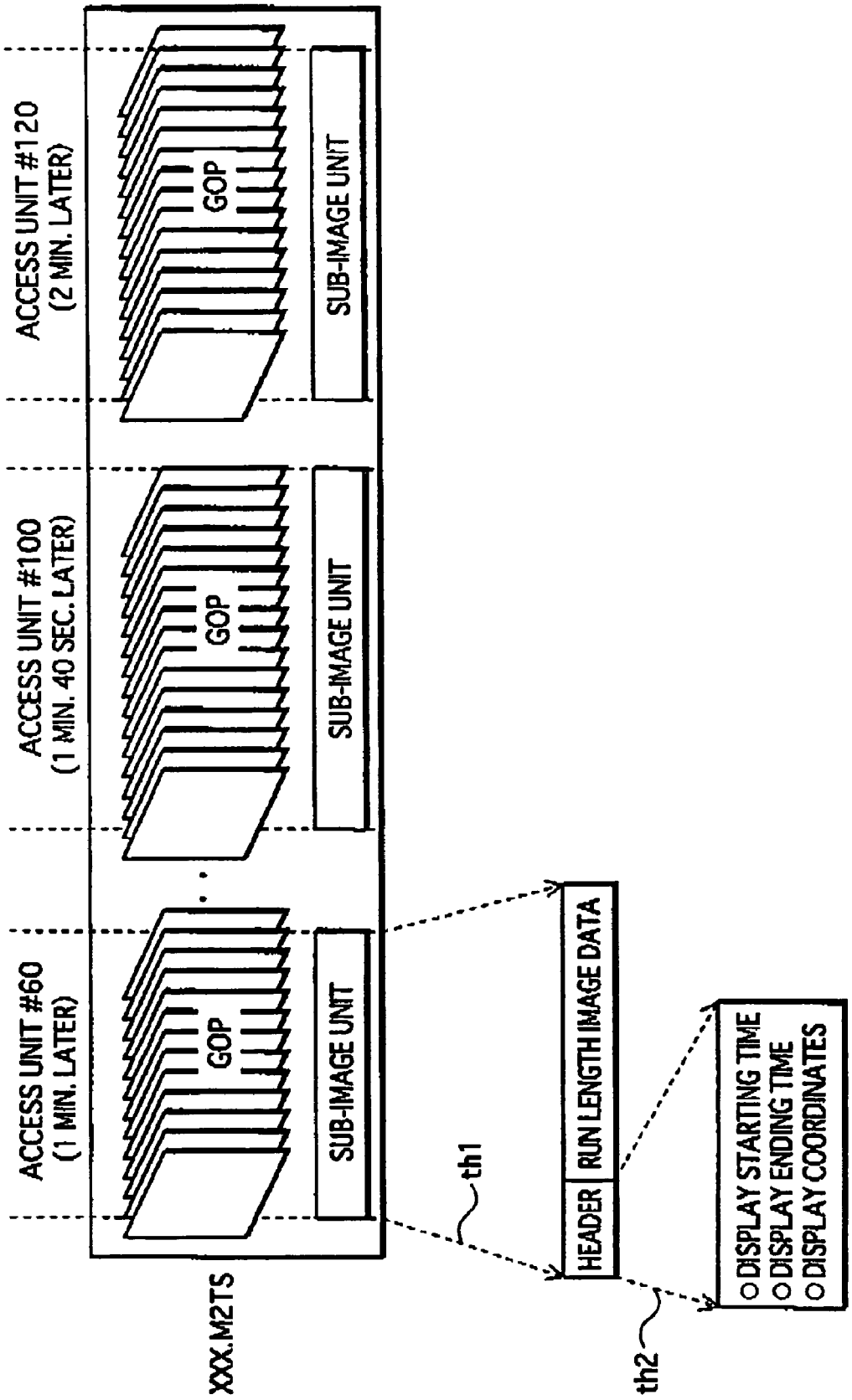
FIG. 22 shows how an ACCESS UNIT is structured in an AV stream according to the second embodiment.

The second embodiment is related to an improvement for the case where a sub-image stream is added to an AV stream recorded on a BD-ROM. The following describes a sub-image stream recorded on a BD-ROM and an update kit for realizing addition of a sub-image stream. On a BD-ROM, a sub-image stream is multiplexed with a video stream and an audio stream so as to constitute an AV stream, as shown in FIG. 6. FIG. 22 shows how an ACCESS UNIT is structured in an AV stream according to the second embodiment. The ACCESS UNITs according to the second embodiment each include a GOP and a sub-image unit. The leaders with broken lines th1 highlight the internal structure of a sub-image unit in each ACCESS UNIT. A sub-image unit is made up of a header and run length image data. IN the drawing the leaders th2 highlight the internal structure of the header, The header includes "the display starting time/the display ending time", of the run length image data on a PL playback temporal axis and "the display coordinates" on the display screen.

The sub-image stream in an update kit is supplied to the playback apparatus as being stored in an AV stream. To be more specific, an AV stream in the update kit according to the present embodiment is for the purpose of adding a sub-image to the AV-stream recorded on the BD-ROM. Like the first embodiment, the AV stream in the update kit is made up of ACCESS UNITs that are equal in number to the ACCESS UNITs in an AV stream in a BD-ROM package. Each ACCESS UNIT includes a sub-image unit but does not include a GOP.

Figure 23:
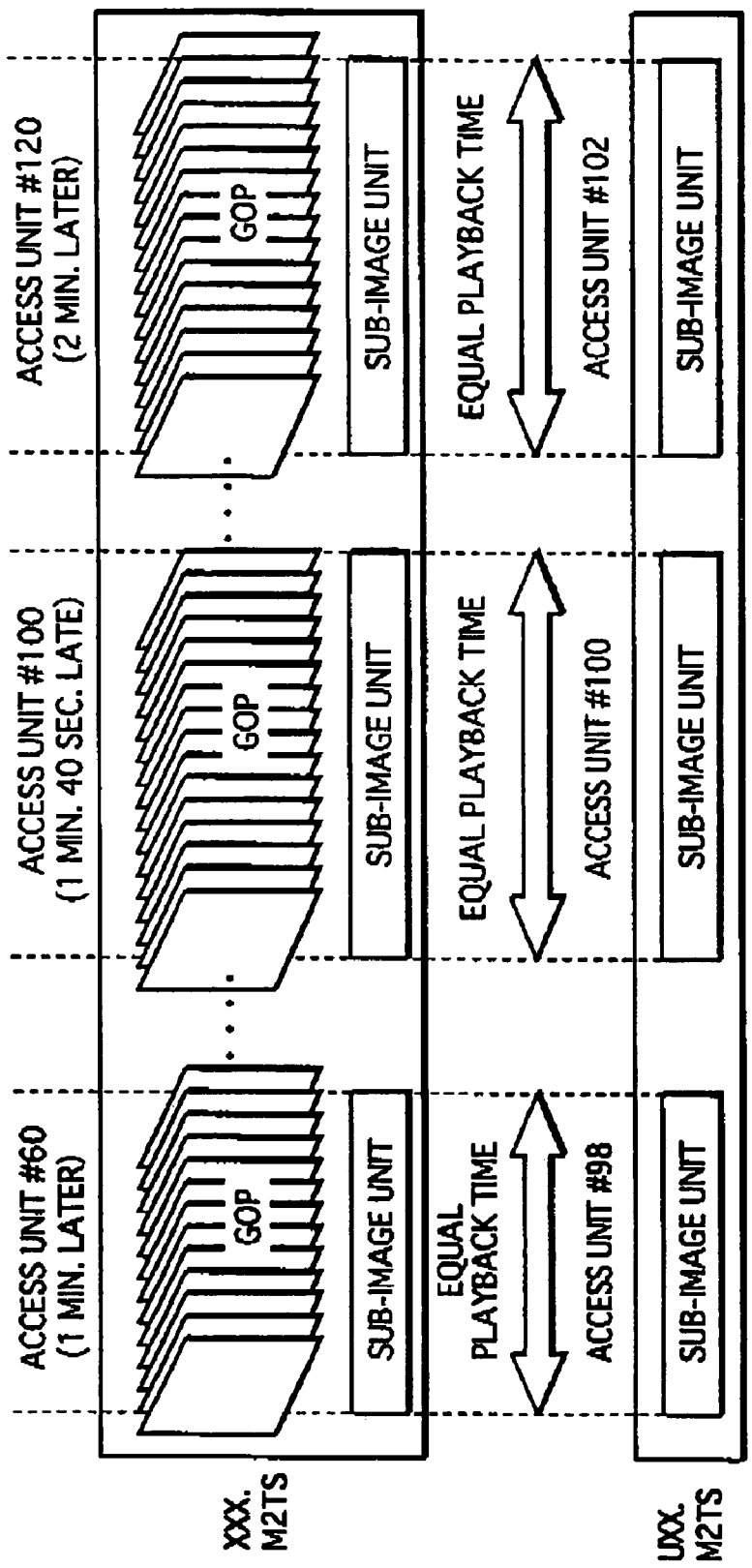
FIG. 23 shows in comparison the substance of an ACCESS UNIT in a BD-ROM package (XXX. TS) and the substance of an ACCESS UNIT in an update kit (UXX.TS), describing in the same manner as FIG. 14.

FIG. 23 shows in comparison the substances of an ACCESS UNIT in a BD-ROM package (XXX. M2TS) and the substance of an ACCESS UNIT in an update kit (UXX. TS), describing in the same manner as FIG. 14. The upper level of FIG. 23 is an ACCESS UNIT on the BD-ROM side. The lower level is an ACCESS UNIT on the update kit side. In the drawing, the ACCESS UNITs #60, #100, and #120 are to be played back 1 minute, 1 minute and 40 seconds, and 2 minutes after the start of the playback of the AV stream, respectively. (In this example, the playback time of one ACCESS UNIT is approximated to one second).

As we focus on the ACCESS UNITs, the ACCESS UNIT #100 on the BD-ROM side includes a GOP to be played back at 1 minute and 40 seconds and a sub-image unit to be read at that time. On the other hand, the ACCESS UNIT #100 on the update kit side includes a sub-image unit to be played back at 1 minute and 40 seconds.

Because of an arrangement wherein the AV stream in the update kit includes ACCESS UNITs which are equal in number to the ACCESS UNITS in the AV stream recorded on the BD-ROM, and wherein the ACCESS UNITs in the AV stream in the update kit includes a sub-image unit having the equal time length to the sub-image unit recorded on the BD-ROM, the ACCESS UNITs in the AV stream recorded on the BD-ROM are in one-to-one correspondence with the ACCESS UNITs in the AV stream in the update kit. Due to this one-to-one correspondence, it is possible to achieve the switching of the subtitles with time accuracy of approximately 1.0 second. Thus, the description of the AV stream in the update kit is completed. The following describes the PL information in the update kit.

Figure 24:
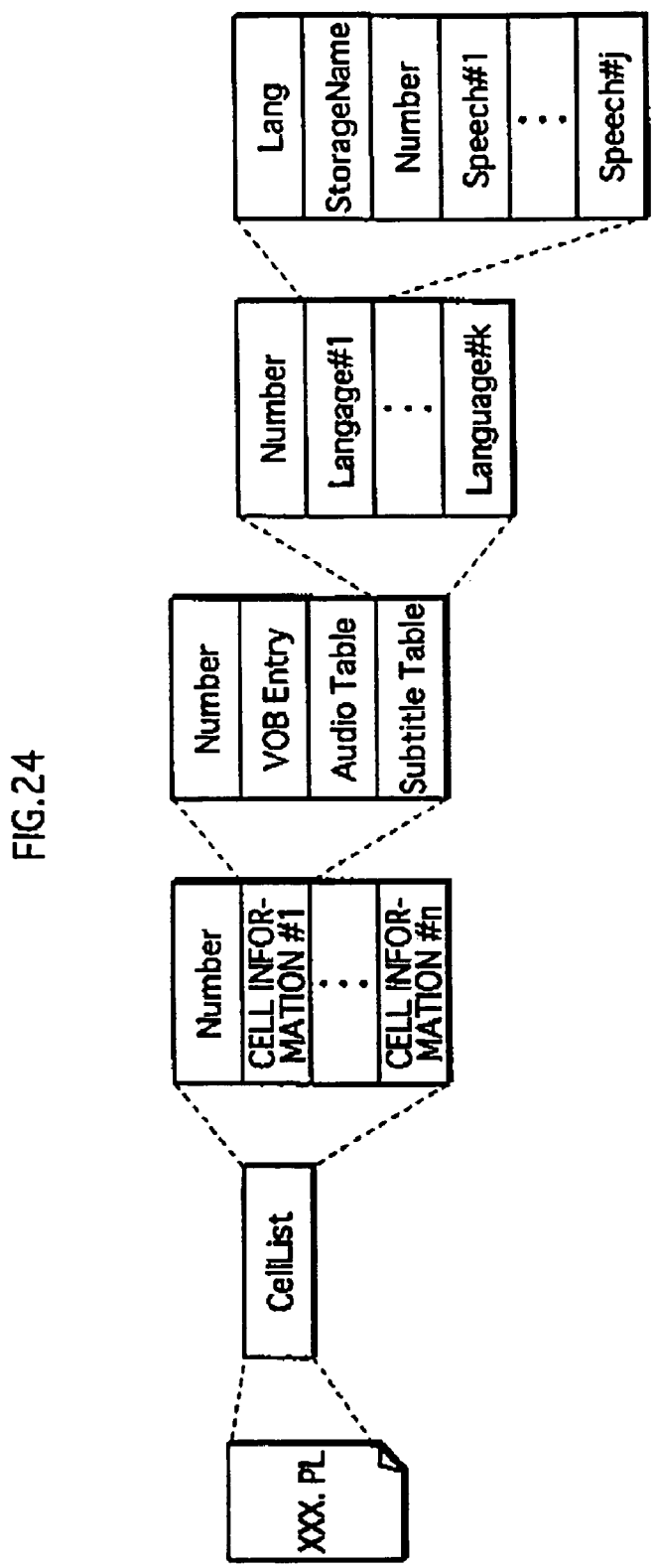
FIG. 24 shows the internal structure of PL information included in an update kit according to the second embodiment.

The PL information is supplied from a Website along with an AV stream having only sub-image and the stream management information for this AV stream. FIG. 24 shows the internal structure of PL information included in the update kit according to the second embodiment. The improvement peculiar to the present embodiment lies in a Subtitle Table within each piece of CELL information in the PL information. A Subtitle Table is made up of a plurality of Subtitle Entries (Subtitle Entries #1 to #n) and the number of the Subtitle Entries (Number).

The "Subtitle Table" is management information for a subtitle to be played back in synchronization with the playlist and is made up of a plurality of pieces of language information (Languages #1 to #k) and the number of the languages (Number). In the case where the playlist corresponds to the English-language area, the Japanese-language area, and the Chinese-language area, pieces of language information for the three languages are described in the "Subtitle Table".

Figure 25:
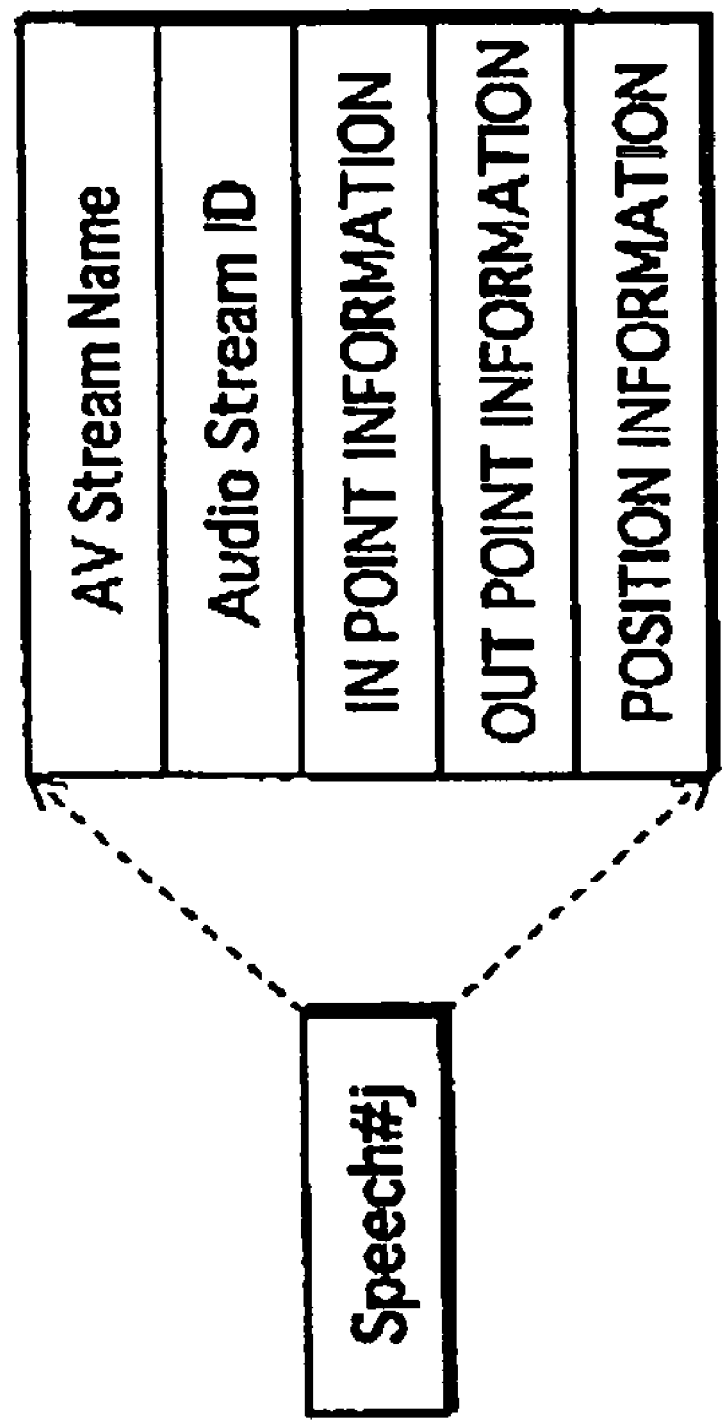
FIG. 25 shows speech information.

Each piece of language information is made up of (i) information about to what language the piece of language information corresponds (Lang.), (ii) the position of the AV stream that corresponds to the sub-image (Storage Name), (iii) a plurality of pieces of speech information written in the language (Speeches #1 to #j) and (iv) the number of the pieces of speech information (Number). The pieces of speech information (Speeches #1 to #J) are information related to speeches that appear during the playback of the playlist. In the case where there are five speeches during a playback of a CELL, a piece of speech information is written for each of the five speeches. FIG. 25 shows the speech information. As shown in the drawing, each piece of speech information (Speeches #1 to #j) includes the name of the AV stream, "AVStream Name" to which a sub-image unit in which the line in the speech is written belongs, "Stream ID" indicating a sub-image stream to which the sub-image unit belongs in the AV stream, "In point information" indicating a playback starting time of the sub-image unit, "Out point information" indicating a playback ending time of the sub-image unit, and "Position information" indicating the display coordinates of the sub-image unit.

Figure 26:
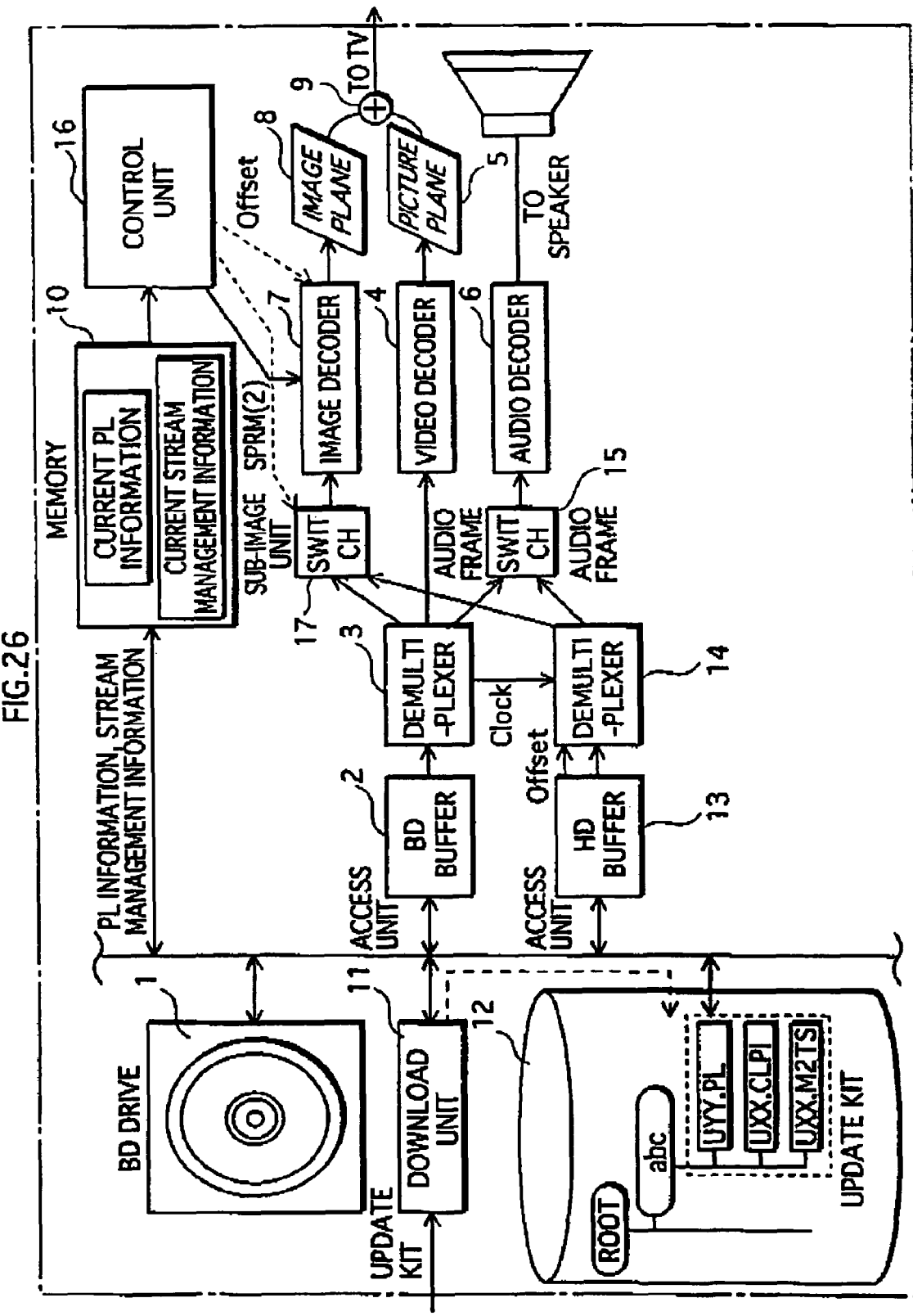
FIG. 26 shows the internal structure of the playback apparatus according to the second embodiment.

Above is the description of the update kit written into the local HD 12. FIG. 26 shows the internal structure of the playback apparatus of the second embodiment. The following describes the constituent elements that are related to the improvement portions of the playback apparatus according to the present embodiment, namely the download unit 11, the HD buffer 13, the switch 17, the image decoder 7, and the control unit 16.

The download unit 11 according to the second embodiment downloads an update kit for upgrading the sub-image from the WWW server 500 and writes the update kit into the local HD 12.

Into the HD buffer 13 according to the second embodiment, one of the ACCESS UNITs constituting the AV stream recorded on the HD is read, every time one of the ACCESS UNITS constituting the AV stream recorded on a BD-ROM is read into the SD buffer 2.

The demultiplexer 14 demultiplexes the ACCESS UNIT that is in an MPEG-TS format and has been read into the ED buffer 13 so as to obtain the sub-image before being multiplexed.

The switch 17 outputs, to the image decoder 7, one of the sub-image unit obtained through the demultiplexing process performed by the demultiplexer 3 and the sub-image unit obtained through the demultiplexing process performed by the demultiplexer 14. Thus, the explanation on the improvement of the playback apparatus according to the present embodiment is completed. The output switching performed by the switch 17 is based on SPRM (2), which represents the sub-image stream number.

When decoding the sub-image unit read from the BD-ROM, the image decoder 7 refers to the display starting time attached to the header of the sub-image unit. That is to say, when the clock inside the playback apparatus reaches the time indicated by the display starting time in the header, the image decoder 7 decodes the sub-image unit. On the other hand, when decoding the sub-image unit read from the HD, the image decoder 7 refers to the display starting time attached to the header of the sub-image unit and an offset in the stream management information. That is to say, when the clock inside the playback apparatus reaches the time obtained by adding the offset to the display starting time attached to the header of the sub-image unit, the image decoder 7 decodes the sub-image unit. The time obtained by adding an offset to the time indicated by the display starting time is substantially the same as the time indicated by the display starting time of the video packet read from the BD-ROM. Accordingly, as a result of the processing performed by the image decoder 9 described above, the playback output for the video frames read from the BD-ROM is in synchronization with the playback output for the sub-image units read from the HD. Further, when the clock inside the playback apparatus reaches a time obtained by adding an offset to the display ending time in the header, the image decoder 9 makes the subtitle disappear. As a result of the processing described here, the subtitles are displayed and made disappear in synchronization with the playback of the video.

The data is read from the BD-ROM and from the HD in units of ACCESS UNITs; however, the data is supplied from the demultiplexer 3 and from the demultiplexer 14 to the image decoder 9, with no regard to ACCESS UNITS. The reason is because the demultiplexing processing performed by the demultiplexer 3 and the demultiplexer 14 is to convert an ACCESS UNIT which is a TS packet sequence into a PES packet sequence and to convert them into sub-image units and video frames; therefore, the data is supplied to the image decoder 9 in units that are included in PES packets or TS packets. Since the PES packets and the TS packets are the units of processing, when a part of a sub-image unit is included in a PES packet, the included part is outputted to the image decoder 9. The reason for this is because a sub-image unit is a piece of run length image data, and the size of a sub-image unit is considerably larger than that of a PES packet, a sub-image unit is divided into portions and stored into a plurality of PES packets.

The image decoder 9 sequentially stores each of those supplied parts of the sub-image unit into a built-in memory within the image decoder 9 and puts the sub-image unit together before decoding it. There would be a problem with the case where a sub-image unit is divided into portions and stored into a plurality of ACCESS UNITS. The following discussion is based on an assumption that the first half of a sub-image unit is stored in a TS packet sequence constituting an ACCESS UNIT and the second half of the sub-image unit is stored in a TS packet sequence constituting the following ACCESS UNIT.

The following discusses the case where a subtitle switching processing is performed due to an update of SPRM(2), after the PES packet in which the first half of the sub-image unit is stored is demultiplexed and outputted to the image decoder 9, but before the PES packet in which the second half of the sub-image unit is stored is demultiplexed. In such a case, to the image decoder 9, after the first half of the sub-image unit is supplied, another sub-image unit belonging to another sub image stream is to be supplied. Although the image decoder 9 has obtained the first half, the image decoder 9 is not able to obtain the second half; therefore, the image decoder 9 is not able to properly perform the decoding, and there is a possibility that image decoder 9 displays non-sense data. In order to prevent this from occurring, it is necessary to employ an erase processing on the playback output from the image decoder 9 for a short period of time after the subtitle is switched. As a result of this erase processing, although there will be a little "no-subtitle" period immediately after a switch to an upgraded version, as soon as the following sub-image unit is stored in the memory within the image decoder 9, the subtitle display is resumed. Accordingly, it becomes possible to freely switch subtitles, for example, from the subtitle on the BD-ROM to the subtitle on HD, or from the subtitle on the HD to the subtitle on the BD-ROM.

Figure 27:
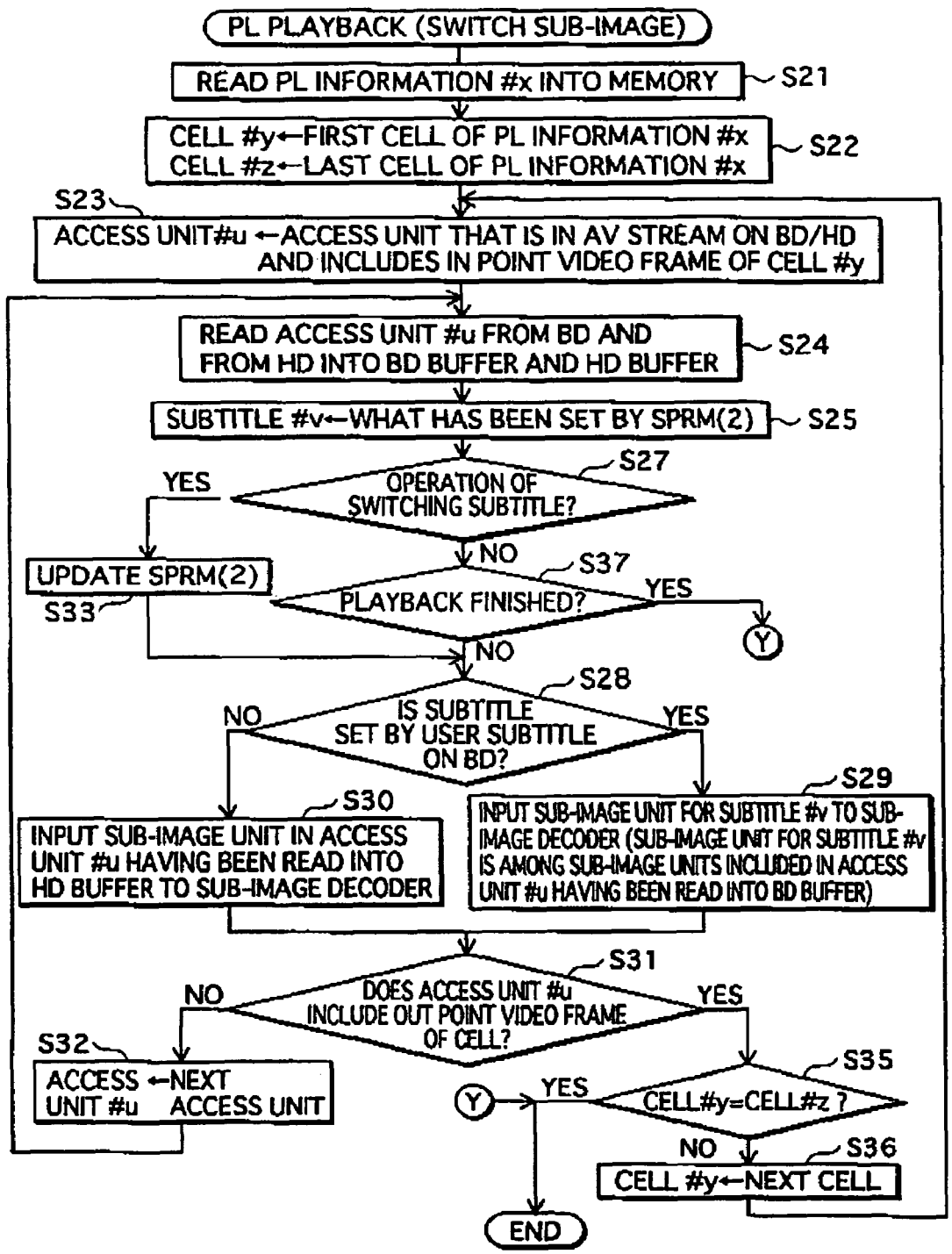
FIG. 27 shows the processing procedure performed by the control unit 16 according to the second embodiment.

The control unit 16 in the present embodiment performs the playback processing of ACCESS UNITs according to the flow chart in FIG. 27. The flow chart forms a loop processing in which the processing from steps S22 through S36 is repeated for each of the CELLS belonging to the PL #x. Now, the CELL being the processing target will be referred to as "CELL #y" which is a CELL at a y'th position in a PL. To be specific, the PL information #x is read into the memory (Step S21). The first CELL of the PL information #x is set as the CELL #y, and the last CELL of the PL information #x is set as the CELL #z (Step S22). Subsequently, the ACCESS UNITS belonging to these CELLS are read from the BD-ROM and from the local HD12 in parallel, and the image decoder 7 is instructed to decode the ACCESS UNITS (Step S23 to Step S36).

Among Steps from S23 to S36, Steps S24 through S32 represent a loop processing for reading each of the ACCESS UNITs belonging to the CELL #y from the BD-ROM and from the local HD 12. In this loop processing, the ACCESS UNIT to be a reading target will be referred to as "ACCESS UNIT #u" which is an ACCESS UNIT at a u'th position in an AV stream. In Step S23, prior to the loop processing in Steps-S24 through S32, the ACCESS UNITs that are in the AV streams on the BD-ROM and in the HD and each include the In point video frame of the CELL #y is set as the ACCESS UNITs #u.

The loop processing in Steps S24 through S32 is to repeat the processing as follows: to read the ACCESS UNITs #u from the BD-ROM and from THE ED into the BD buffer 2 and into the HD buffer 13, respectively (Step S24), and after Step S27 and Step S37, to input the sub-image units constituting the ACCESS UNIT #u to the decoder (Steps S28 through S30).

The subtitle switching process performed in Steps S28 through S30 is to input, to the image decoder 7, the sub-image units in the ACCESS UNIT having been read into the buffer, in accordance with SPRM (2). The "subtitle #v" in the drawing represents the subtitle language set in SPRM (2) by the user. In the case where the user performs an operation for switching the subtitles (Step S27: YES), SPRM(2) is updated (Step S33).

In the case where the subtitle #v indicates a sub-image stream on the BD-ROM side (Step S28: YES), among the sub-image units in the ACCESS UNIT having been read into the BD buffer 2, the sub-image units that corresponds to the subtitle #v is inputted to the image decoder 7(Step S29). In the case where the subtitle #v indicates a sub-image stream on the local ED 12 side (Step S28: NO), the sub-image units in the ACCESS UNIT on the HD buffer side is inputted to the image decoder 7 (step S30).

In Step S31, it is judged whether the condition for ending the loop processing is met. In the case where the ACCESS UNIT #u includes the Out point video frame of the CELL (Step S31: YES), the loop processing will be terminated.

When the requirement in this step is not met, the next ACCESS UNIT in the AV stream is set as the ACCESS UNIT #u (Step S32), and the procedure returns to Step S24. Step S35 is a judgment step which is to be executed in a case where the processing in Steps S23 through S32 is repeated for ACCESS UNITs belonging to one piece of CELL information. In Step S35, it is judged whether or not the CELL information #y being the current processing target is the last CELL information #z. In the case where the CELL information #y being the current processing target is not CELL #Z, the next CELL is set as the CELL #y (Step S36). Then, the procedure advances to Step s23 so that the processing in Steps S23 through S35 is performed on the ACCESS UNIT #u belonging to the CELL #y.

Figure 28:
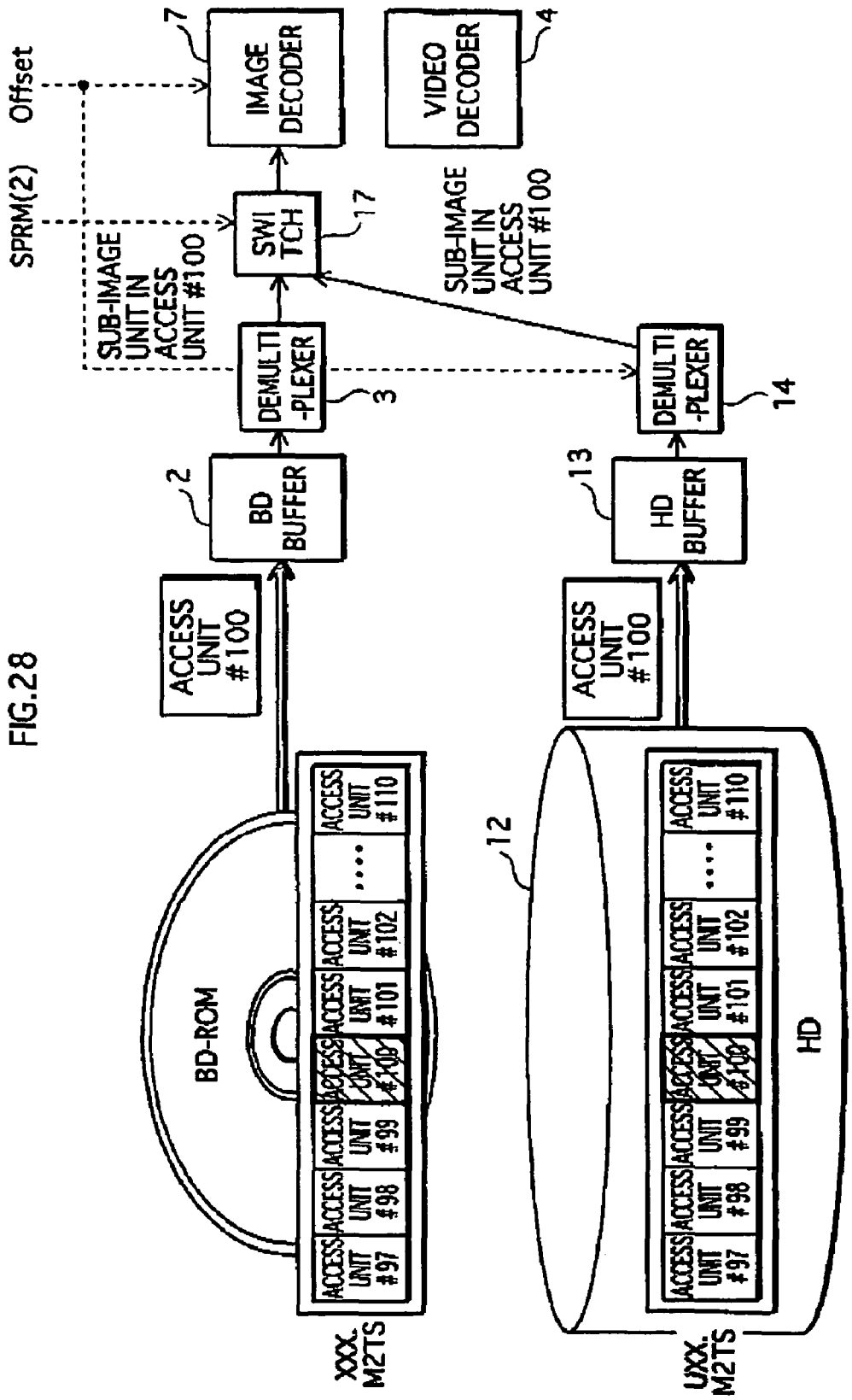
FIG. 28 shows the reading process performed by the control unit 16 to read from a BD-ROM and from the HD.

FIG. 28 shows the process of parallel reading performed by the control unit 16 to read from the BD-ROM and from the HD. In the drawing, the ACCESS UNIT #100 is read from the BD-ROM and from the local RD 12 into the BD buffer 2 and into the HD buffer 13, respectively, in Step S4. The switch 17 switches between (a) outputting the sub-image unit in the ACCESS UNIT #100 from the BD buffer 2 to the decoder and (b) outputting the sub-image unit in the ACCESS UNIT #100 from the HD buffer 13 to the decoder, according to the SPRM (2).

Figure 29:
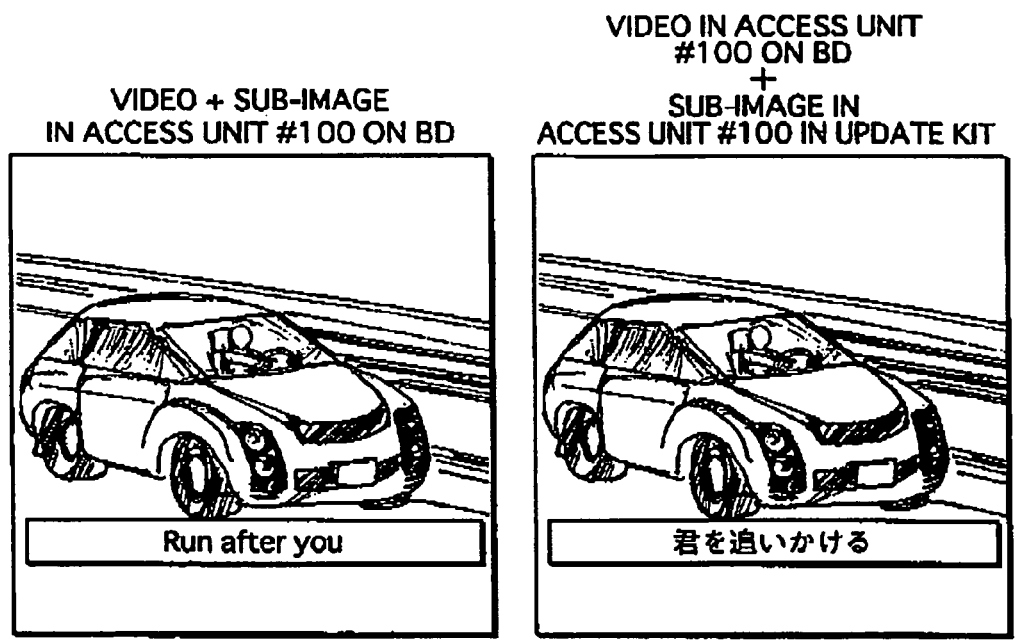
FIG. 29 shows what kind of subtitle display is achieved as a result of the output switching shown in FIG. 28.

FIG. 29 shows what kind of subtitle display is achieved as a result of the output switching shown in FIG. 28. In the case where the switch 17 outputs the ACCESS UNIT #100 from the BD-ROM side to the audio decoder 6, playback is achieved as shown on the left side of FIG. 29, i.e. the playback is performed so that an English subtitle "Run after you" is combined with the moving pictures. On the other hand, in the case where the switch 17 outputs the ACCESS UNIT #100 from the HD side to the audio decoder 6, playback is achieved as shown on the right side of FIG. 29, i.e. the playback is performed so that the Japanese subtitle is combined with the moving pictures.

As explained above, according to the present embodiment, ACCESS UNITs that are in one-to-one correspondence with each other are read in parallel from the BD-ROM and from the local HD 12, and the decoder is instructed to selectively play back one of these ACCESS UNITS, therefore, switching of the subtitles is realized. Creators of a movie production are able to, even after the movie production is distributed on a BD-ROM, supply additional subtitles to users by distributing them via the WWW server 500.

It is necessary to read ACCESS UNITS from the BD-ROM and from the HD in parallel, in the case where the size of the sub-image stream in the update kit is large. Such parallel reading is not necessary in the case where the size of the sub-image stream in the update kit is small. For example, when the subtitle is text data and the size of the subtitle is as small as some kilobytes, it is acceptable to read the text data from the HD, before data is read from the BD-ROM, so that the subtitle is stored in the memory within the playback apparatus, and then the subtitle image is rendered.

Third Embodiment

The third embodiment relates to an improvement for the case where after a piece of video data having multi angle sections is distributed as being recorded on a BD-ROM, another piece of video data for views from an other angle is distributed. First of all, the following describes in detail the BD-ROM and an update kit according to the present embodiment.

Figure 30A:
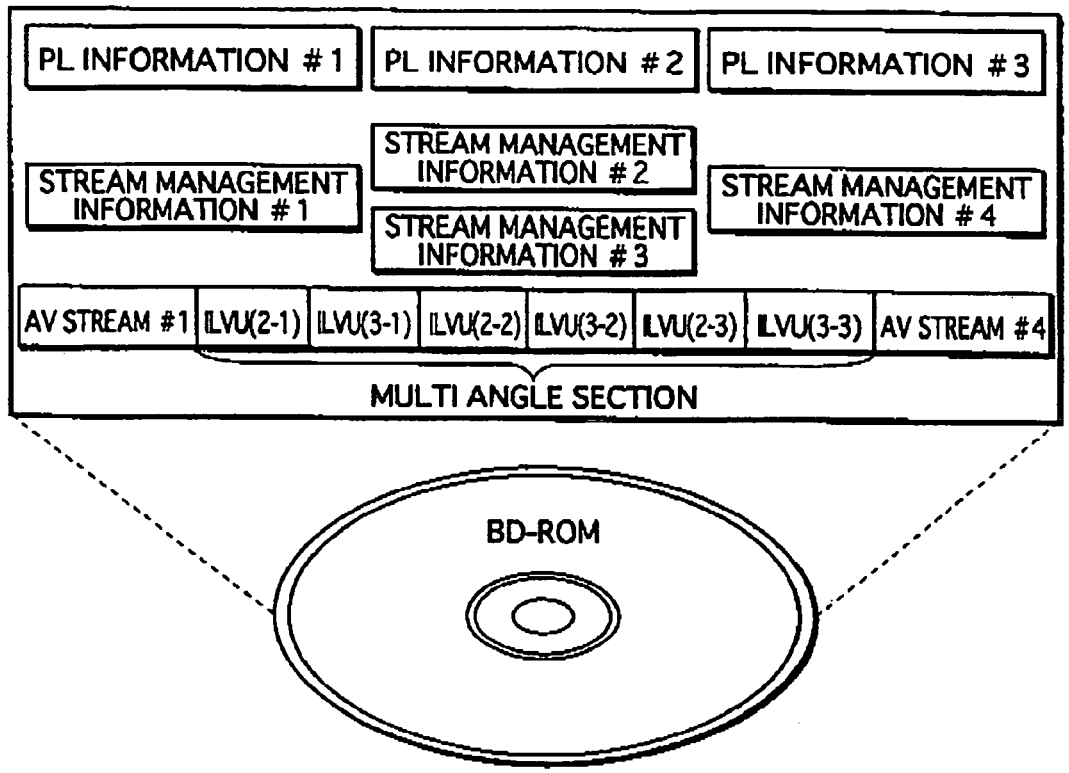
FIG. 30A shows what is recorded on a BD-ROM according to the third embodiment.

First of all, the following describes the SD-ROM according to the present embodiment. FIG. 30A shows the internal structure of the BD-ROM according to the third embodiment. In the drawing, the AV stream #1, the multi angle section, the AV stream #4, the stream management information #1 #2, #3, #4, and the PL information #1, #2, #3, are recorded on the BD-ROM.

To explain more specifically, the AV stream #1 and the AV stream #4 are the same as the AV stream described in the first embodiment. The multi angle section between the AV stream #1 and the AV stream #4 is made up of two AV streams such as the AV stream #2 and the AV stream #3.

The AV stream #2 and the AV stream #3 are pieces of video data that have been taken from two different angles. In such a case, the AV stream #2 and the AV stream #3 can be each divided into three ILVUs (InterLeaVe Units), as follows: the AV Stream #2; ILVU (2-1), ILVU (2-2), and ILVU (2-3) the AV stream #3: ILVU (3-1), ILVU (3-2), and ILVU (3-3)

Here, in the expression "ILVU (XX-YY)", "XX" denotes an AV stream to which the ILVU belongs, and "YY" denotes the order in which the ILVU is placed in the AV stream. These ILVUs are recorded on a disc with a numbering system as follows: ILVU (2-1), ILVU (3-1), ILVU (2-2), ILVU (3-2), ILVU (2-3), ILVU (3-3)

The ILVUs constituting the VOB #1 and the ILVUs constituting the VOB #2 alternately appear, Accordingly, for example, when ILVU (2-1) and ILVU (3-1) are read together, the video decoder 4 is able to selectively decode one of ILVU (2-1) and ILVU (3-1). With this arrangement, it is possible to realize switching of angles according to a user operation.

The following describes how the ILVUs described above are managed on the BD-ROM. FIG. 31 shows how the positions of the ILVUs constituting the multi angle section shown in FIG. 30 are managed. Each of the ILVUs constituting an AV stream is managed, like the extents constituting a file, by describing the starting address and the length in the file management information. The lower level of the drawing shows at which address in the BD-ROM each ILVU is recorded. The ILVUs (3-1) and (3-2) which constitute the AV stream #3 are recorded at the addresses 64 and 1280 and have ran lengths of 1024 and 880, respectively. These addresses and run lengths are written in the management information for the AV stream #3, which is indicated as kj 3. The ILVUs (2-1) (2-2) and (2-3) which constitute the AV stream #2 are recorded at the addresses, 10, 1088, and 2160 and have the run length of 54, 92, and 200 respectively. These addresses and the run lengths are written in the management information for the AV stream #2, which is indicated as kj2. The recording addresses of ILVUs constituting AV streams are written into pieces of file management information, so that each piece of file management information corresponds to a different one of the AV streams; therefore, even if the AV stream #2 and the AV stream #3 constitute a multi angle section on a BD-ROM, they are treated as different files. Thus, the description of the multi angle section on the BD-ROM is completed.

Figure 32:
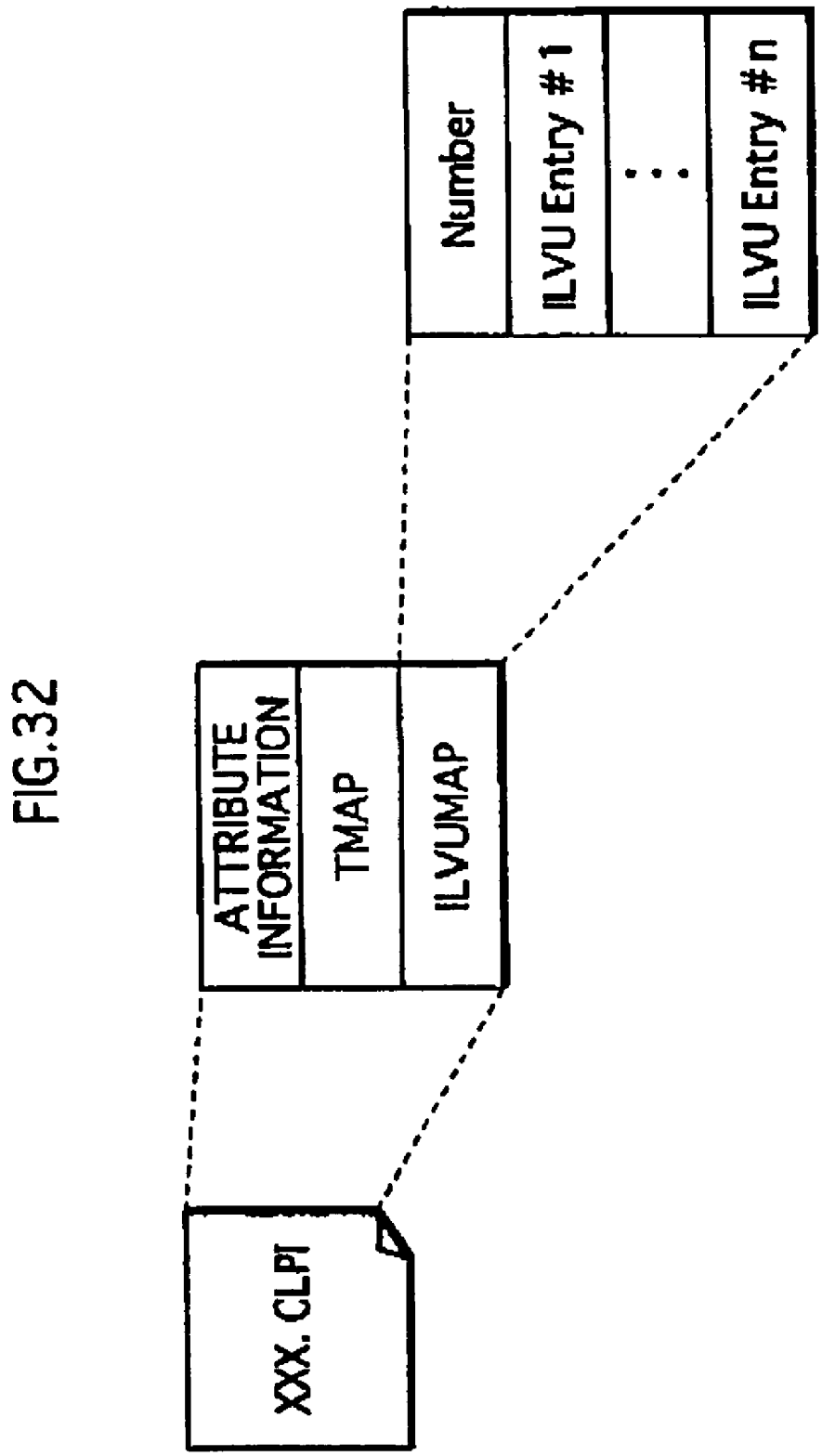
FIG. 32 shows the structure of the stream management information according to the third embodiment.

The following describes the stream management information. FIG. 32 shows the structure of the stream management information according to the third embodiment. The stream management information here is different from the stream management information shown in FIG. 8 in that it includes ILVUMAP in addition to the attribute and the TMAP. The ILVUMAP is made up of Entries #1 to #n related to each ILVU and the LT number (Number). In each ILVU Entry, the number of ACCESS UNITs belonging to the ILVU is written. By using the ILVU Entries along with the TMAP and the file management information, it is possible to easily cue ACCESS UNITs belonging to the ILVU.

Thus, the description of the BD-ROM according to the present embodiment is completed. The following describes the AV stream included in the update kit.

The AV stream included in the update kit according to the present embodiment (the AV stream #5 in the drawing) is for forming an additional angle image. It is assumed that the BD-ROM according to the present embodiment is a video for views from a passenger train, and that the AV stream #2 is for a video image taken from the driver's seat, the AV stream #3 is for a video image taken from the windows provided on one of the sides of a compartment. The situation is that the AV stream #2 and the AV stream #3 are recorded on the BD-ROM, but, for some reasons, an arrangement is made so that the video image taken from the windows provided on the opposite side of the compartment is not recorded on the BD-ROM. In that situation, in order to distribute the video image taken from the opposite side to users, the update kit of the present embodiment is generated.

Figure 30B:
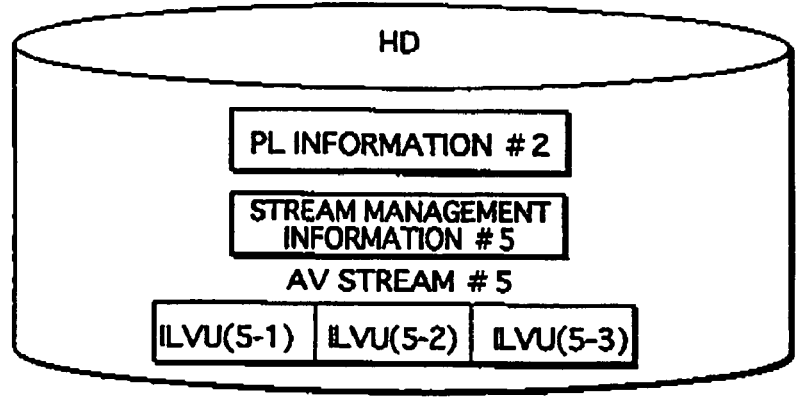
FIG. 30B shows what is recorded on the HD according to the third embodiment.
Figure 31:
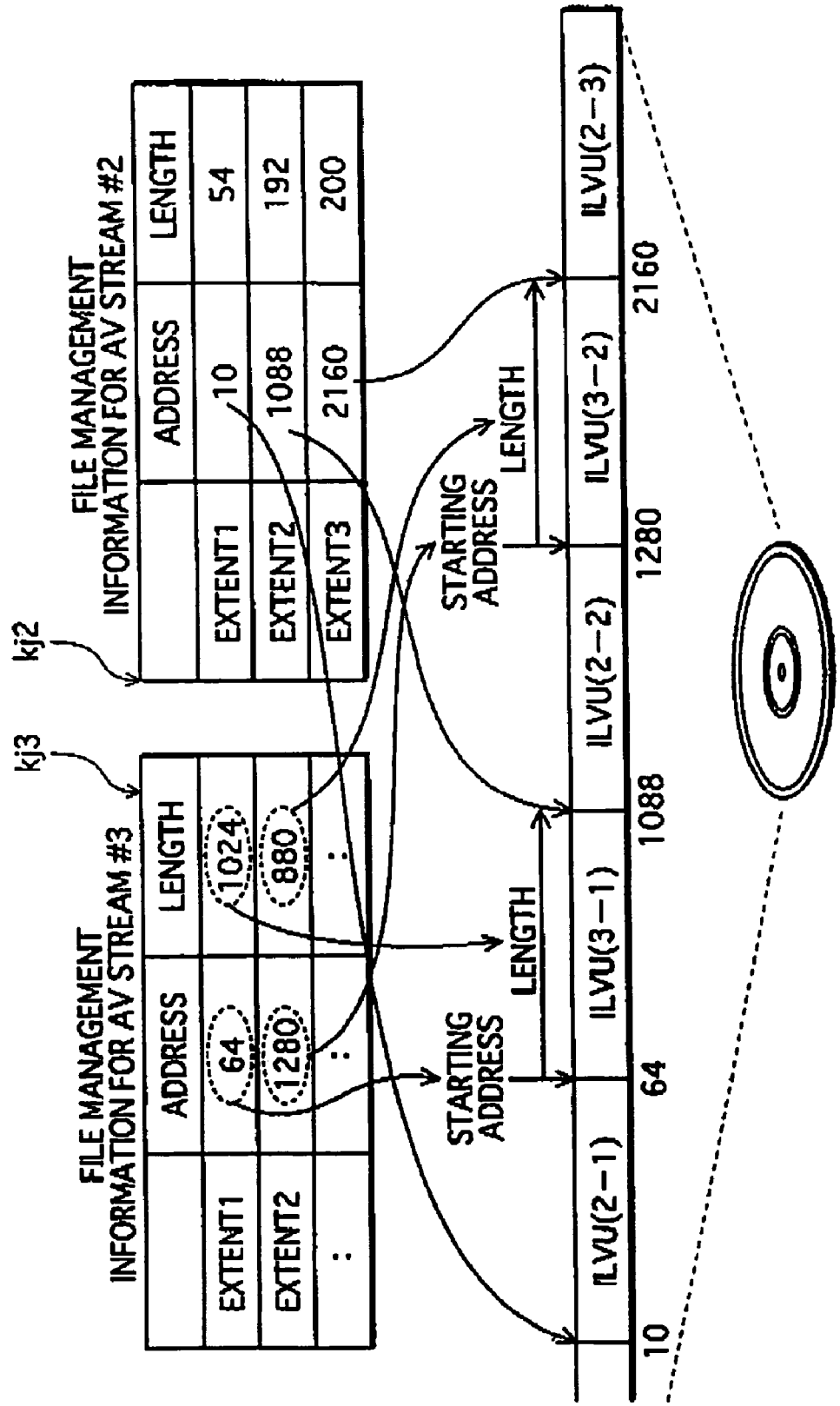
FIG. 31 shows how the positions of the ILVUs constituting the multi angle section shown in FIG. 30 are managed.

As shown in FIG. 30B, the AV stream included in the update kit is recorded in the local HD 12, as being divided into a plurality of ILVUs. The AV stream #5 in the local HD 12 is to be read in units of ILVUs.

The length of the playback time for the ILVUs (5-1) and (5-2), which are obtained by dividing UXX.M2TS, is equal to the length of the playback time of the ILVUs (1-1), (1-2), (2-1), and (2-2) which constitute XXX.M2TS.

The stream management information included in the update kit according to the present embodiment is management information for managing the AV stream in the HD, The internal structure is the same as the one shown in FIG. 32; therefore, the drawing thereof is omitted.

Figure 33:
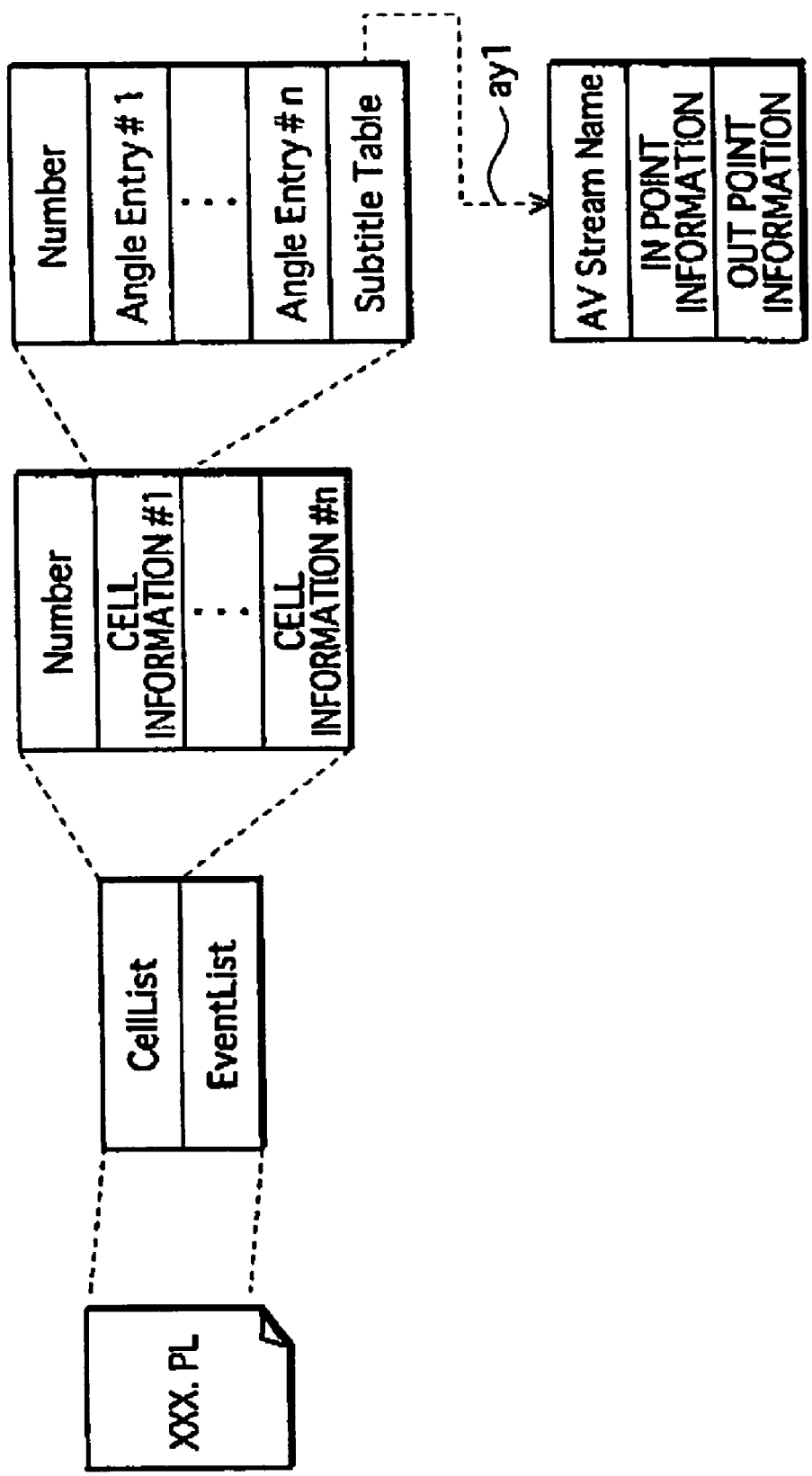
FIG. 33 shows the internal structure of the PL information according to the third embodiment.

The PL information included in the update kit according to the present embodiment is path information for treating the multi angle section recorded on the BD-ROM and the AV stream in the HD as one PL. FIG. 33 shows the internal structure of the PL information according to the third embodiment. FIG. 33 is different from FIG. 17 in that, instead of the AV stream entries such as Stream ID, In, and Out, Angle Entries #1 to #n are included in each piece of CELL information. An Angle Entry is for defining a playback section in each of the AV streams that correspond to different angles. The arrow with a broken line ay1 highlights the internal structure of an Angle Entry. As observed from this, an Angle Entry is made up of "AVStream Name" of the AV stream for the corresponding angle, "In point information" indicating the starting point of the playback section in the AV stream, and "Out point information" indicating the ending point of the playback section in the AV stream.

In order to treat the multi angle section recorded on the BD-ROM and the AV stream in the HD as one PlayList, the Angle Entries in the PL information are set for the AV streams constituting the multi angle section on the BD-ROM and for the AV stream in the HD. To be more specific, the Angle Entry #1 is set for the AV stream #2 for the multi angle section on the BD-ROM; the Angle Entry #2 is set for the AV stream #3 for the multi angle section on the BD-ROM; and the Angle Entry #3 is set for the AV stream #5 for the update kit in the HD.

Figure 34:
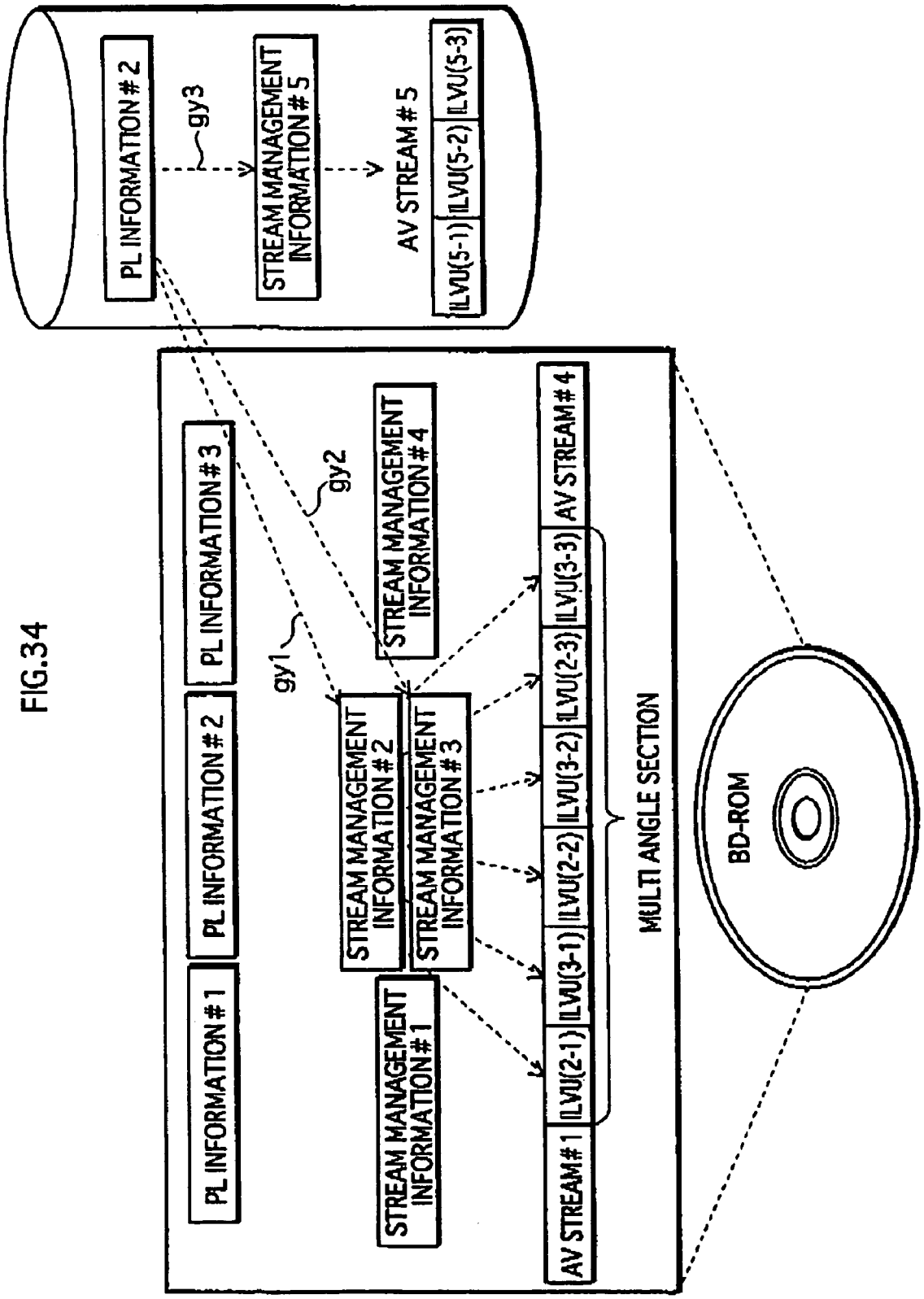
FIG. 34 schematically shows indirect reference with Angle Entries included in PL information.

FIG. 34 schematically shows indirect reference with Angle Entries included in the PL information.

The arrows gy1 and gy2 in the drawing indicate specification of playback sections in the AV streams on the BD-ROM with the Angle Entries #1 and #2. On the other hand, the arrow gy3 indicates specification of a playback section in the AV stream in the local HD 12 with the Angle Entry 43. The bundle of playback sections is specified in the PL information. Since one piece of PL information specifies the playback sections in the multi angle section on the BD-ROM and the playback sections in the local HD 12, when playback is performed, the playback apparatus reads, in parallel, ILVUs constituting the multi angle section and the ILVUs constituting the AV stream on the BD-ROM.

Figure 35:
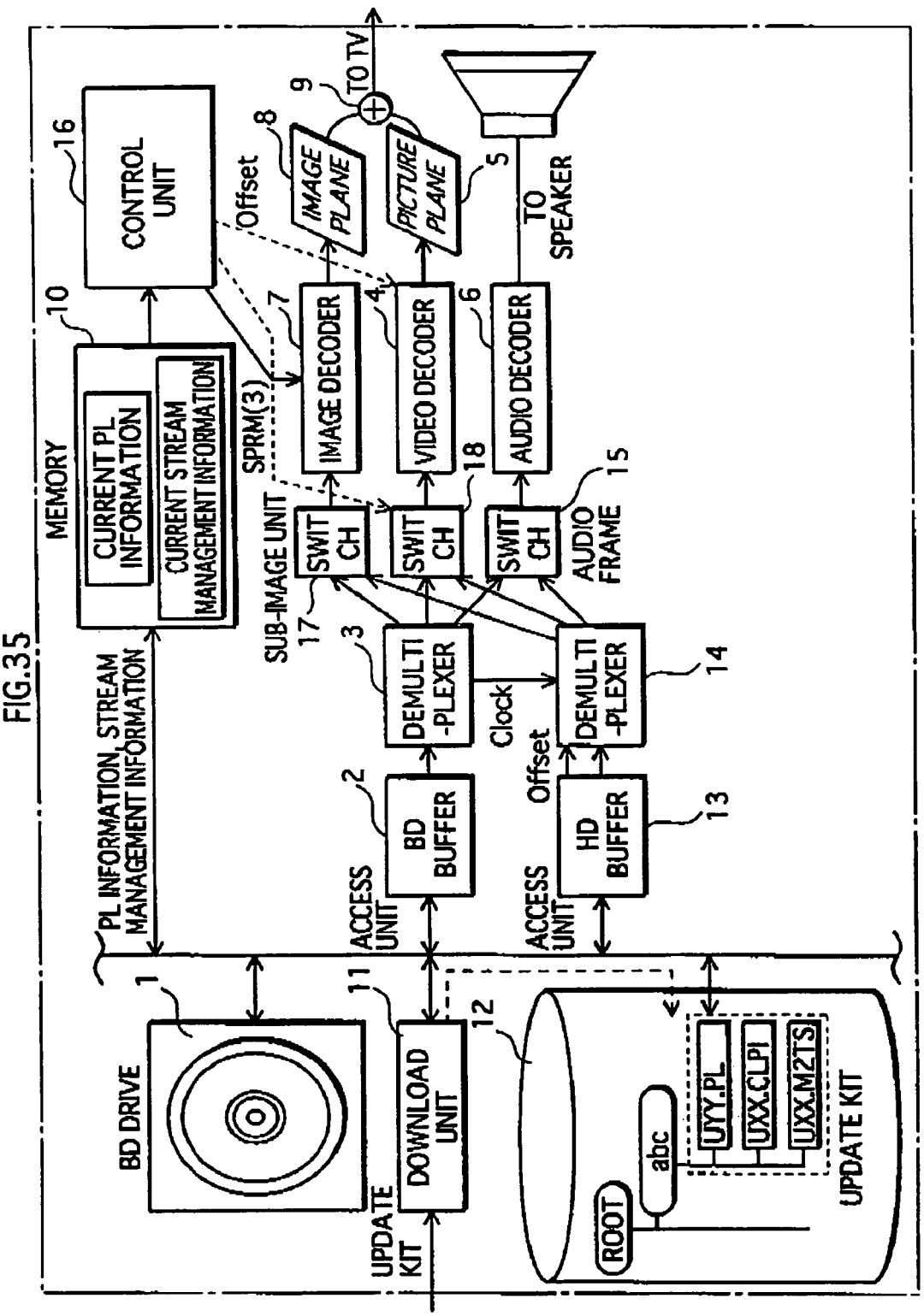
FIG. 35 shows the internal structure of the playback apparatus according to the third embodiment.

Thus, the description of the update kit according to the present embodiment is completed. The following describes the playback apparatus according to the present embodiment. FIG. 35 shows the internal structure of the playback apparatus according to the third embodiment. The playback apparatus shown in this drawing is different in that it has a switch 18 in addition.

The following describes the constituent elements that are related to the improved portions of the playback apparatus of the present embodiment, namely, the download unit 11, the HD buffer 13, the demultiplexer 14, the switch 18, and the video decoder 4.

The download unit 11 of the third embodiment downloads an update kit from the WWW server 500 so as to write the downloaded update kit to the local HD 12, the update kit being for adding a new angle image to the multi angle section recorded on the BD-ROM.

Into the HD buffer 13 of the third embodiment, one of the ILVUs constituting the AV stream recorded on the HD is read, every time one of the ILVUs constituting the AV stream recorded on the BD-ROM is read into the BD buffer 2.

The demultiplexer 14 demultiplexes the ILVUs that are in an MPEG-TS format and have been read into the HD buffer 13 so as to obtain the GOP before being multiplexed.

The switch 18 outputs, to the video decoder 4, one of the GOP obtained through the demultiplexing process performed by the demultiplexer 3 and the GOP obtained through the demultiplexing process performed by the demultiplexer 14. The output switching performed by the switch 18 is based on SPRM (3), which represents the angle number.

When decoding an ILVU read from the BD-ROM, the video decoder 4 refers to the PTS attached to the PES packet constituting the ILVU. That is to say, when the clock inside the playback apparatus reaches the time indicated by the PTS on the PES packet, the video decoder 4 decodes the ILVU. On the other hand, when decoding an ILVU read from the HD, the video decoder 4 refers to a PTS attached to the PES packet and an offset in the stream management information. That is to say, when the clock inside the playback apparatus reaches the time obtained by adding the offset to the PTS attached to the PES packet, the video decoder 4 decodes the ILVU. The time obtained by adding an offset to the time indicated by a PTS is substantially the same as the time indicated by a PTS on the audio packet read from the BD-ROM. Accordingly, as a result of the processing performed by the video decoder 4 above, the playback outputs for the audio frames read from the BD-ROM are in synchronization with the decoding of the ILVUs read from the HD.

Figure 36:
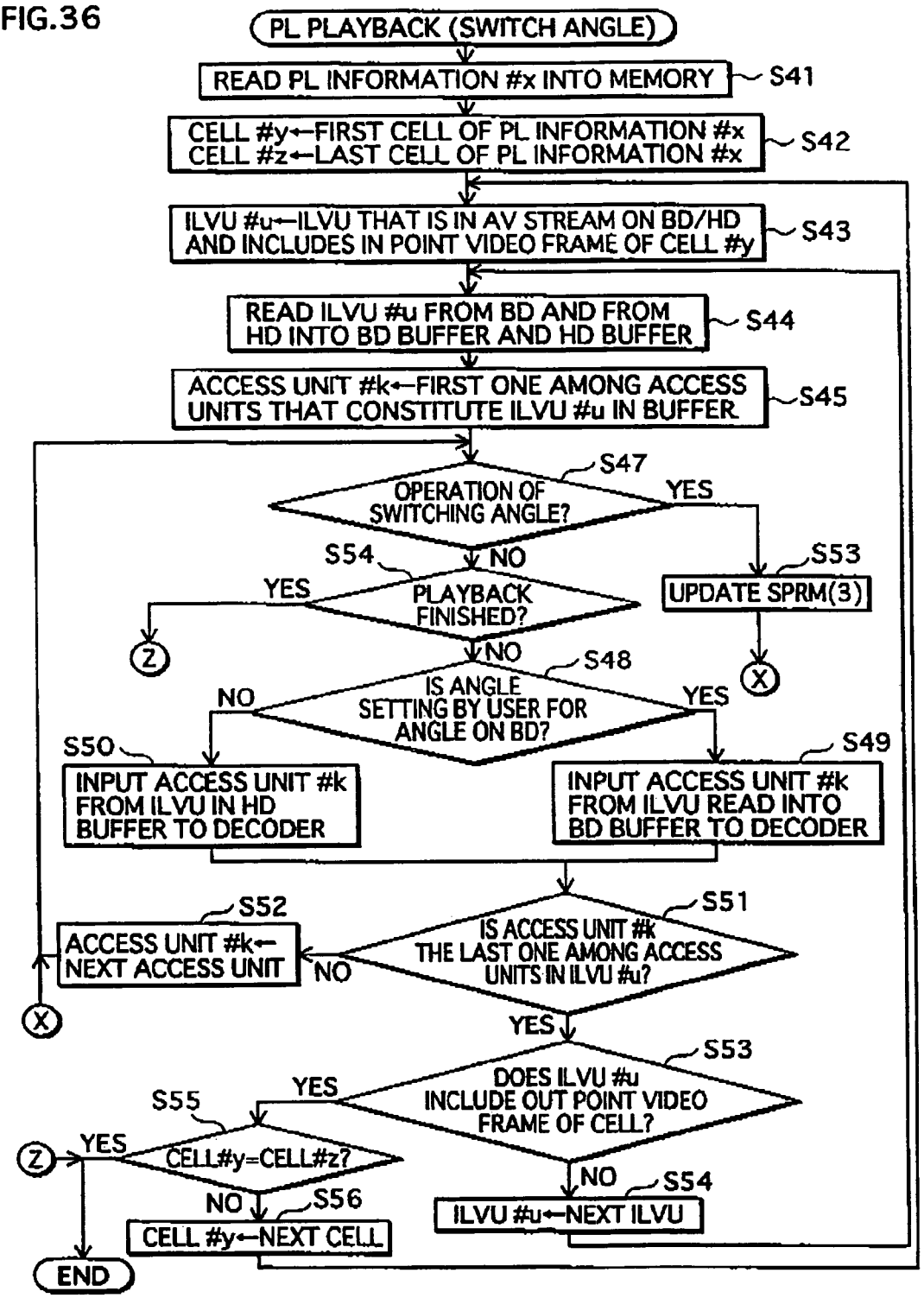
FIG. 36 is a flow chart that shows the processing procedure performed by the control unit 16 according to the third embodiment.

Thus, the description of the improvement with the playback apparatus according to the present embodiment is completed. The control unit 16 of the present embodiment performs the playback processing according to the flow chart in FIG. 36 so as to control the playback apparatus in such a manner as described above.

The flow chart forms a loop processing in which the processing in Steps S42 through S56 is repeated for each of the CELLS belonging to the PL #x. Now, the piece of CELL information being the processing target will be referred to as "CELL information #y" which is a piece of CELL information at a y'th position in a PL. To be specific, the PL information #x is read into the memory (Step S41). The first CELL of the PL information #x is set as the CELL #y, and the last piece of CELL information of the PL information #x is set as the CELL information #z (Step S42). Subsequently, the ILVUs belonging to the CELLs are read from the BD-ROM and from the local WD 12 in parallel, and the video decoder 4 is instructed to decode the ILVUs (Steps S43 through S56).

Among Steps from S43 through S56, Steps S44 through S52 represent a loop processing for reading each of the ILVUs belonging to the CELLs #y from the BD-ROM and from the local HD 12. In this loop processing, the ILVU to be a reading target will be referred to as "ILVU #u" which is an ILVU at a u'th position in an AV stream. In Step S43, prior to the loop processing in Steps S44 through S52, the ILVUs that are in the AV streams on the BD-ROM and in the HD and each include the In point video frame of the CELL #y is set as the ILVUs #u.

The loop processing in Steps S44 through S52 is to repeat the processing as follows; to read the ILVUs #u from the BD-ROM and from the HD into the BD buffer 2 and into the HD buffer 13 respectively, and to input the ACCESS UNITs constituting the ILVU in the buffers to the decoder (Steps S44 through S52), and after all of the ACCESS UNITs have been inputted, the processing advances to the next ILVU (Step S54).

The ACCESS UNIT to be inputted to the video decoder 4 will be referred to as the ACCESS UNIT #k, which is an ACCESS UNIT at a k'th position in an ILVU. In the loop processing in Step S44 through S50, the first ACCESS UNIT in the ILVU in the buffer is set as the ACCESS UNIT #u (Step S45), and thereafter every time the loop processing is repeated once, the next ACCESS UNIT in the ILVU is set as the ACCESS UNIT #k (Step S52).

Among Steps S44 through 550, steps S48 through 550 represent the processing of inputting, to the decoder, ACCESS UNITs in the ILVU having read into the buffer, in accordance with an angle setting by the user. The angle #v in the drawing represents the angle set in SPRM (3) by the user. In the case where the user performs an operation for switching the angles (Step S47: YES), SPRM(3) is updated (Step S53).

In the case where the angle #v indicates an angle on the BD-ROM side (Step S48: YES), among the ACCESS UNITs in the ILVU having been read into the BD buffer 2, the ACCESS UNIT that corresponds to the angle #v is inputted to the decoder as the ACCESS UNIT #k (Step S49). In the case where the angle #v indicates an angle on the local HD 12 side (Step S48: NO), the ACCESS UNIT #k in the ILVU in the HD buffer is inputted to the decoder (Step S50).

In Step S51, it is judged whether the condition for ending the loop processing is met. In the case where the ACCESS UNIT Ok is not the last ACCESS UNIT in the ILVU #u (Step S51: NO), the next ACCESS UNIT in the AV steam is set as the ACCESS UNIT #k (Step S52), and the procedure returns to Step S47. In the case where the ACCESS UNIT #k is the last ACCESS UNIT in the ILVU #u, it is judged whether or not the ILVU #u includes the Out point video frame of the CELL (Step S53). If the ILVU #u does not include the Out point video frame of the CELL, the next ILVU in the CELL is set as the ILVU #u (Step S54), and the procedure advances to Step S44. If the ILVU #u includes the Out point video frame of the CELL, Step S55 is executed. In Step S55, the CELL information #y being the current processing target is the last CELL information #z. In the case where the CELL information #y being the current processing target is not CELL #z, the next CELL is set as the CELL #y (Step S56). Then, the procedure advances to Step S43 so that the processing in Steps S43 through S55 is performed on the ILVUs belonging to the CELL #y. In the case where an operation for stopping the playback is performed, the processing in this flow chart is terminated (Step S53: YES).

Figure 37:
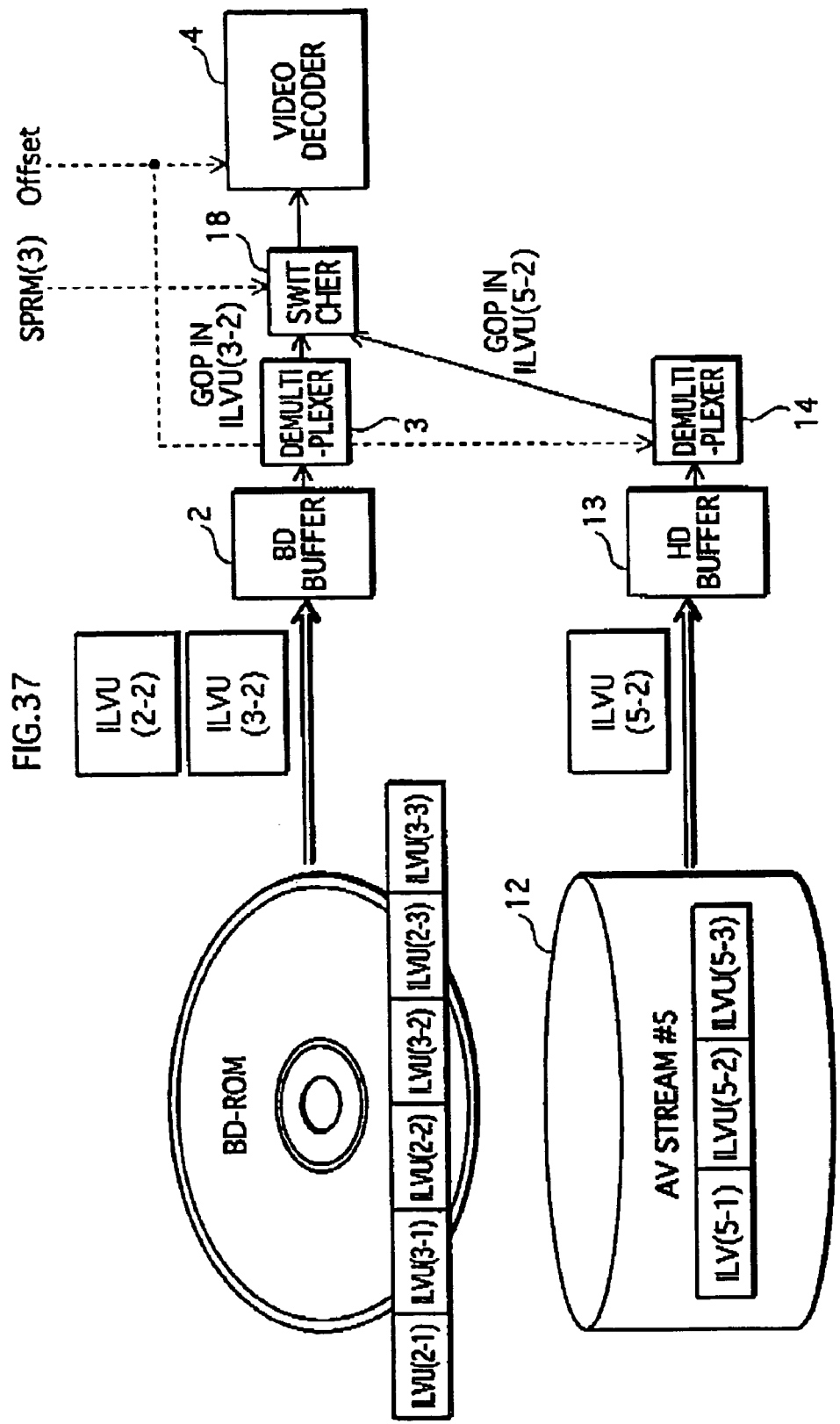
FIG. 37 shows the process of parallel reading performed by the switch 18 to read from a BD-ROM and from the HD.

FIG. 37 shows the process of parallel reading performed by the switch 18 to read from the BD-RON and from the HD. The ILVUs (2-2) and (3-2) in the drawing are read from the BD-ROM into the BD buffer 2 id Step S44. The ILVU (5-2) in the drawing is read from the HD into the HD buffer 13 in Step S44. The switch 18 selectively outputs, to the video decoder 4, one of (a) the ILVUs (2-2) and (3-2) on the BD buffer 2 side and (b) ILVU (5-2) on the BD buffer 13 side.

FIG. 38 shows what kind of video display is achieved as a result of the output switching shown in FIG. 37. In the case where the switch 18 outputs the ILVU (3-2) on the BD-ROM side to the video decoder 4, playback is achieved as shown on the left side of FIG. 28, i.e. the playback is performed so that the video image taken from the driver's seat of the train is shown. On the other hand, in the case where the switch 17 outputs the ILVU (5-2) on the HD side to the video decoder 4, playback is achieved as shown on the right side of FIG. 38, i.e. the playback is performed so that the video image taken from a side of the train with windows is shown.

As explained above, according to the present embodiment, in the case where the movie production recorded on a BD-ROM is a multi-angle type movie production, it is possible to add new scenes and to further enrich the content of the movie production.

Fourth Embodiment

Figure 39:
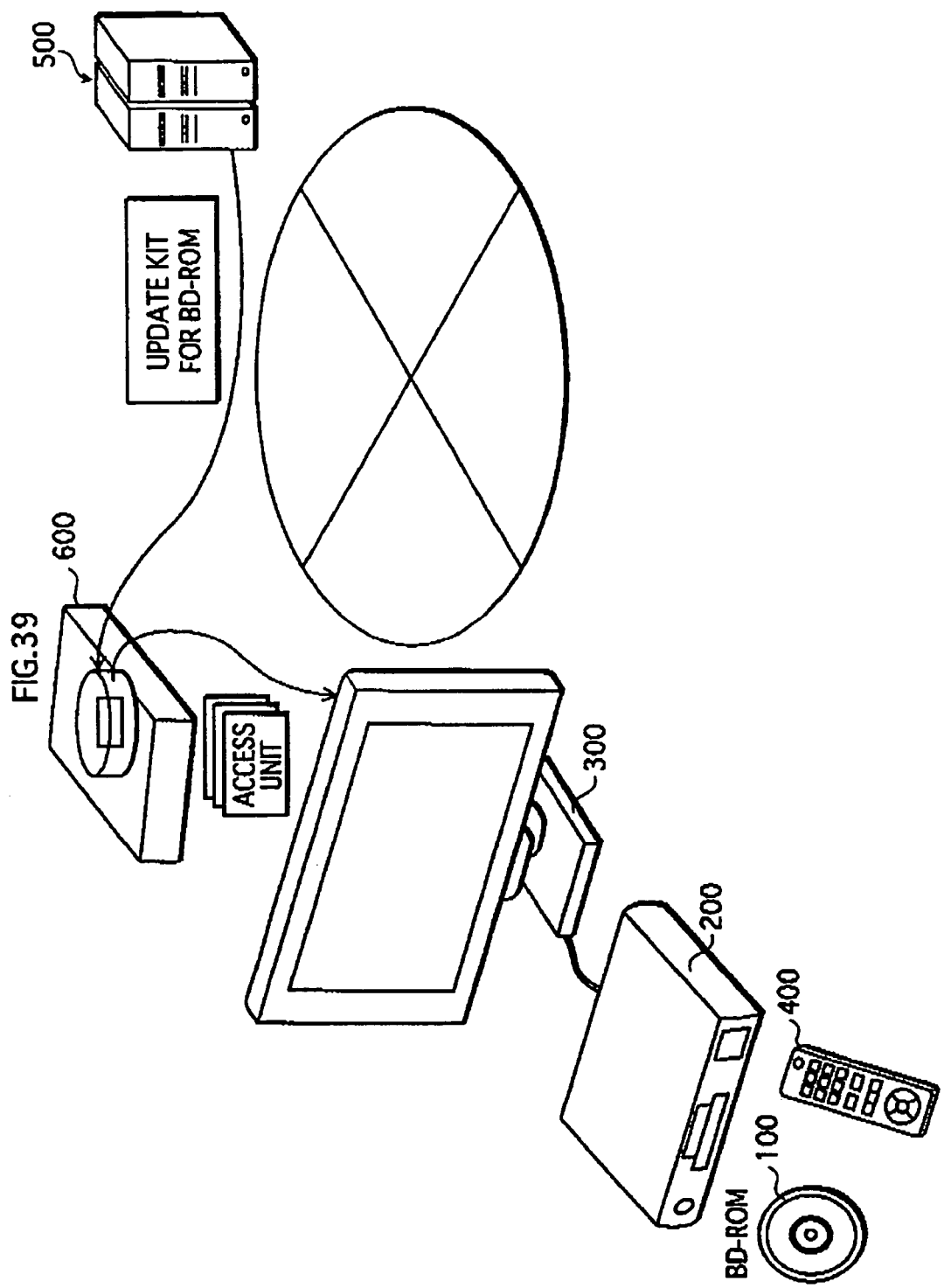
FIG. 39 shows a home theater system according to the fourth embodiment.

In the first embodiment, reading of ACCESS UNITs from the BD-ROM is performed in parallel with reading of ACCESS UNITs from the local HD 12. In the fourth embodiment, however, streaming playback is performed in parallel with reading of ACCESS UNITs from a BD-ROM. FIG. 39 shows a home theater system according to the fourth embodiment.

The system shown in the drawing is different in that it has the home server 600. In the drawing, the playback apparatus 200 downloads only the stream management information and the PL information from within an update kit. The home server 600 downloads the AV streams from within the update kit. Here, the home server 600 is a device for writing a content that has been distributed or broadcasted into a built-in HD provided inside the home server 600. A distributed AV stream is downloaded by the home server 600 and written into the built-in HD.

The playback apparatus 200 according to the present embodiment receives the supply of the AV stream out of the update kit from the home server 600. Thus, the general structure of the home theater system of the present embodiment is completed.

Figure 40:
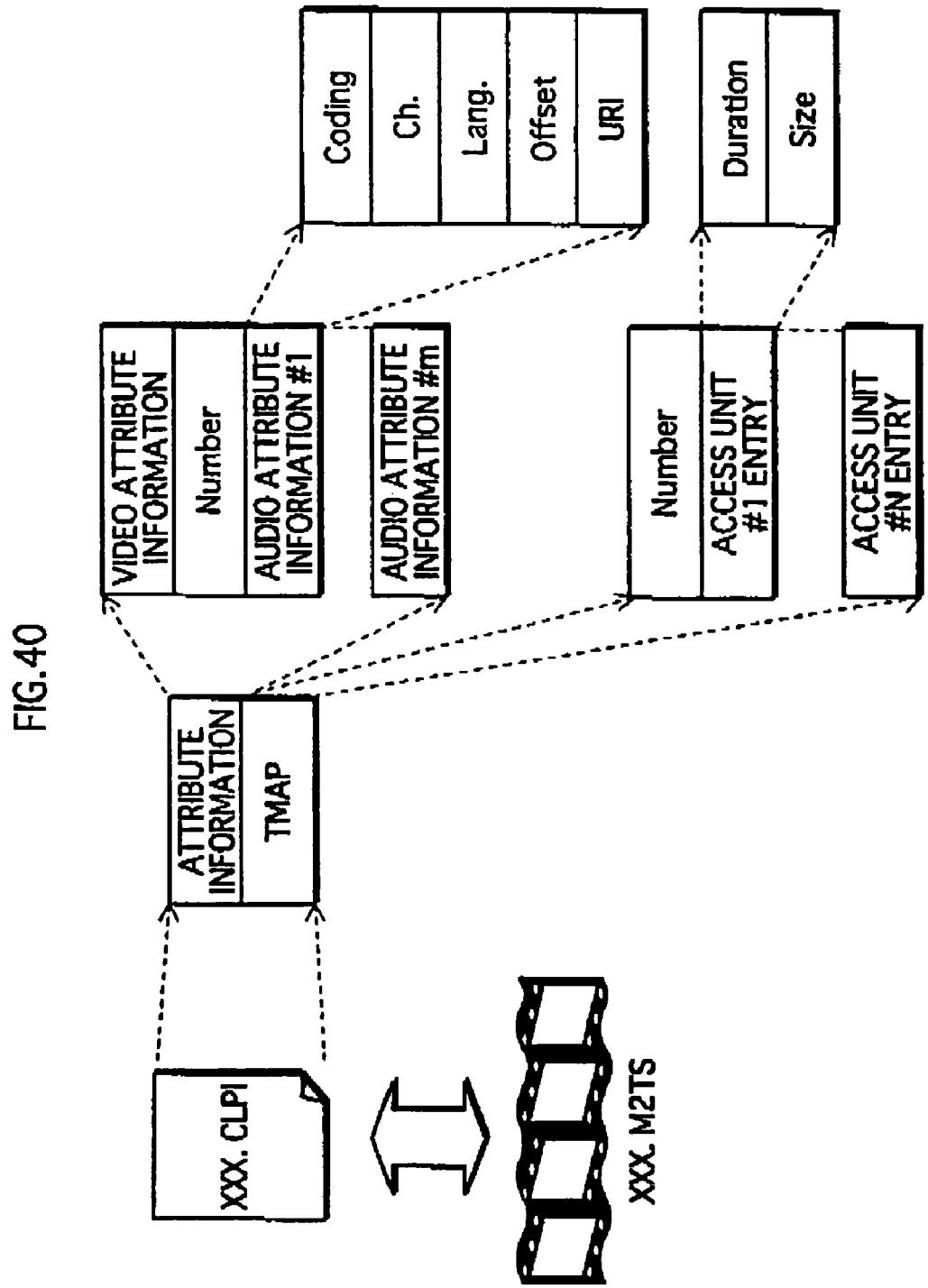
FIG. 40 shows stream management information according to the fourth embodiment.
Figure 41:
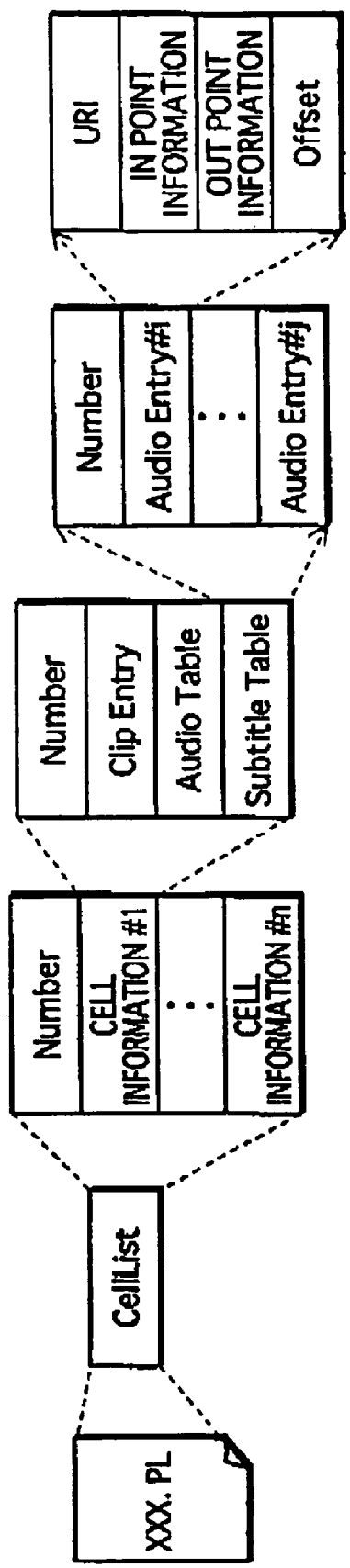
FIG. 41 shows PL information according to the fourth embodiment.

In order to obtain ACCESS UNITs from the outside of the playback apparatus when a streaming playback is performed, the stream management information and the PL information in the update kit are improved as shown in FIGS. 40 and 41. The improvement of the stream management information lies in that an "URI" indicating the location from which the AV stream being the target of the streaming playback is to be obtained is described in the Audio attribute information. That is to say, among information included in the Audio attribute information, an "URI" of the location from which the AV stream is to be obtained is written, instead of an "AVStream Name" and an "Audiostream ID".

The improvement of the PL information lies in that the "URI" of the location from which the AV Stream being the target of the streaming playback is to be obtained is written in an Audio Entry. That is to say, among information included in an Audio Entry within the PL information, the URI of the location from which the AV stream is to be obtained is written, instead of an "AVstream Name" and an "Audiostream ID".

The playback apparatus 200 downloads the stream management information and the PL information from within an update kit and writes the URI of the home server 600 into the stream management information and the PL information. Through this process, the preparation has been done for taking out AV streams from the home server 600.

Figure 42:
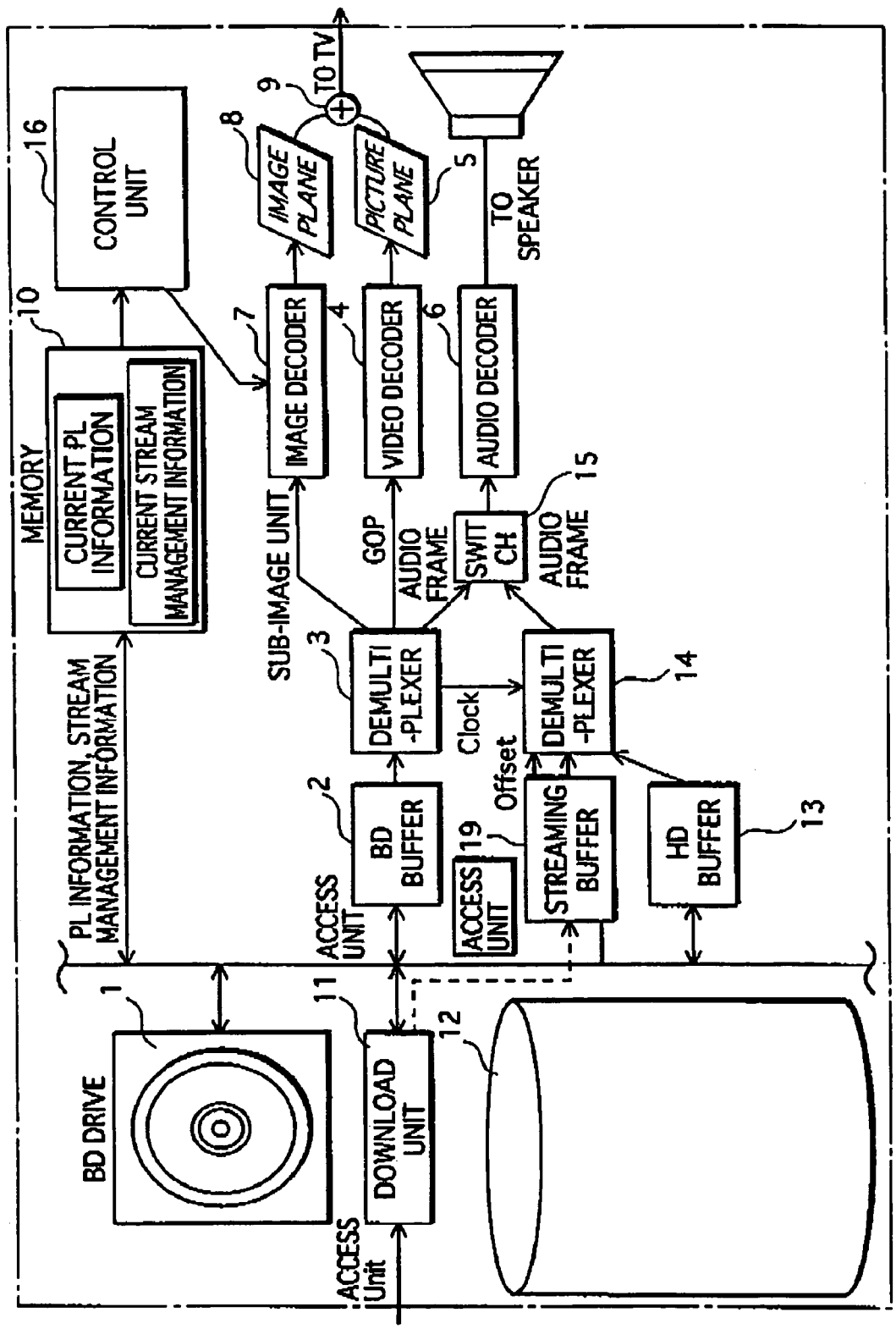
FIG. 42 shows the internal structure of the playback apparatus according to the fourth embodiment.
Figure 43:
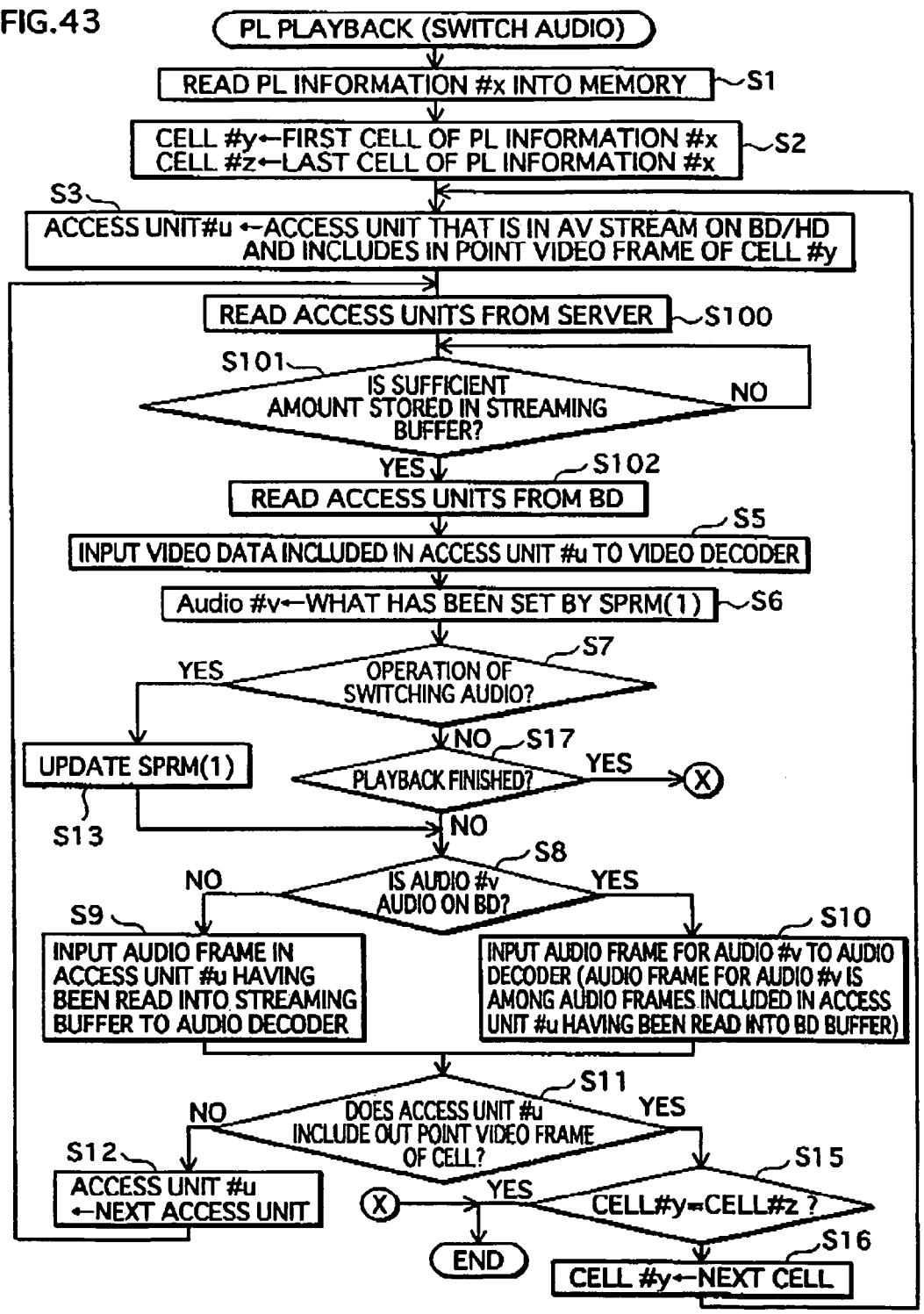
FIG. 43 shows the processing procedure performed by the control unit 16 according to the fourth embodiment.

Thus, the description of the improvements of the update kit according to the present embodiment is completed. The following describes the improvement on the playback apparatus. FIG. 42 shows the internal structure of the playback apparatus according to the fourth embodiment. The improvement on the playback apparatus mainly lies in that a streaming buffer 19 is added. The improvement on playback control performed by the control unit 16 is shown in the flow chart in FIG. 43. In this flow chart, the processing in Steps S100 through S102 has been newly added.

In Step S100, reading of ACCESS UNITs from the WWW server 500 is performed prior to the reading from the BD-ROM. The reason for this is because it is desirable to supply ACCESS UNITs to the streaming buffer 19 prior to the reading from the BD-ROM, since it takes a long time to obtain ACCESS UNITs from the www server 500. The procedure waits until a sufficient amount of ACCESS UNITs are stored in the streaming buffer 19 (Step S101), and when a sufficient amount has been stored, reading of the ACCESS UNITs from the BD-ROM into the BD buffer 2 is started (Step S102).

As soon as a sufficient amount of ACCESS UNITs has been stored in the BD buffer 2 and in the streaming buffer 19, the GOPs and the audio frames included in the ACCESS UNITS are inputted to the decoder. At this time, audio frames are selectively played back in accordance with the user's operation indicated by SPRM (1) (Steps S5 through S17).

As explained above, according to the present embodiment, it is possible to selectively play back either the audio stream downloaded into another device in a home network or the audio stream recorded on a BD-ROM; therefore, it is possible to more freely choose where the update kit should be located.

It should be noted that it is acceptable to perform the streaming playback with the supply of data from a distribution server, instead of from a device owned by the user such as the home server 600. However, since distribution via the Internet is in general at a low speed, it is desirable to read a sufficient amount of ACCESS UNITs into a stream file prior to the reading from a BD-ROM.

Fifth Embodiment

The fifth embodiment is related to an improvement for having a playback apparatus play back a new version of the movie production recorded on a BD-ROM with the use of a dynamic scenario being downloaded.

With regard to distribution of movie productions via optical discs, there are high demands from users that they wish to view world-wide successful movie productions at home as early as possible. Creators of movie productions assume the duties of creating movie productions with hard schedules. In recent years, the movie industries have a tendency of enhancing the added value by recording commentaries by directors and actors and the images for "the making of", the outtakes, and the unreleased scenes on the BD-ROMs besides the main bodies of the movie productions themselves. To create the subtitles and the dubbed audio for these additional features makes the hard schedules even harder.

In order to solve the problem, a dynamic scenario is downloaded in the present embodiment.

A dynamic scenario is a program that shows the playback control procedure for an AV stream with the use of PL information. A dynamic scenario is defined in the fourth layer in a layer model of the control of a playback apparatus. FIG. 44 shows the fourth layer in the layer model. In the drawing, one normal mode and two enhanced modes are written in the fourth layer. The one normal mode is a playback mode in a DVD-like playback environment and is referred to as a Movie mode. The first one of the two enhanced modes is a playback mode mainly for a Java virtual machine and is referred to as a Java mode. The second one of the two enhanced modes is a playback mode mainly for a browser and is referred to as a Browser mode.

Figure 45A:
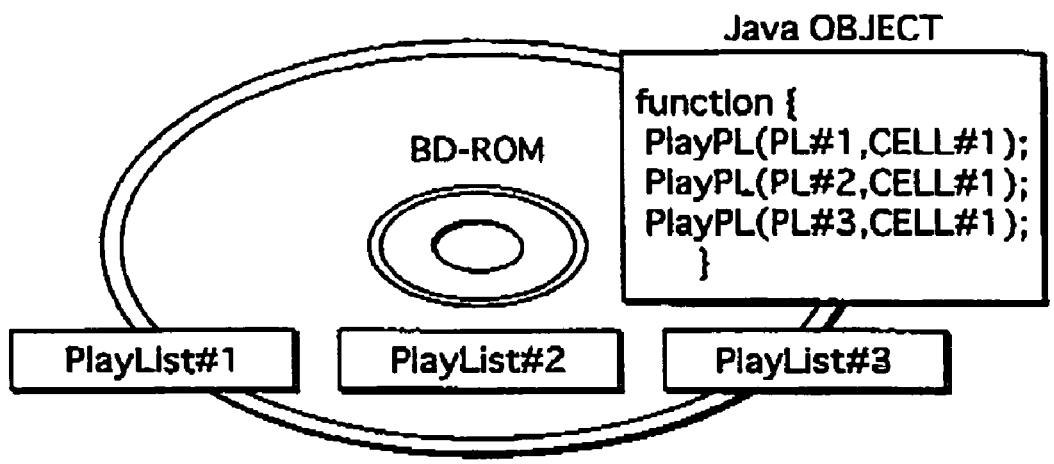
FIG. 45A shows an example of description of a dynamic scenario.

Since there are the three modes, i.e. the Movie mode, the Java mode, and the Browser mode, in the fourth layer, it is enough if a dynamic scenario is written so that it can be executed in only one of the modes. When it is desired that the control procedure be written with commands that are similar to those for a DVD player, it would be good that the playback control procedure in the Movie mode is written. This way, it is possible to have a playback apparatus perform a playback control that is similar to that of an existing DVD playback apparatus. When it is desired that the control procedure be written in a page description language, it would be good that the playback control procedure in the Browser mode is written, This way, it is possible to describe playback procedures for accessing a site in a network and for downloading a file. A dynamic scenario in the Java mode is ZZZ.CLASS, and a dynamic scenario in the Browser mode is ZZZ.HTM, which are shown in FIG. 44. A dynamic scenario in the Movie mode is ZZZ. MOVIE. In the case where a movie production constituted with three PLs is recorded on a BD-ROM, an example of how a dynamic scenario for this is described is shown in FIG. 45A. The dynamic scenario in the drawing is in the Java mode and written in a Java language and is referred to as a Java object. Since description can be made in the Java language, it is possible to write the playback control procedure in the Java object using programming with the use of IF sentences and the like. "Play PL (XX,YY)" in the drawing denotes a function for playing back the PL specified by a first argument XX, starting from the position indicated by a second argument. In an example of writing a program shown in FIG. 45A, since there are three function calls such as PlayPL (PL #1, CELL #1), PlayPL (PL #2, CELL #1), and PlayPL (PL #3, CELL #1), the three PLs such as PL #1, PL #2, and PL #3 are sequentially played back so as to form the movie production. It should be noted that PL #1, PL #2, and PL #3 denote not just pieces of PL information but the sets that are each made up of an AV stream, stream management information, and PL information.

Thus, the description of the BD-ROM according to the present embodiment is completed. The following describes an update kit according to the present embodiment.

An update kit according to the present embodiment includes a dynamic scenario. This dynamic scenario is used in place of the dynamic scenario recorded on a BD-ROM. To be more specific, in the case where a new dynamic scenario exists in an update kit, this new dynamic scenario is used instead of the dynamic scenario recorded on the BD-ROM.

Figure 45B:
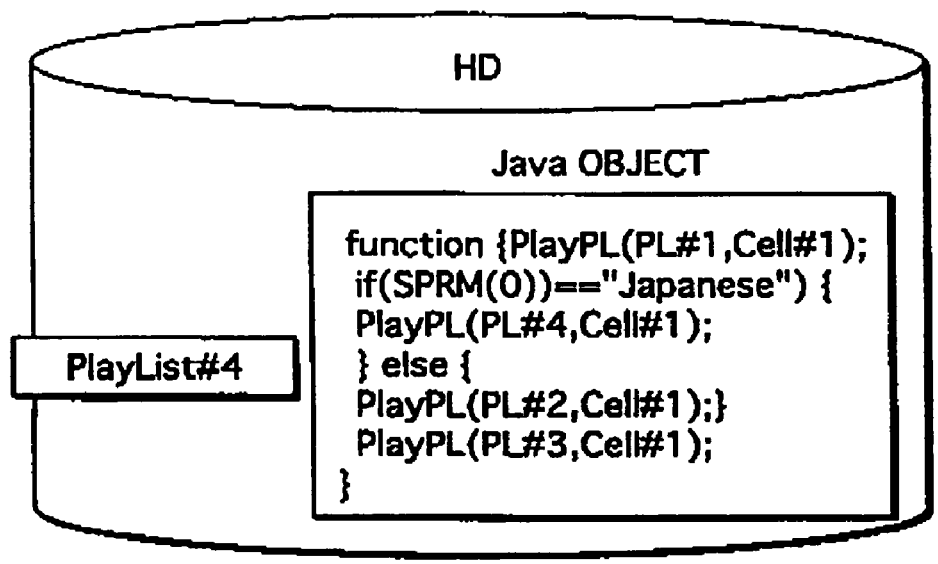
FIG. 45B shows another dynamic scenario that can be used in place of the dynamic scenario shown in FIG. 45A.

FIG. 45B shows a dynamic scenario to be used in place of the dynamic scenario shown in FIG. 45A. Such a dynamic scenario is written into a HD as being incorporated in an update kit. This update kit is for realizing a "language credit", which is to switch playback scenes depending on the language, and the update kit includes an additional PL, that is the PL #4, besides the dynamic scenario. This is a substitute image and is to be played back alternatively in place of the PL #2.

The new dynamic scenario in the update kit realizes conditional playback which is to playback the PL #4 (Link(PL #4, CELL #1, 0)), if the language setting (SPRM (0)) on the playback apparatus is "Japanese" (if(SPRM(0)==Japanese)), and to play back the PL #2 (Link(PL #2, CELL #1, 0)) if the language setting on the playback apparatus is some other language (else).

Figure 46A:
FIG. 46A shows the playback procedure with a dynamic scenario recorded on a BD-ROM.
Figure 46B:
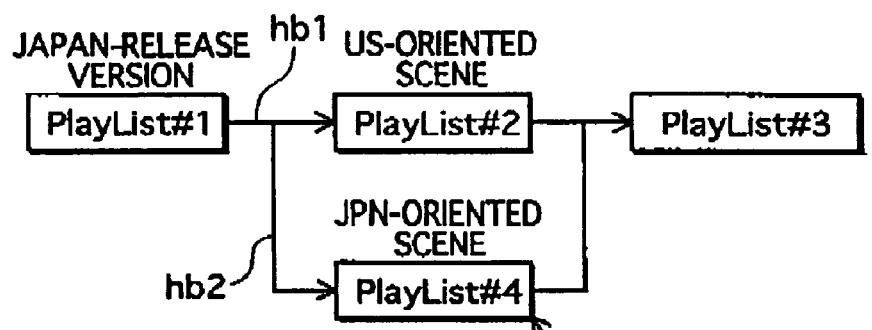
FIG. 46B shows the playback procedure with a dynamic scenario included in an update kit.

FIG. 46A shows the playback procedure with the dynamic scenario recorded on the BD-ROM. FIG. 46B shows the playback procedure with the dynamic scenario included in the update kit. The arrows hb1 and hb2 in FIG. 46B symbolically shows conditional branching with the dynamic scenario in the update kit.

As apparent from the drawings, the dynamic scenario recorded on the BD-ROM merely sequentially plays back the PLs 41, #2, and #3 recorded on the BD-ROM. On the other hand, the dynamic scenario in the update kit switches between playing back the PL for Japan (PL #4) and playing back the PL for the U.S.A. (PL #2), depending on the value of SPRM (0).

Thus, the description of the update kit according to the present embodiment is completed. The following describes the playback apparatus according to the present embodiment. FIG. 47 shows the internal structure of the playback apparatus according to the present embodiment. The playback apparatus in the drawing is different in that it comprises a dynamic scenario memory 20, a playback control engine 21, a DVD-like module 23, a Java module 24, a Browser module 25, and a module manager 26.

The dynamic scenario memory 20 is a memory for storing a current dynamic scenario and for being used in the processing performed by the DVD-like module 23 to the Browser module 25. The current dynamic scenario is a dynamic scenario being the current processing target. When no update kit is stored in the local HD 12, the dynamic scenario recorded on the BD-ROM serves as the current scenario. When an update kit is recorded in the local ED 12, the dynamic scenario in the local HD 12 serves as the current scenario.

The playback control engine 21 executes functions such as (i) an AV playback function, (ii) a playlist playback function, and (iii) an obtaining/setting function of the status of the playback. The AV playback function of the playback apparatus includes a group of functions that are inherited from DVD players and CD players and are for performing kinds of processing according to user operations, such as starting a playback "Play", stopping a playback "Stop", pausing a playback "Pause On", releasing a pause "Pause Off", releasing a Still function "Still Off", forwarding at a specified speed "Forward Play (speed)", rewinding at a specified speed "Backward Play (speed)", switching the audios "Audio Change", switching the sub-images "Subtitle Change", and switching the angles "Angle Change". The PL playback function is to interpret a piece of PL information and to start and stop playback according to the piece of PL information. When executing the PL playback function, the playback control engine 21 plays the role of the third layer (playback control based on a static scenario) in the layer model. The playback control engine 21 executes the AV playback function according to the user operations. Also, the playback control engine 21 executes the functions (ii) and (iii), in accordance with the function calls from the DVD-like module 23 to the Browser module 25. More specifically, the playback control engine 21 executes its functions according to instructions in user operations and instructions from upper layers in the layer model.

The DVD-like module 23 is a DVD virtual player that serves as the executing subject of the Movie mode. The DVD-like module 23 executes a current Movie object having been read into the dynamic scenario memory 20.

The Java module 24 is a Java platform and is made up of a Java virtual machine, a configuration, and a profile. The Java module 24 generates a current Java object from ZZZ. CLASS having been read into the dynamic scenario memory 20 and executes the generated Java object. The Java virtual machine converts the Java object written in a Java language into native codes for the CPU of the playback apparatus so that the CPU executes the native codes.

The Browser module 25 is a browser that serves as the executing subject of the Browser mode. The Browser module 25 executes a current WebPage object having been read into the dynamic scenario memory 20.

The module manager 26 performs mode management and branching control. The mode management performed by the module manager 26 is to assign one of the modules among the DVD-like module 23 to the Browser module 25 to be a module that executes the dynamic scenario. The principle used in the assignment of modules is to have a dynamic scenario executed by the DVD-like module 23. This principle is kept even if an intra-mode branching (a branching within one mode) occurs. An exception is made when an inter-mode branching (a branching between modes) occurs. When a branching from a Movie object to a Java object/a WebPage object, the Java module 24 or the Browser module 25 executes the current object.

The branching control performed by the module manager 26 is to specify a dynamic scenario being the branching destination, to read the dynamic scenario into the memory, and to have the dynamic scenario executed by one of the DVD-like module 23 to the Browser module 25.

In the playback apparatus configured as described above, as a result of the DVD-like module 23 to the Browser module 25 having the playback control engine 21 perform a PL playback in accordance with the dynamic scenario having been read into the dynamic scenario memory 20, the playback as shown in FIGS. 46A and 46B is achieved, Especially, when the playback shown in FIG. 46B is performed, the US-release version of the movie production recorded on a BD-ROM can be developed into a Japan-release version.

The following describes other examples of variations in the cases where a newest version of a dynamic scenario is downloaded as an update kit. The following section discusses an update kit for employing a parental lock on a movie production recorded on a BD-ROM.

Figure 48A:
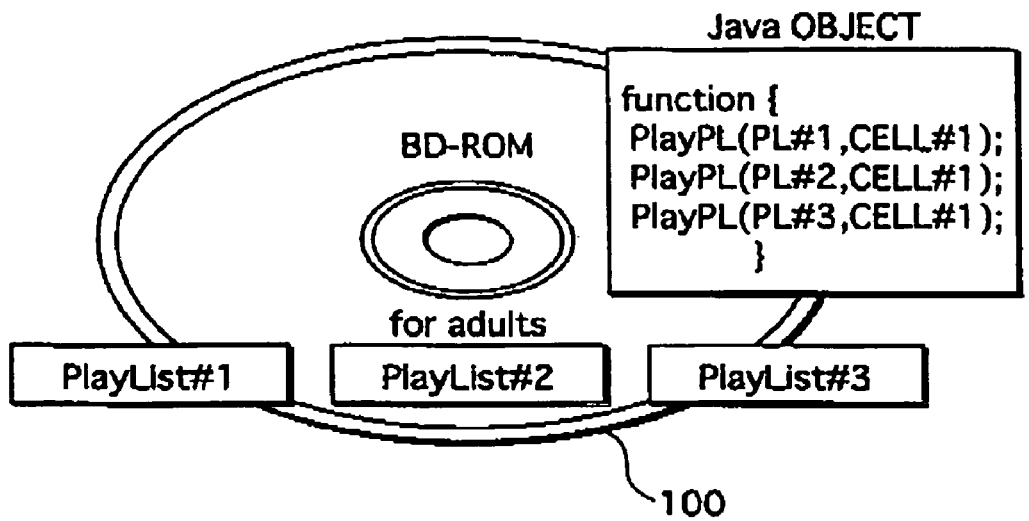
FIG. 48A shows what is recorded on a BD-ROM.
Figure 48B:
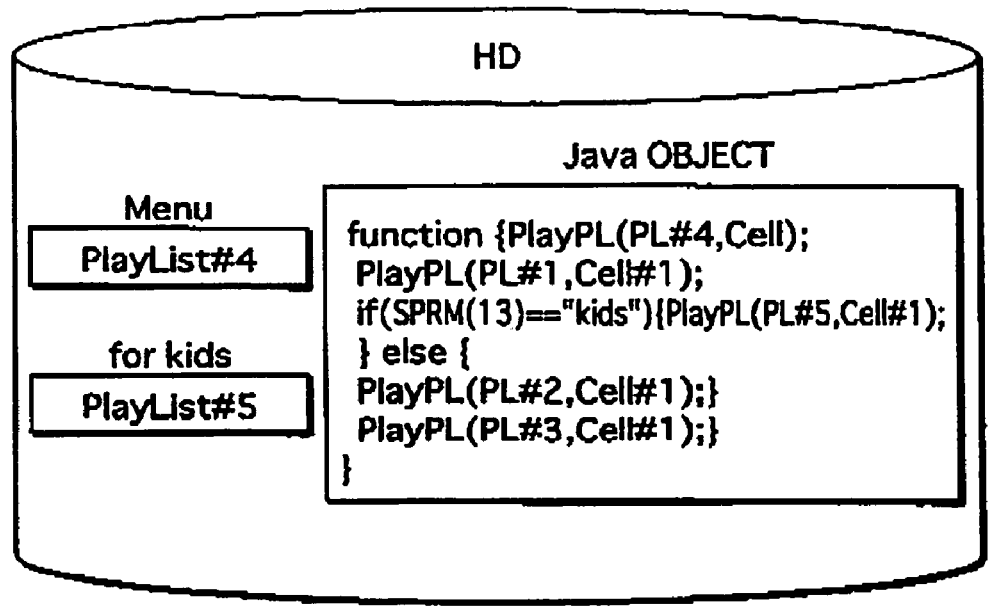
FIG. 48B shows an update kit for the BD-ROM shown in FIG. 48A.

FIG. 48A shows what is recorded on a BD-ROM. What is recorded on the BD-ROM are PL #1, PL #2, and PL #3. The PL #2 includes sexual or violent scenes and requires an age limit for viewers, the age limit being represented by, for example, PG-18.

FIG. 48D is an update kit for the BD-ROM shown in FIG. 48A. PL #4 included in the update kit is an additional PL. The PL #4 is a PL for displaying a menu and receiving a user selection from the user. This menu is to receive, from the user, a selection of either viewing by a child or viewing by an adult. The result of the selection is set in SPRM (13). In the PL #4, images that have a similar substance as the PL #2 are expressed in a cartoon-like manner to suit for viewing by children.

The replacement dynamic scenario (a Java object) plays back the PL #4, before playing back three PLs such as the PL #1, PL #2, and PL #3, and after a user selection is made, switches between the playback of PL #4 and the playback of PL #2 according to the user selection. The PL #4 is for receiving a setting for the parental level (SPRM (13)) in the playback apparatus. In the case where SPRM (13) is set as "Adult Only" (it (SPRM (13)==Adult Only)), the PL #2 is played back (Link(PL#2, Cell #1)). If the parental level in the playback apparatus is set as something else (else), the PL #5 is played back (Link (PL #5, Cell #1)). Since switching is achieved between playback of violent scenes and playback of scenes suitable for children depending on the setting in SPRM (13), even if a movie production distributed on a ED-ROM includes some violent scenes, it is possible to add a parental lock to the BD-RON in a retrofitting manner.

FIGS. 49A and 49B schematically show the playback procedures realized with a dynamic scenario recorded on a BD-ROM and a dynamic scenario included in an update kit. The arrows pc1 and pc 2 in the drawing symbolically shows a conditional playback with a dynamic scenario in the update kit. As apparent from the drawing, switching between playing back the PL #2 and playing back the PL #5 is achieved depending on the value of SPRM (13). Since the control over whether the PL #2 is to be played back or the PL #2 is to be bypassed and avoided is performed depending on the value of SPRM (13), even if the program recorded on the BD-ROM has no function of bypassing the PL #2, it is possible to realize the playback control of bypassing the PL #2 in a retrofitting manner with the use of the dynamic scenario distributed from a web site.

The following section discusses an update kit for developing a theater-release version of a movie production recorded on a BD-ROM into a director's cut version.

In a theater-release version of a movie production, some scenes have been cut and edited, so that the running time is not longer than a little over two hours. The running time is usually a little over two hours so that the number of times a movie is shown at a movie theater in a day can be increased. In other words, due to some circumstances that have nothing to do with the movie director's intention, editing/cutting is involved in a theater-release version of a movie production.

On the other hand, in a director's cut version of a movie production, unreleased scenes and some scenes that have been cut in the editing process are added to the theater-release version. The ideas and emotions of the movie director's intention are represented in a director's cut version.

Figure 50A:
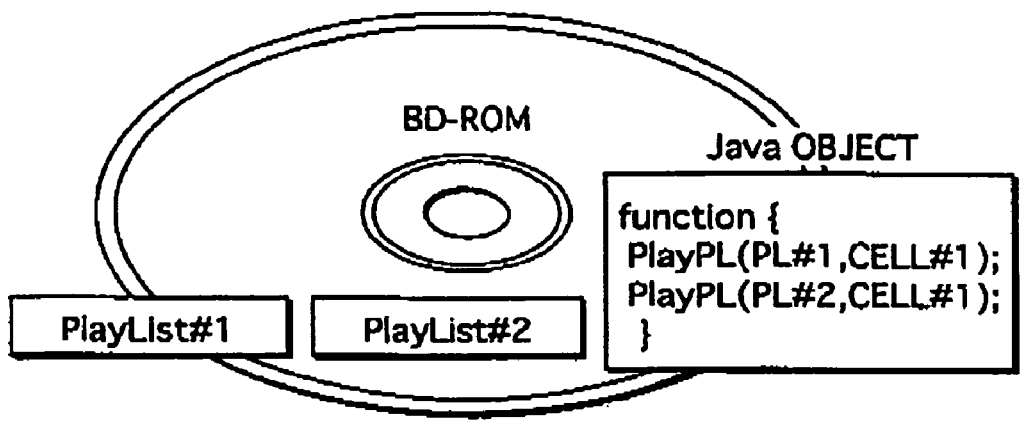
FIG. 50A shows PL #1, PL #2, and a dynamic scenario that are recorded on a BD-ROM.
Figure 50B:
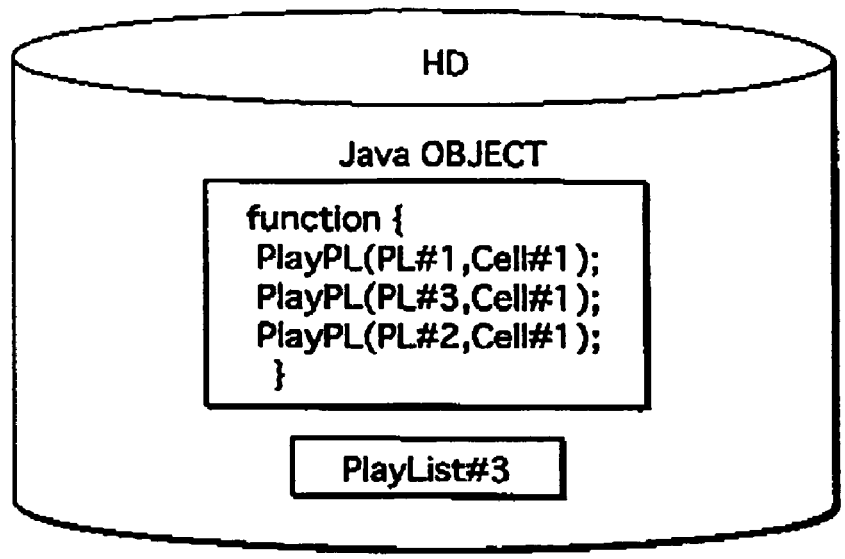
FIG. 50B shows an update kit.

FIGS. 50A and 50B show an update kit for developing a theater-release version of edited images recorded on a SD-ROM into a director's cut version. FIG. 50A shows the PL #1, the PL #2, a dynamic scenario (a Java object) that are recorded on a BD-ROM. FIG. 50B shows an update kit. The update kit includes an additional PL #3 and a replacement dynamic scenario.

Figures 51A, 51B:
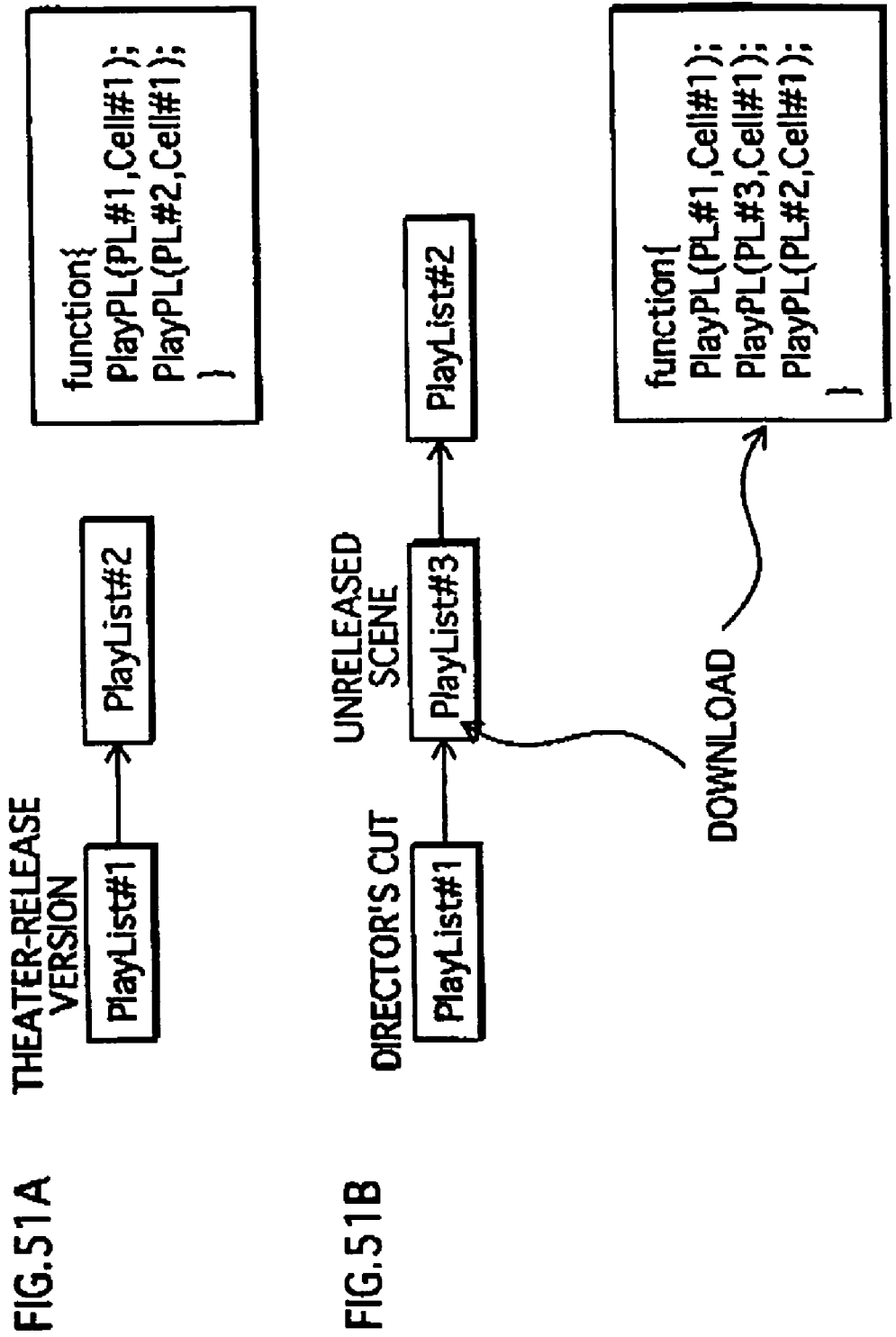
FIG. 51A shows a dynamic scenario that defines the playback order (PL #1, PL #2)
FIG. 51B shows the playback procedure with a replacement dynamic scenario.

In the case where a playback order (PL #1, PL #2) shown in FIG. 51A is defined by a dynamic scenario recorded on the BD-ROM, the replacement dynamic scenario (a Java object) inserts the PL #3, which forms an unreleased scene, between the PL #1 and the PL #2. FIG. 51B shows the playback procedure with a replacement dynamic scenario. Because of the dynamic scenario, the PLs are played back in the order of the PL #1, the PL #3, and then the PL #2.

As explained above, according to the present embodiment, by downloading, onto the playback apparatus, a dynamic scenario for branching depending on the status setting of the playback apparatus as a dynamic scenario for updating, it is possible to enable the user to view a version of a movie production that does not exist on the BD-ROM.

Further, according to the present embodiment, it is possible to realize an action that is equivalent to an upgrade to a higher version provided after a movie production is distributed on a ROM disc. Like upgrades of personal computer software after distribution, movie productions distributed on optical discs are also able to have upgrades; therefore, the burdens on creators of movie productions are lessened. Here, an upgrade of a piece of computer software is realized through installing a piece of software recorded on a ROM disc onto a personal computer and downloading a new update kit to be added to the HD. The upgrade of the movie production is different from the upgrade of the piece of computer software in that the playback apparatus does not install the upgrade onto the HD. Since the upgrade is not installed onto the HD, it is possible to avoid the situation where the installment onto the RD becomes a beginning of endless duplicates.

Sixth Embodiment

Figure 52:
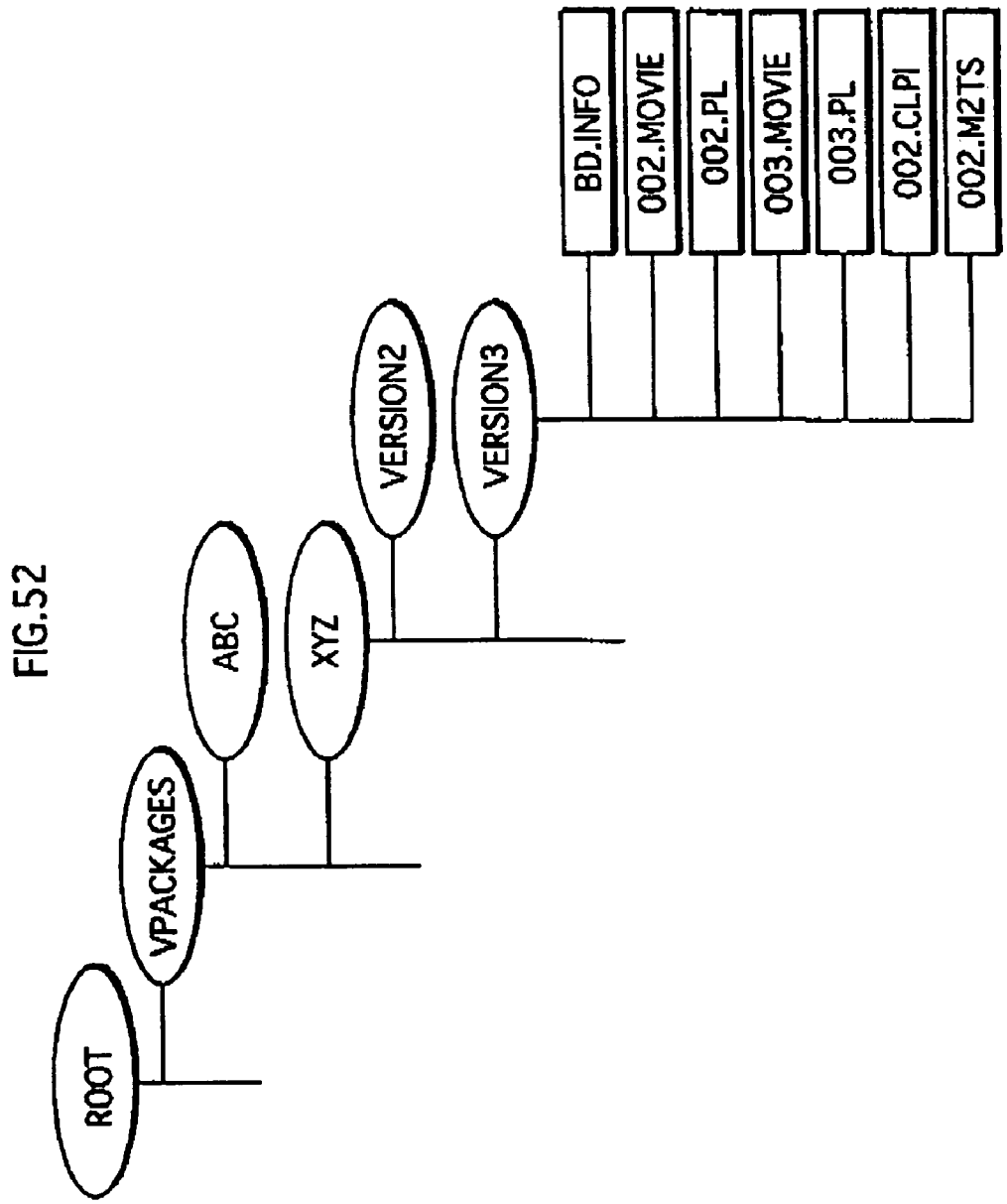
FIG. 52 shows a directory structure of an ED according to the sixth embodiment.

The sixth embodiment is related to an improvement for realizing version control of virtual packages. FIG. 52 shows a directory structure of an HD according to the sixth embodiment. As shown in the drawing, the HD has a Vpackage directory below the ROOT directory and has abc directory and XYZ directory below the Vpackage directory.

"Vpackage" in the drawing is a directory that is positioned above a directory in which an update kit for a BD-ROM is stored. Since the directory storing the update kit for the BD-ROM is positioned subordinate to the Vpackage directory, the directory storing the update kit is distinct from other directories in which other files are stored. When a BD-ROM is loaded, the control unit 16 is able to check whether or not an update kit exists by checking whether a directory named Vpackage exists.

In the drawing, "XYZ" and "abc" are each a volume label of a BD-ROM. It means that in the local HD 12 exist directories that correspond to a BD-ROM having a volume label named "XYZ" and a BD-ROM having a volume label named "abc". The sub-directories "Version 2" and "Version 3" that are positioned subordinate to the directory "XYZ" indicate the locations of update kits for updating the BD-ROM having the volume label "XYZ" into version 2 and into version 3. By arranging a sub-directory below a directory corresponding to each BD-ROM, it is possible to separately store update kits for different versions of a BD-ROM.

Thus, the description of the improvement on the local HD 12 according to the present embodiment is completed. The following describes the improvements on the constituent elements (the download unit 11 and the module manger 26) of the playback apparatus 200, the improvements being related to the directory structure of the local HD 12.

When downloading an update kit from the WWW server 500, the download unit 11 generates a new directory that corresponds to the BD-ROM in the local HD 12 and gives the directory a name that is the same as the volume label of the BD-ROM. In the case where a directory corresponding to the SD-ROM exists in the local HD 12, a new sub-directory is generated within the directory that corresponds to the individual BD-ROM. The new sub-directory has a directory name that corresponds to a new version of what is recorded on the BD-ROM. The update kit downloaded from the WWW server 500 is written into the new sub-directory. For example, in the case where an update kit that should be stored into the directory "XYZ" is for the second version, a sub-directory whose directory name is "Version 2" is generated below the directory "XYZ". In the case where an update kit is for the third version, a sub-directory whose directory name is "Version 3", is generated below the directory "XYZ". Subsequently, the download unit 11 accesses the WWW server 500, downloads an update kit, and writes the downloaded update kit into a sub-directory for the corresponding version.

When a BD-ROM has been loaded onto the playback apparatus 200, the module manager 26 reads a volume label from the BD-ROM and specifies, out of a plurality of directories in the local HD 12, a directory that matches the read volume label. Then, the module manager 26 checks whether or not sub-directories exist below the specified directory. If sub-directories exist, the module manager 26 refers to the directory names of the sub-directories, accesses to a sub-directory of which the version number incorporated into the directory name is the newest, and reads the update kit from the sub-directory. Thus, the description of the improvements on the constituent elements related to the directory structure according to the present embodiment is completed.

Figure 53:
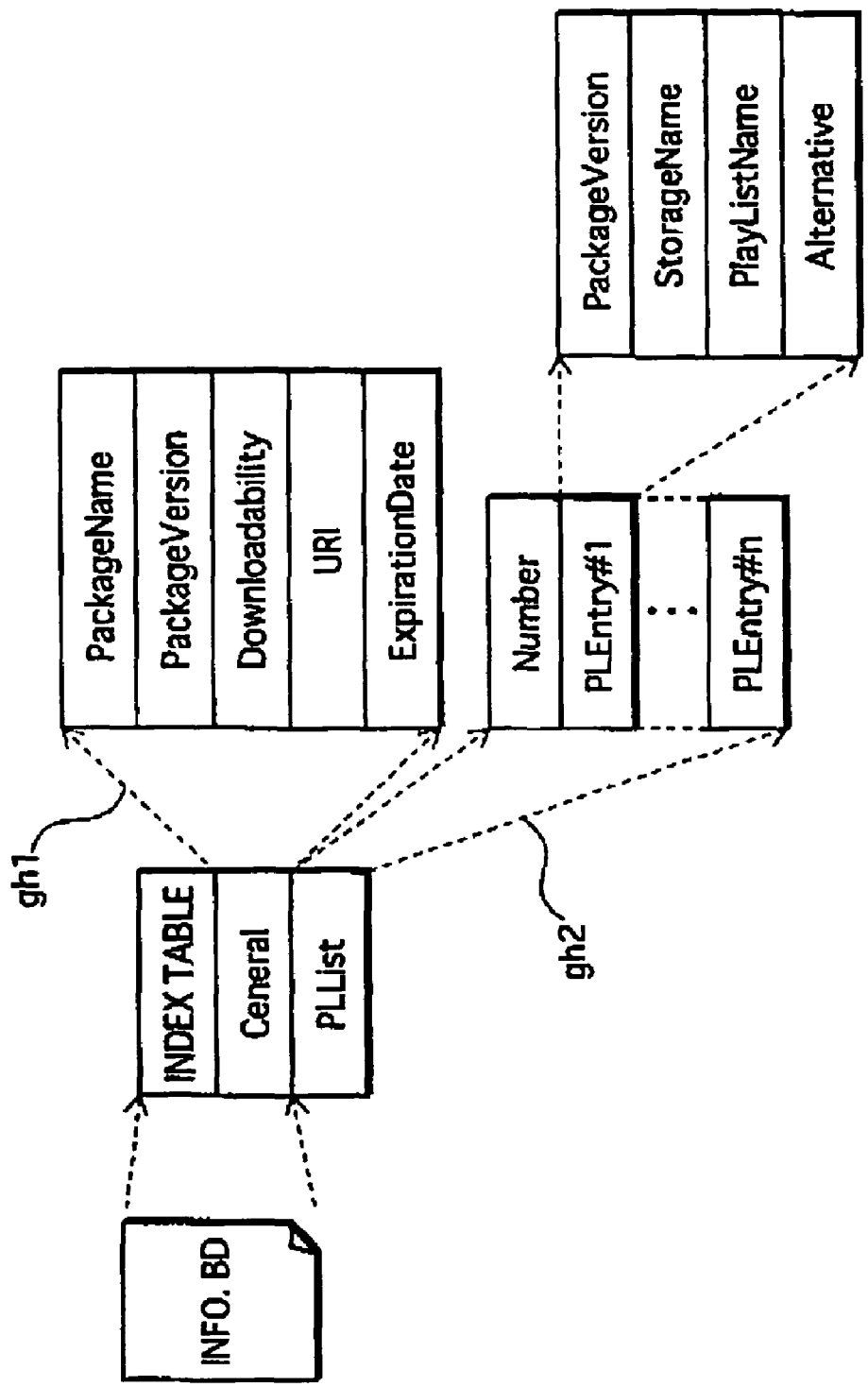
FIG. 53 shows the internal structure of INFO.BD.

As described above, a virtual package constituted with update kits that are stored separately for each version is unifyingly managed with the use of package unification information. The following describes the package unification information (INFO. BD) for each virtual package. FIG. 53 shows the internal structure of INFO. BD. The "INFO. BD" in a BD-ROM package and in a virtual package includes an Index Table, general information (General), and a PLList.

The Index Table is made up of a plurality of indexes for a dynamic scenario. The indexes include a FirstPlay INDEX and a menu INDEX. The FirstPlay INDEX specifies a dynamic scenario that the playback apparatus should execute first when a BD-ROM is loaded onto the playback apparatus (i.e. a start-up dynamic scenario).

The menu INDEX specifies a dynamic scenario that the playback apparatus should execute when the user performs a "menu call". The menus include a Top menu, a Title menu, a Chapter menu, an Audio menu, and a SubTitle menu. With the use of these INDEXes, the processing to be performed when the SD-ROM is loaded onto the playback apparatus or when a menu call is performed is defined in a BD-ROM package. As a result, INFO. SD defines the behavior of the BD-ROM package.

The following describes the general information (General), and the PLList.

The leaders with broken lines gh1 highlight the internal structure of the general information "General". As shown by these leaders, the general information "General" has a "Package Name", a "Package Version", a download permission flag "Downloadability", a "URI", and an "Expiration Date".

The "Package Name" is a name of a package that is in common between a BD-ROM package and a virtual package. Normally, the title of a movie is used as the "Package Name". The package name is used for bringing a BD-ROM package and a virtual package in correspondence with each other.

The "Package Version" expresses a version to which INFO. BD belongs as a numerical value. For example, for INFO. BD on the BD-ROM, the package version is set as "Version 1", whereas for INFO. BD in the virtual package, the package version is set as "version 2" or later.

The download permission flag "Downloadability" is a flag that indicates whether there is a possibility that an update kit may be provided in the future. In the case where the flag of INFO. BD recorded on a BD-ROM indicates "Undownloadable", it means that there is no possibility that an update kit may be provided. When the flag indicates "Downloadable", it means that an update kit for upgrading to a higher version may be provided.

By setting the downloadability flag so as to indicate that upgrading to a higher version is impossible, the virtual package is prohibited from being played back with an update kit. This situation may look like a disadvantage to the people in the business because there is no possibility of providing upgrades to higher versions; however, when the downloadability flag indicates that upgrades are impossible, to play back a combination of a BD-ROM with an update kit is prohibited, and it is therefore impossible to create a parody of a movie production with abuse of an update kit and defame the creator of the movie. In view of being able to avoiding defamation, there is a great advantage in setting the downloadability flag so as to indicate "undownloadable".

"URI" stands for Unified Resource Identifier, and it indicates, if there is a possibility that an update kit may be provided, a WWW site in the network in which the update kit exists. The download unit 11 is able to obtain a newest version of an update kit by accessing the WWW site indicated by the URI.

The "Expiration Date" shows the date until which the downloaded update kit is valid. The playback control engine 21 compares the current date and time clocked by the calendar and the clock inside the playback apparatus with this piece of information of the expiration date and checks if the update kit is valid or is past the expiration date. When the current date and time is before the expiration date, playback is performed with the use of the update kit including INFO.BD. When the current date and time is past the expiration date, playback with the use of the update kit including INFO. BD is not performed.

The following describes the internal structure of a "PLList". The leaders with broken lines gh2 highlight the internal structure of a "PLList". A PLList includes the number of the PlayLists included in the package (Number) and pieces of entry information for each PlayList (PLEntries #1-#n).

In each of the pieces of playlist entry information "PLEntries", it is possible to make the setting of, for each piece of PL information, information such as "Package Version", "Storage Name", "PlayList Name", and alternative PL information "Alternative".

The "package Version" expresses a version to which the piece of PL information corresponding to the PL Entry belongs, as a numerical value. For example, for a piece of PL information on a BD-ROM, the Package version is set as Version 1, whereas for a piece of PL information in a virtual package, the Package Version is set as "Version 2" or later.

The "StorageName" indicates in which one of, for example, a BD-ROM, a HD, a semiconductor memory card, and a server in the Internet, the piece of PL information corresponding to the PLEntry is located. Since it is the download unit 11 that positions a piece of PL information either in a HD or in a semiconductor memory card, the download unit 11 automatically provides this information after downloading an update kit.

The "PlayList Name" is a serial number for the piece of PL information corresponding to the PLEntry, and a value such as PL #1 is set.

The alternative PL information, "Alternative", indicates a playlist that should be alternatively played back in case a piece of PL information corresponding to the PLEntry is damaged due to a download failure or a trouble in the HD. When a piece of PL information is damaged, it means that it is impossible to properly interpret the piece of PL information due to circumstances such as (i) the CELL information constituting the piece of PL information fails to specify an AV stream, (ii) the In point and the Out point of the CELL information constituting the piece of PL information are improper, and (iii) the piece of PL information is already deleted. The alternative PL information normally specifies a piece of PL information recorded on a BD-ROM. The reason is because it is rare that PL information on a BD-ROM gets damaged.

Thus, the description of INFO. BD for a virtual package is completed. The following describes an improvement on a playback apparatus (the download unit 11, and the module manager 26) related to INFO. BD.

The download unit 11 refers to the URI in the General information in INFO. BD and downloads an update kit or an upgrade from the WWW server 500 in the network indicated by the URI, and writes the downloaded update kit into a directory that corresponds to the individual SD-ROM in the local HD 12. The download unit 11 refers to a calendar inside the playback apparatus 200 and judges whether or not the current date and time has reached the date and time indicated by the "Expiration Date" in the General information in INFO. BD. If the current date and time is before the expiration date, the download unit 11 accesses the WWW server 500 based on the URI in the General information in INFO. SD and attempts to perform the download.

The playback control engine 21 checks, prior to the processing of a piece of PL information, if the piece of PL information located at the location indicated by the Storage Name in the PLEntry is damaged or not. If not damaged, the piece of PL information located at the location indicated by the Storage Name in the PL Entry is interpreted. If the piece of PL information is damaged, a piece of PL information indicated by the "Alternative" in the PLEntry is read and interpreted.

The module manager 26 plays back a virtual package according to the flow chart in FIG. 54. The following describes the processing procedure performed by the module manager 26 according to the present embodiment, with reference to the flow chart.

The dynamic scenario i in the flow chart in FIG. 54 denotes a dynamic scenario i being the target of reading from the BD-ROM or from the local HD 12.

It is judged whether or not the Downloadability flag in INFO.BD on the BD-ROM indicates "undownloadable" (Step S60: YES). After a newest version of INFO. BD is read from a subordinate directory in the HD (Step S61), an initial setting of the dynamic scenario i is made (Step S63).

In the case where the downloadability flag in the INFO. BD indicates "undownloadable", INFO. BD is read from the BD-ROM, and control is performed targeting only the BD-ROM. In the case where the downloadability flag indicates "undownloadable", it is possible to read the dynamic scenario, the PT, information, the AV stream and the stream management information without accessing the local HD 12; therefore, the playback processing is performed swiftly. During the initial setting, a dynamic scenario that is written in the FirstPlay INDEX in the Index Table within INFO. BD is set as the dynamic scenario i (Step S63).

In Step S64, a newest version of the dynamic scenario is searched for. In the case where a newest version of the dynamic scenario i exists in a subordinate directory in the HD (Step S64: YES), the newest version of the dynamic scenario i is read from the subordinate directory in the HD (Step S66). In the case where a newest version does not exist in the subordinate directory, the dynamic scenario i is read from the BD-ROM (Step S65).

After the dynamic scenario i is read, each of the commands constituting the dynamic scenario i is executed (Steps S67 through S71). When a command to be executed is a branching command, the branching destination in the command is set as the dynamic scenario i (Step S71), and the procedure advances to Step S64.

Figure 55A:
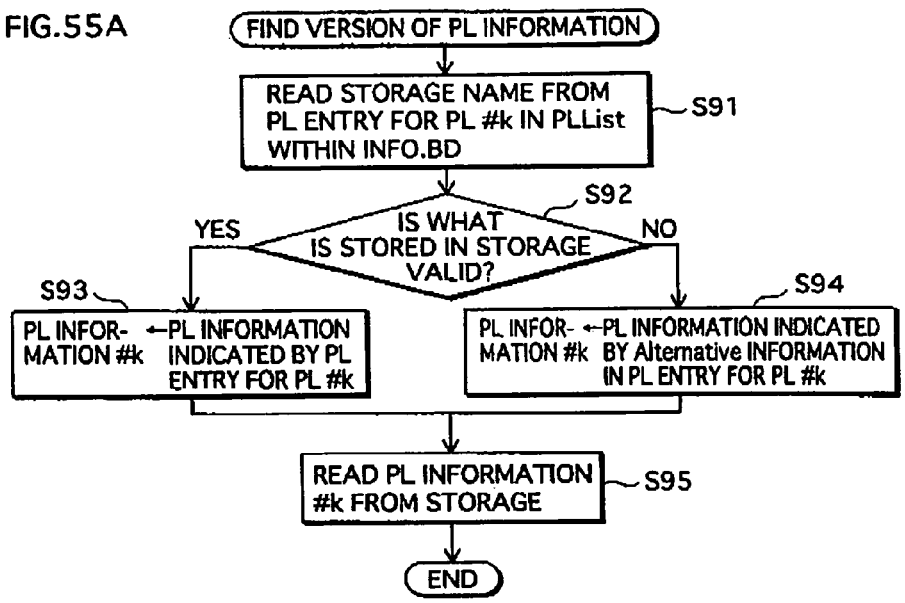
FIG. 55A and FIG. 55B show the processing procedure by the module manager 26 according to the sixth embodiment.

When a command to be executed is a command for calling a PlayPL function, PL playback processing is performed in Step S72. When the PL is played back at this time, it is necessary to search for a newest version of the PL information. The following describes the procedure of searching for a PL, with reference to the flow chart in FIG. 55A. The PL to be played back in Steps S91 through S95 in the flow chart will be referred to as the PL #k.

The Storage Name is read from the PLEntry of the Pt #k in the PLList in INFO. BD (Step S91). The playback control engine 21 is instructed to judge whether or not what is stored in the storage is damaged (Step S92). When what is stored is valid, the piece of PL information indicated by the PLEntry of the PL #k is set as the PL information #k (Step S93). When what is stored is invalid, the piece of PL information indicated by the Alternative information in the PLEntry of the PL #k is set as the PL information #k(Step S94). After the PL information #k is set in the above process, the PL information #k is read (Step S95).

Thus, the description of the procedure of searching for a PL is completed. The following describes searching for a newest version of an AV stream specified by PL information.

Figure 55B:
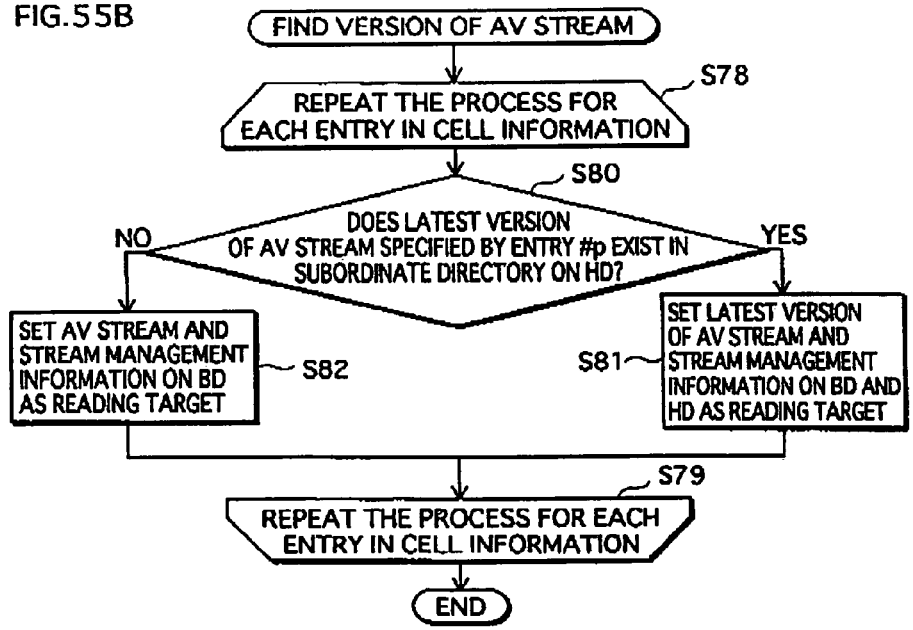

FIG. 55B is a flow chart that shows the processing procedure of searching for a version of an AV stream. The processing in Steps S78 through S82 is to repeat the processing in Steps S80 through s82 for each of the Entries in the CELL Information (Steps S78 and S79).

The Entries in the CELL information include an Audio Entry in an Audio Table, a Subtitle Entry in a SubTitle Table, and an Angle Entry. Among these Entries, an Entry being the processing target will be referred to as the Entry #p. The processing in Steps S80 through S82 is a processing for judging a target to read data from, i.e. judgment is made as to from which of the ED or the BD-ROM, the AV Stream specified by each Entry should be read. In Step s80, it is judged whether a newest version of the AV stream specified by the Entry #p exists in a subordinate directory in the HD. If the newest version exists (Step S80: YES) the newest version of AV stream and the stream management information in the local HD 12 and the AV stream and the stream management information on the BD-ROM are set as the reading targets (Step S81). If the newest version does not exist in the subordinate directory, the AV stream and the stream management information on the BD-ROM are set as the reading targets (Step S82). By performing the processing described in the first, second, or third embodiment of the present invention, so as to read the reading targets set above, it is possible to selectively output one of (a) the audio, the subtitle, and the angle recorded on the BD-ROM and (b) the audio, the subtitle, and the angle recorded in the local HD 12.

The following describes the process of reading an AV stream, stream management information, and PL information in accordance with the processing procedure described in the flow chart, using specific examples. The description in this section is based on an assumption that there is a directory structure shown in FIG. 52.

In the aforementioned flow chart, in the case where files in newer versions than the file recorded on the BD-ROM exist in the HD, the newest one of those files in the HD is selected and read. FIG. 56 schematically shows the process of reading files stored on a BD-ROM, in the Version 2 directory, and in the Version 3 directory.

In the drawing, the four boxes with broken lines arranged across the page symbolically show the BD-ROM, the Version 2 directory, the Version 3 directory, and the buffer in the playback apparatus. The white bold arrows symbolically show the selections of files being selected by the control unit 16 from among the files stored on the BD-ROM and in the Version 2 and the Version 3 directories.

The arrow nj1 schematically shows reading INFO. BD in Step S61. In the case where INFO.BD is stored on the BD-ROM and in the Version 2 and the Version 3 directories, as a result of the reading process, INFO. BD stored in the version 3 directory is read into the memory.

The arrow nj2 schematically shows reading a piece of PL information, "002.PL", in Step S66. In the case where "002.PL" is stored on the BD-ROM and in the Version 2 and the Version 3 directories, as a result of the reading process, 002.PL stored in the Version 3 directory is read into the memory.

When a file is in a plurality of different versions, a selection is made so that the file is taken from a directory in the newest version so that AV streams, PL information, and dynamic scenarios are supplied; therefore, it is possible to supplement the functions of a package released on a BD-ROM, with an update kit downloaded from the WWW server 500.

Since it is possible to supplement functions that are missing from the BD-ROM or from an update kit that has already been distributed, with a newer version of update kit, even if a problem arises in the BD-ROM or the update kit that has already been distributed, the distributor is able to correct the errors without recalling the products. Since there is no risk of having to recall the products, it is possible to eliminate distributors' anxiety experienced when movie productions are distributed.

In the flow charts shown in FIGS. 54 and 55, only the newest version of set of INFO. BD, dynamic scenario, and PL information is read into the memory; however, it is acceptable to sequentially read all the versions of sets of INFO. ED, dynamic scenario, and PL information into the memory and to generate a virtual package in the memory, from a newest version of set of INFO. BD, dynamic scenario and PL information, by working on a principle that an older version of set of INFO. BD, dynamic scenario, and PL information is overwritten by a newer version of set of INFO. BD, dynamic scenario, and PL information.

Seventh Embodiment

In the sixth embodiment, when a plurality of versions of an update kit exist in the local HD 12, a newest version among those is played back. In the seventh embodiment, virtual packages in different versions are presented to the user so that the user is able to select a preferred virtual package.

Since it is possible to play back different versions of virtual packages, the present embodiment has an arrangement wherein histories of playback and recording for each version are kept in the local HD 12, a server, or a semiconductor memory card. Information indicating the histories of playback and recording for each version will be referred to as virtual version information, A table showing pieces of virtual version information for different versions of virtual packages will be referred to as a virtual package table.

Figure 57:
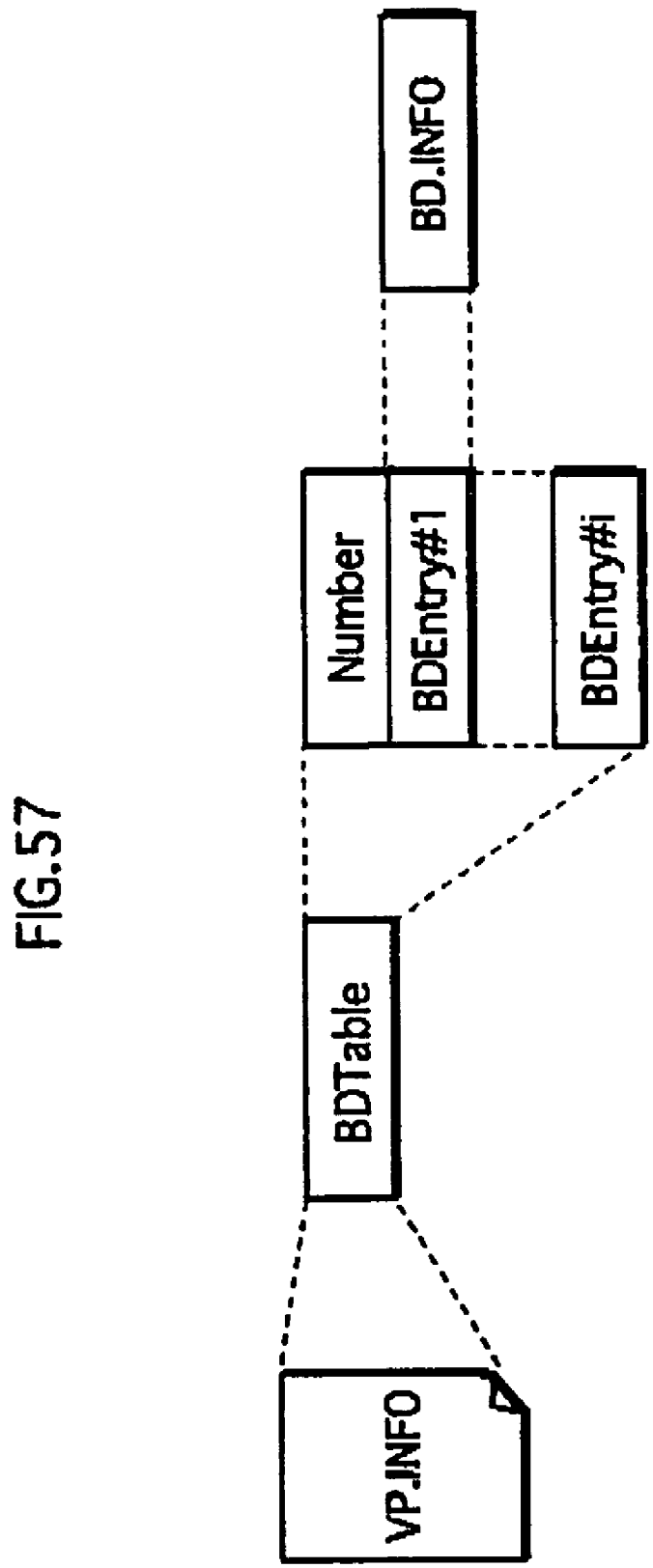
FIG. 57 shows the structure of a virtual package table.

FIG. 57 shows the structure of a virtual package table. The virtual package table "BD Table" is stored in a file "VP. INFO", and located in a directory "Vpackage" shown in FIG. 52. The virtual package table includes BD Entries (BDEntries #) and the number of the Entries (Number). Each of the BD Entries is the information (virtual package information) for a corresponding "INFO. BD".

FIG. 58 shows the structure of a virtual package table for INFO. BDs. The virtual package table is structured with "Package Name" of each version, "recording position information" showing where the update kit constituting the virtual package is recorded, and "ending position information" showing the playback ending point in an immediately previous playback of the package. For example, for the package "ABC", it is shown that the recording position of the update kit is the "ABC" directory in the local HD, and the ending position of the immediately previous playback of the package is at the time point of 3 minutes and 24 seconds in the CELL #1 of the PL #2. For the package "XYZ", there is no recording position information (shown as "-----" in the drawing). It means that the package is not a virtual package, but is an original package recorded on a SD-ROM. For the package "WWW", it is shown that the recording position is "Memory: ¥WWW". It means that the recording position of the update kit is the directory "WWW" in a semiconductor memory card. No ending position information is provided because the package has not been played back yet.

For the package "JKF", it is shown that the package is recorded in the directory "JKF" in a home server.

Thus, the description of virtual version information is completed. The following describes improvements on the playback apparatus side (the download unit 11, the playback control engine 21, and the module manager 26) according go the present embodiment.

When downloading an update kit from the WWW server 500, the download unit 11 sets the recording position information which shows the writing position as virtual version information for the version corresponding to the update kit.

When playback of a PL is finished, the playback control engine 21 generates information indicating the playback ending point and sets this information into virtual version information for the version corresponding to the PL.

Figure 59:
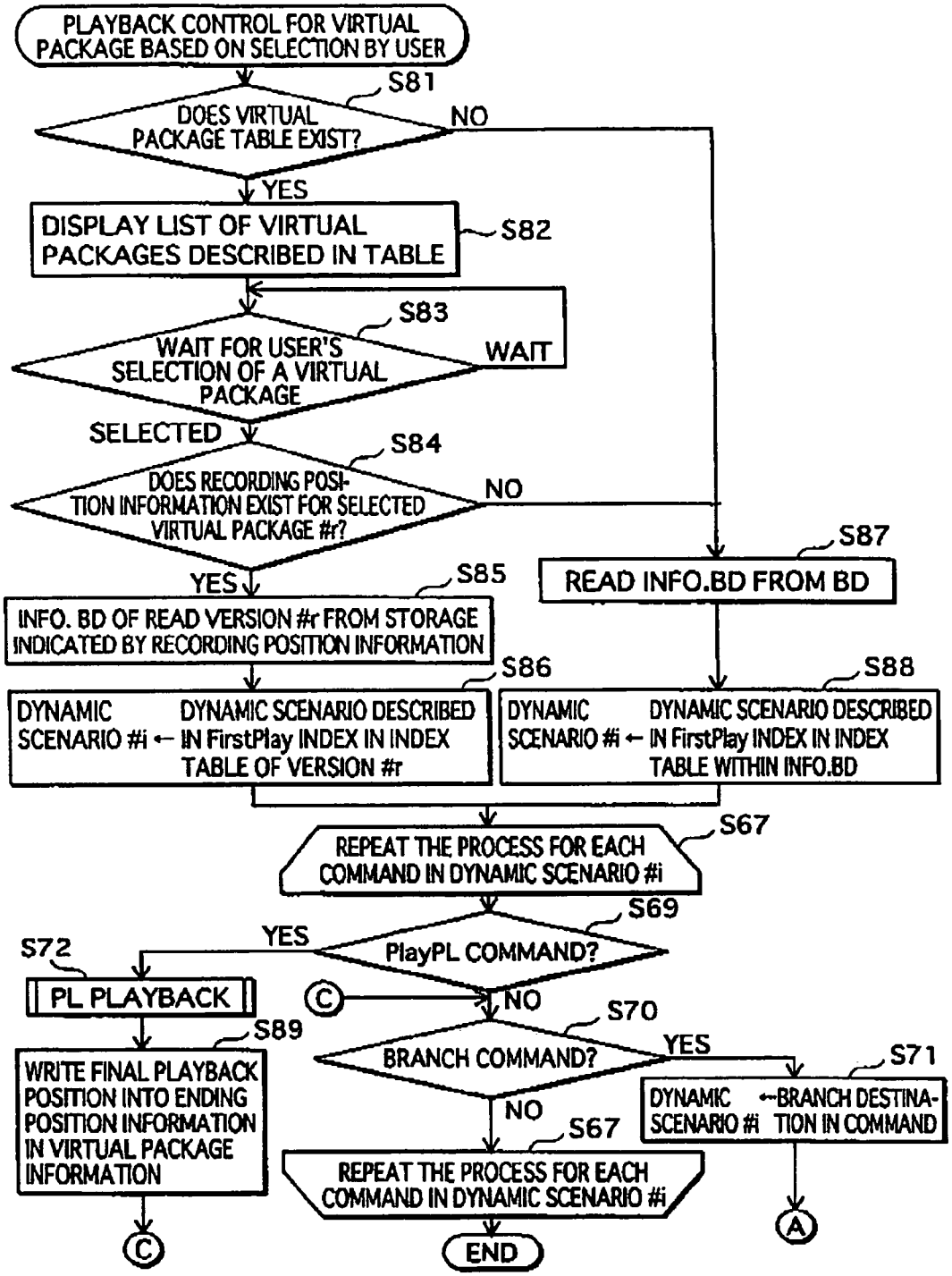
FIG. 59 is a flow chart that shows the processing procedure by the module manager 26 according to the seventh embodiment.

The module manager 26 unifyingly controls the playback apparatus 200 in accordance with the flow chart in FIG. 59. The following describes the procedure of playing back a PL with reference to FIG. 59.

When the procedure shown in this flow chart starts to be executed, it is judged whether or not a virtual package table exists (Step S81), and a list of virtual packages is displayed (Step S82).

Figure 60:
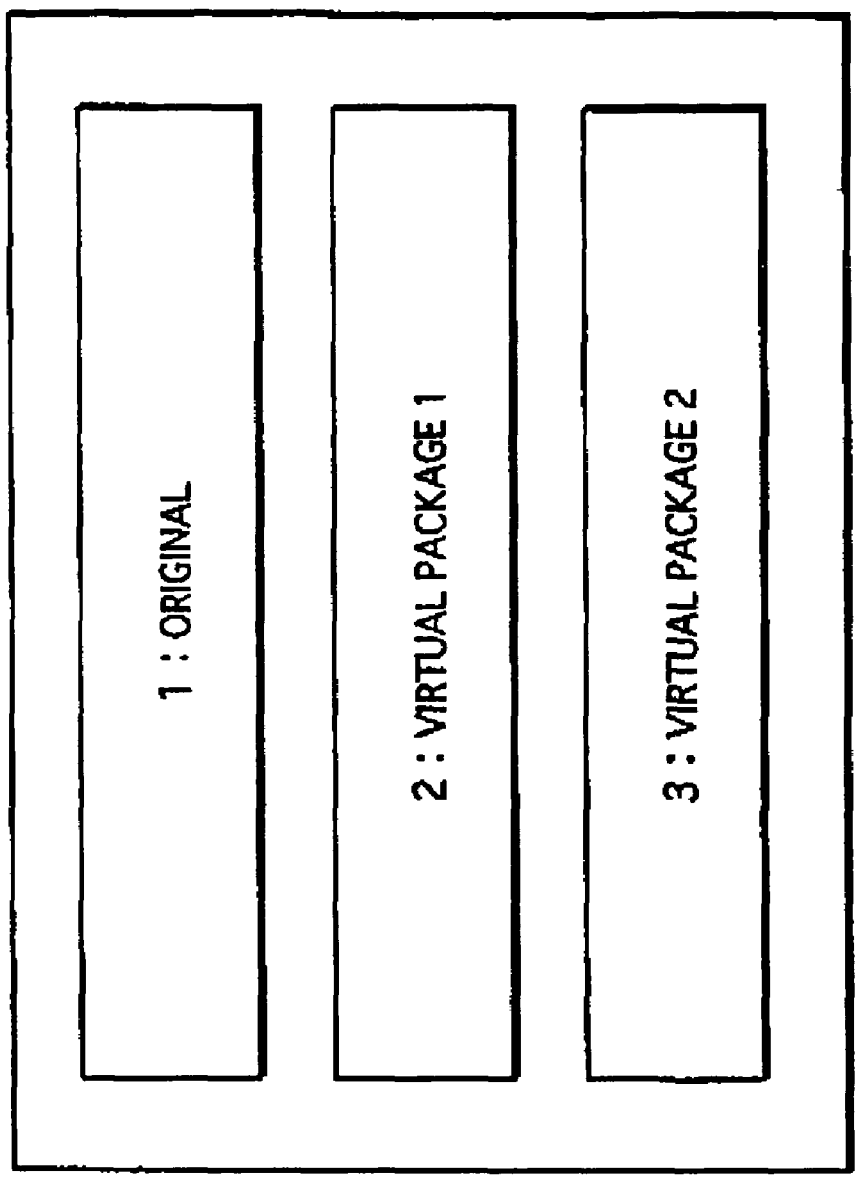
FIG. 60 shows a screen showing a list in Step S82.

FIG. 60 shows a screen showing the list in Step S82. Each of the buttons ("1: ORIGINAL", "2: VIRTUAL PACKAGE 1", and "3: VIRTUAL PACKAGE 2") on the screen showing the list visualizes a different one of the versions of the virtual packages and changes into a selected state and a confirmed state according to a user operation. The screen showing the list is displayed, and the procedure waits until a user selects a virtual package (Step S83). After a selection is made, it is judged whether or not recording position information for the selected virtual package #r exists (Step S84). If recording position information exists, INFO. BD of the version #r is read from the storage indicated by the recording position information (Step S85), and a dynamic scenario written in the FirstPlay INDEX in the INDEX Table for the version #r is set as the dynamic scenario i (step S86).

When no recording position information exists, INFO. BD is read from the BD-ROM (Step S87), and a dynamic scenario written in the FirstPlayINDEX in the INDEX TABLE in the INFO. BD is set as the dynamic scenario i (step S88). At this time, the number of the virtual package selected by the user is stored in SPRM (24).

When the dynamic scenario i has been set in the process described above, the processing in Steps S67 through S73 is performed. During this processing, every time the playback control engine 21 plays back a PL (Step S72), the eventual playback position is written as ending position information in the virtual version information (Step S89).

As explained above, according to the present embodiment, when there is a plurality of versions of a virtual package, it is managed, for each of the versions, how much of the version is viewed by the user; therefore, it is possible to prevent the user from experiencing confusion caused by the fact that there exist different versions at the same time.

Eighth Embodiment

Figure 61:
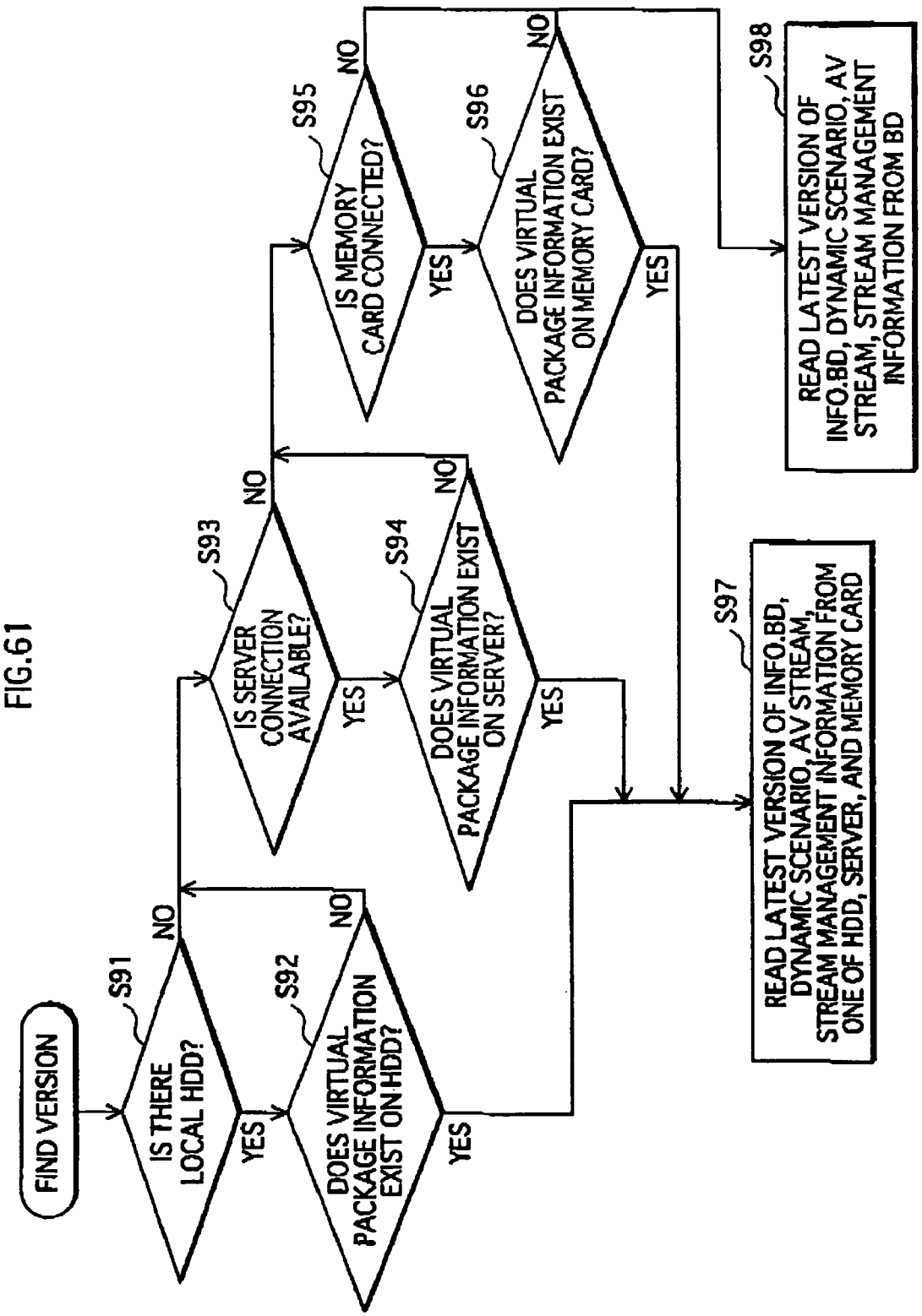
FIG. 61 is a flow chart that shows the processing procedure by the module manager 26 according to the eighth embodiment.

In the first embodiment, the update kit is stored in the local HD 12 in the playback apparatus. The eights embodiment is related to an improvement by which an update kit can be stored in various places such as in a semiconductor memory card, a home server, or the like. Since an update kit can be stored in various locations such as a semiconductor memory card, or a home server, the playback apparatus of the present embodiment searches for an update kit with the procedure shown in Steps S91 through S96 in FIG. 61, instead of the procedure shown in Steps S64 through S66 in FIG. 54 and in Steps S80 through S81 in FIG. 55B.

Step S8 in the flow chart is for reading an update kit from the local HD 12, a server, or a semiconductor memory card, Step S10 is for reading, in the case where no update kit exists, PL information, stream management information, and AV streams from the BD-ROM.

In order to search for a newest version, it is judged whether or not a local HD 12 is built in the playback apparatus. In the case where an HD is built in (Step S91), and virtual package information exists in the local HD 12 (Step S92: YES), an update kit is read in Step S97.

On the other hand, in the case where no virtual package information exists in the local RD 12, but the playback apparatus is able to have a connection with a server (Step S93), and virtual package information exists in the server (step S94), an update kit is read in Step S97, also.

Finally, in the case where no virtual package information exists in the HD 12 and in the home server, but the playback apparatus 200 is able to have a connection with a semiconductor memory card (Step S95), and virtual package information exists in the home server (Step s96), an update kit is read, also (Step S97).

In the case where no local HD 12 is built in, and the playback apparatus is not able to have a connection with a home server or a semiconductor memory card, PL information, stream management information, and AV streams are read from the BD-ROM (Step S98).

As explained above, according to the present embodiment, even if update kits dispersedly exist in various devices and media, a necessary update kit is taken out from one of the locations; therefore, in order to download an update kit, there is no need to fix the location at which an update kit is located. Accordingly, it is possible to more freely determine where an update kit should be located.

In the present embodiment, the processing is pursued in the order of the HD, a home server, and a semiconductor memory; however, it is possible to change the order. For example, it is acceptable to check for a server connection first, and a semiconductor memory card second, and then, lastly the HD.

Ninth Embodiment

Figure 62:
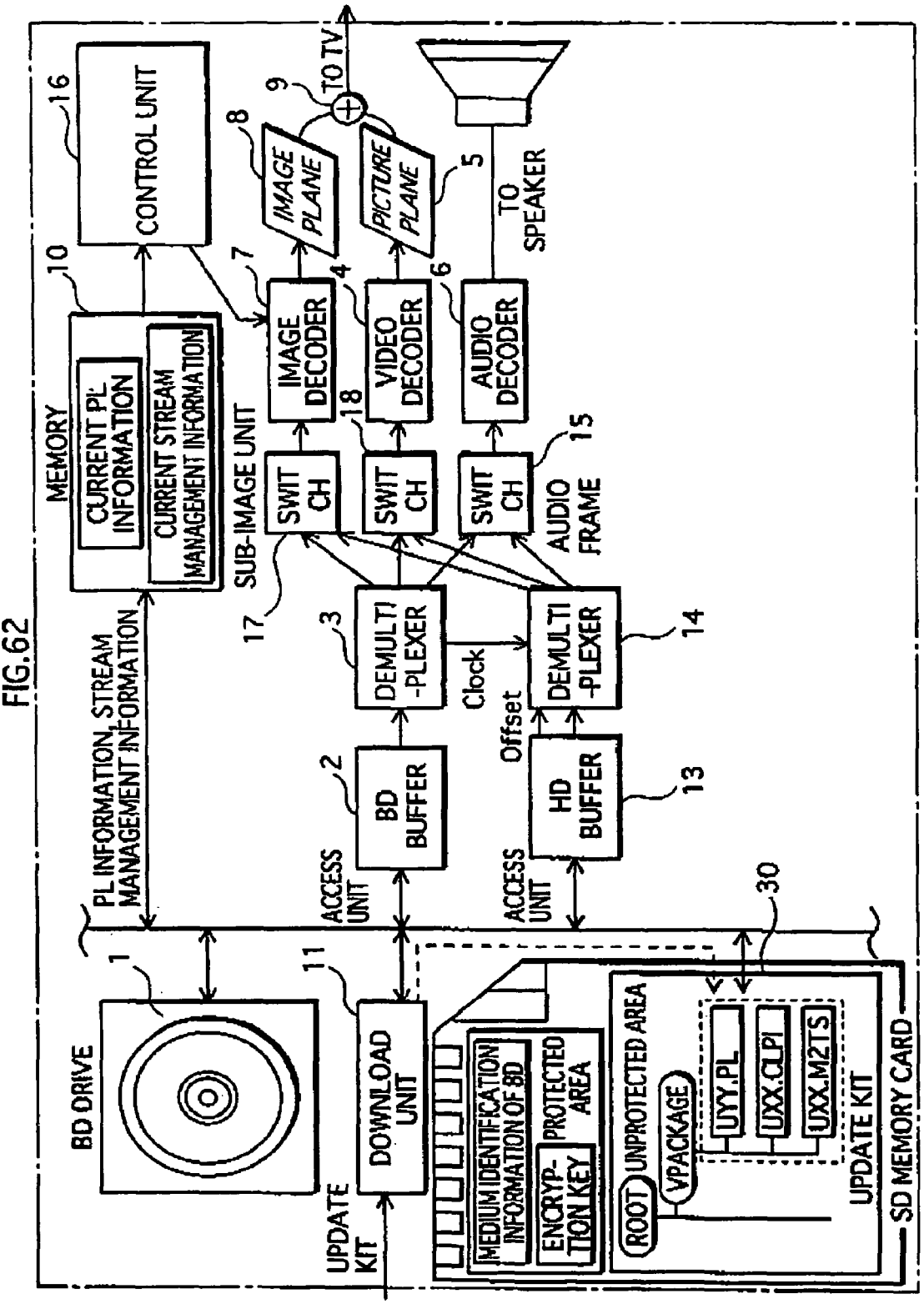
FIG. 62 shows the structure of the playback apparatus 200 according to the ninth embodiment.

In the first through seventh embodiments, an update kit is recorded into the HD. In contrast, the present embodiment is related to an improvement for writing an update kit into an SD memory card that has a secure area and an insecure area. FIG. 62 shows the structure of the playback apparatus 200 according to the present embodiment. The playback apparatus 200 in the drawing is different in that it has a built-in SD memory card 30. The playback apparatus of the present embodiment encrypts files constituting an update kit, writes them into the unprotected area of the SD memory card 30, and writes the encryption key into the protected area of the SD memory card 30. It is impossible to read the encryption key recorded in the protected area unless authenticity is confirmed through an authentication process with the SD memory card. With this arrangement, it is impossible to illegitimately copy the update kit. It is possible to read the update kit only when the update kit is used along with the BD-ROM.

In the ease where an update kit is stored in an SD memory card, the control unit 16 writes the medium identification information of the original BD-ROM that corresponds to the update kit into the protected area. With this arrangement, it is possible to bring the original BD-ROM and the SD memory card in correspondence with each other. In addition, when playback is performed thereafter, it is checked prior to the playback whether the SD memory card and the BD-ROM match each other. If they match each other, playback of the movie production is permitted. If they do not match, the playback apparatus 200 is prohibited from performing the playback.

With this arrangement, when an update kit exists, performing playback with only the BD-ROM is prohibited. That is to say, playback is performed always with a combination of the BD-ROM and the update kit.

As explained above, according to the present embodiment, since an update kit is encrypted and stored in an SD memory card along with the encryption key, it is possible to restrict illegitimate copies of update kits.

Additionally, if there arises some trouble with a BD-ROM package that was distributed in the past, an update kit to be sent later will be stored in an SD memory card so that playback is performed always with the combination of the SD memory card and the BD-ROM; therefore, it is possible to realize control so that troubles in the past do not come to the surface.

Supplementary Information

The invention has been so far described according to the embodiments; however, the description above merely presents examples of systems that are expected to achieve best effects in the present situation. The present invention may be embodied in modifications as long as it does not deviate from the main gist thereof. Examples of typical modified embodiments are shown below under (A), (B), (C), and so on.

Figure 63:
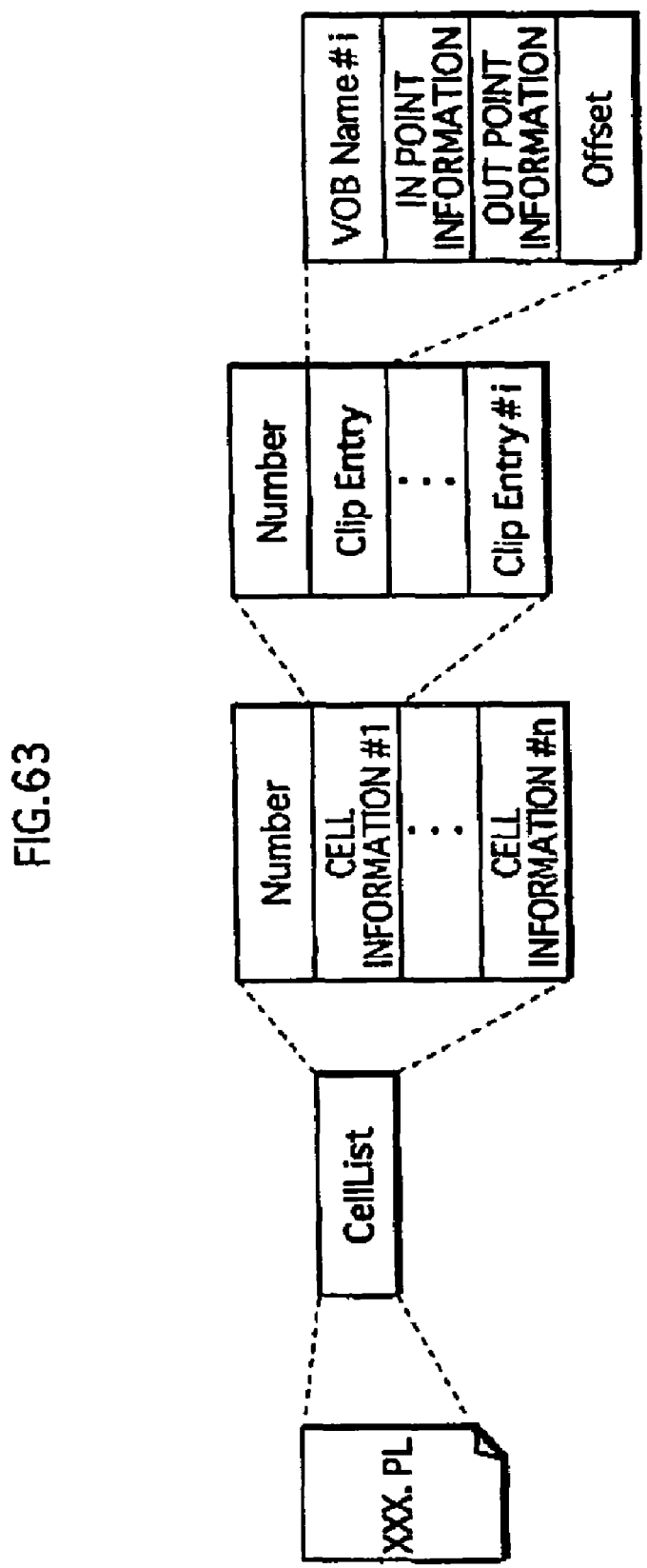
FIG. 63 shows a variation of PL information.

(A) PL information may be structured as shown in FIG. 63. To be more specific, Clip Entries in the PL information shown in FIG. 17 specify only AV streams recorded on the BD-ROM, while the Audio Entry specifies audio in the local HD 12. In contrast, the PL information shown in FIG. 63 includes two or more Clip Entries so that the second and/or later Clip Entries specify AV streams in the local HD 12.

(B) The BD buffer 2, the demultiplexer 3, the video decoder 4, the audio decoder 6, the HD buffer 13, the demultiplexer 14, and the switch 15 shown in FIG. 12 may be structured as shown in FIG. 64A and FIG. 64B. The buffer 71 and the buffer 72 temporarily store the ACCESS UNITs outputted from the BD buffer 2 and the HD buffer 13. The filter 73 combines the ACCESS UNITs that are temporarily stored in the buffer 71 and the buffer 72 into one stream. The demultiplexer 3 demultiplexes the combined stream so as to obtain a video stream and an audio stream and outputs them to the video decoder 4 and the audio decoder 6, respectively. Further, it is acceptable to have a structure as shown in FIG. 64B. Being separate from the audio decoder 6, an audio decoder 76 is provided for decoding the audio frames outputted from the HD buffer 13. A selector 75 selectively outputs one of (a) the results of decoding performed by the audio decoder 6 and (b) the results of decoding performed by the audio decoder 76.

The audio decoder 76 performs decoding processing by referring to a time obtained by adding an offset to a time stamp attached to a TS packet. With this arrangement wherein the audio decoder 76 is provided, the audio decoder 6 does not need to switch between whether or not the offset should be referred to.

(C) The arrangement wherein an update kit is provided from the WWW server 500 is a mere example. It is acceptable to have an arrangement wherein a BD-ROM or a DVD on which only an update kit is recorded is distributed to users so that the update kit can be taken from the BD-ROM or the DVD. It is also acceptable to have an arrangement wherein an update kit is distributed from the WWW server 500 to a KIOSK terminal so that the KIOSK terminal writes the update kit into a semiconductor memory card, and the update kit is taken into the playback apparatus via the semiconductor memory card.

(D) It is desirable to download data from the WWW server 500 according to a dynamic scenario in a Java mode or a Browser mode. A dynamic scenario in a Java mode or a Browser mode is written in a mark-up language such as the Java language, HTML, XML, or the like and recorded onto a BD-ROM. With this arrangement wherein download is performed with such video data, it is possible to prearrange programming so that an update kit is automatically downloaded when a predetermined time has arrived. It is also useful to prearrange programming so that download is performed at regular time intervals. It is acceptable to download an update kit in synchronization with playback of a PL. For example, it is acceptable to prearrange programming so that an update kit is downloaded during the playback period of movie trailers recorded on a BD-ROM.

(E) It is acceptable to have an arrangement wherein some pieces of data that are included only in a U.S. distribution version are sold, as update kits, to users who reside outside the U.S.A. A movie production to be distributed to a country other than the U.S.A. needs to have audio and/or subtitles in the native language (non-English) of the country multiplexed onto the AV stream. When the AV stream is generated, it is necessary to reserve a bandwidth for the sub-images and audio. It is often the case that, in order to reserve such a bandwidth, some data for interactive operations which is multiplexed onto an AV stream in a U.S. version is deleted from the AV stream in a version for other countries besides the U.S.A. For this reason, in the case where many users wish to have a U.S. version, distributing such data in the U.S. version to users in many other countries in the world as update kits makes it possible to meet the demands of the users.

(F) As to directory names the volume label is used as medium information of a BD-ROM so that a directory corresponding to the BD-ROM is generated in the local HD 12; however, it is acceptable to use other information as long as the information is related to the medium. It is acceptable to use a code being unique to the BD-ROM, such as medium identification information.

(G) It is acceptable to have an arrangement wherein a directory for each individual user is provided below directories corresponding to BD-ROMs so that dynamic scenarios, PL information, AV streams, and stream management information used by a particular user is stored in the directory for the user. Further, it is acceptable to have an arrangement wherein, when a user plays back a BD-ROM, an AV stream is played back with the use of the dynamic scenarios, PL information, AV streams, and stream management information that are in the directory assigned to the user. With this arrangement, it is possible to achieve control so that a PL is played back without a parental lock for a directory assigned to father in a family, while the PL is played back with a parental lock for a directory assigned to children in the family.

(H) The AV stream in an update kit according to the first embodiment includes only an audio stream for a single language, which is audio in the Japanese language; however, it is acceptable to have an arrangement wherein audio streams for a plurality of languages such as Japanese, Chinese, and Korean languages are recorded as an AV stream. In such a case, the update kit includes an AV stream on which the plurality of audio streams are multiplexed. The AV stream in an update kit according to the second embodiment includes only a sub-image stream for a single language, which is a subtitle in the Japanese language; however, it is acceptable to have an arrangement wherein sub-image streams for a plurality of languages such as Japanese, Chinese, and Korean languages are recorded as an AV stream. In such a case, the update kit includes an AV stream on which the plurality of sub-image streams are multiplexed.

Further, it is acceptable to have an arrangement wherein the download unit 11 downloads an update kit that includes an AV stream on which a sub-image stream and an audio stream are multiplexed.

(I) The download unit 11 may obtain an update kit via FTP through an FTP control connection and an FTP data connection as described below. The FTP control connection is established between a user PI (Protocol Interpreter) within the playback apparatus 200 and a user PI (Protocol Interpreter) within the WWW server 500, so that an FTP command and an FTP reply are transferred.

The FTP connection is established between a user DTP (Data Transfer Process) within the playback apparatus 200 and a user DTP (Data Transfer Process) within the WWW server 500, so that the update kit is transferred.

(J) In all of the embodiments, an optical disk to be played back by the playback apparatus is implemented as a BD-ROM, while a recording medium on which an update kit is recorded is implemented as an HD. However, the characteristics of the playback apparatus of the present invention are not dependent on the physical properties of a BD-ROM and an HD. Any form of recording media is applicable as long as it is possible to record an AV stream on the recording media. For example, optical disks Such as DVD-ROM, DVD-RAM, DVD-RW, DVD-R, DVD+RW, DVD+R, CD-R, CD-RW, and the like, and optical-magnetic disks such as PD, MO and the like are applicable. Semiconductor memory cards such as compact flash cards, Smart Media, Memory Sticks, MultiMedia Cards, and PCM-CIA Cards and the like are also applicable, as are (i) magnetic recording disks such as flexible disks, SuperDisk, Zip, Clik! and the like, and (ii) removable hard disk drives such as ORB, Jaz, SparQ, SyJet, EZFlyer, microdrive and the like. Furthermore, the recording medium may also be a built-in hard disk.

(K) Although the playback apparatuses in all of the embodiments output AV streams recorded on a BD-ROM to a TV after decoding them, the playback apparatus may be structured from only a ED-ROM drive, and the TV may be equipped with all of the other elements. In this case, the playback apparatus and the TV can be incorporated into a home network connected using IEEE1394. Also, although the playback apparatuses in the embodiments are of a type used after connecting to a television, integral display-playback apparatuses are also applicable. Furthermore, the playback apparatus may be only those parts of the playback apparatuses of the embodiments that perform essential parts of the processing. Because these playback apparatuses are all inventions disclosed in the specification of the present application, acts involving the manufacture of playback apparatuses based on an internal structure of the playback apparatuses shown in the embodiments are implementations of the inventions disclosed in the specification of the present application. Acts that involve transferring, whether onerous or gratuitous, (retail when cost is involved; a gift when no cost is involved), lending, or importing of playback apparatuses shown in the embodiments are also implementations of the present invention. Acts that involve approaching the general user about transfer, rental or the like by means of store front displays, catalogue solicitation, pamphlet distribution and the like are also implementations of these playback apparatuses.

(L) Because of the information processing by computer programs shown in FIGS. 19, 27, 36, 43, 54, 55, and 61 being realized specifically using hardware resources, computer programs showing the processing procedures in the flowcharts form an invention in their own right. Although all of the embodiments show embodiments that relate to the implementation of computer programs pertaining to the present invention in an incorporated form in the playback apparatuses, the computer programs shown in the embodiments may be implemented in their own right, separate from the playback apparatuses. The implementation of the computer programs in there own right includes acts that involve: (1) production of the programs, (2) transference of the programs, either onerous or gratuitous (3) lending of the programs, (4) importing of the programs, (5) providing the programs for the general public via bi-directional electronic communications circuits, and (6) approaching the general user about transfer, rental and the like by means of store front displays, catalogue solicitation, pamphlet distribution, and so forth.

(M) The "time" elements of the steps that are executed chronologically in the flow charts shown in FIGS. 19, 27, 36, 43, 54, 55, and 61 are considered to be requisite items with which the present invention is identified. Accordingly, it is understood that the processing procedures shown in these flow charts disclose usages of playback methods. Executing the processing shown in these flow charts by chronologically performing the processing in the steps so as to achieve the intended objects of the present invention and to have the functions and effects is implementations of the recording methods of the present invention.

(N) When being recorded on a BD-ROM, it is preferable that extension headers are provided for TS packets constituting an AV stream. The extension headers, which are called TP_extra_headers, include an "Arrival_Time_Stamp" and a "copy_permission_indicator", and have a 4-byte data length. TP_extra_header-attached TS packets (hereinafter, abbreviated to "EX-attached TS packet") are arranged into groups of 32 packets, and written into three sectors. Each group comprising 32 EX-attached TS packets is 6,144 bytes in length (=32×192), and matches the 6,144-byte size of three sectors (=2048×3). The grouping of 32 EX-attached TS packets contained in three sectors is referred to as an "Aligned Unit".

A playback apparatus 200 transmits Aligned Units in transmission processing as described below, when used in a home network connected via IEEE1394. That is, a device on the side of the sender removes the TP_extra_header from each of the 32 EX-attached TS packets included in an Aligned Unit, and outputs the TS packets after encoding the TS packet body based on a DTCP standard. When outputting TS packets, isochronous packets are inserted at various positions between TS packets. The positioning of isochronous packets is based on times shown in the Arrival_Time_Stamp in each TP_extra_header. The playback apparatus 200 outputs a DTCP_Descriptor when outputting the TS packets. The DTCP_Descriptor shows a copy permissibility setting in each TP_extra_header. Here, if the DTCP_Descriptor is described so as to show "copy prohibited", TS packets will not be recorded on other devices when used in a home network connected via IEEE1394.

(O) In the case where the playback apparatus 200 has a recording function onto a recordable optical disc (such as BD-RE, BD-R, or the like), it is acceptable to have an arrangement wherein a virtual package being made up of a BD-ROM package in a BD-ROM and one or more update kits is converted into a BD package, and then written onto a recordable optical disc.

In such a case, it is desirable that copying of an AV stream is executed based on copy generation information (CGI) embedded in the AV stream. Copy generation information may indicate "copy free" which means that the data is free to be duplicated, "one generation copy" which means that recording a duplication of one generation is permitted, "no more copy" which means that further duplication of a duplication is prohibited, or "never copy" which means that no duplication is permitted.

In the case where right management information is attached to an AV stream, it is acceptable to have an arrangement wherein copying of the AV stream is executed under the use conditions defined in the right management information.

If the right management information defines a condition under which copying is permitted with the number of times of copying, copying is permitted as long as the condition is satisfied. If the right management information defines a condition under which copying is permitted with a validity period (year, month, and date are defined), copying is permitted as long as the condition is satisfied.

(P) In the case where copying processing has variations such as "move", "migrate", or "check out", it is acceptable that copying is executed based on the use conditions defined for each of the variations. "Move" is a type of copying processing which includes deletion of contents of the copy source and is used when contents are moved between a plurality of recording media.

"Migrate" is a type of copying processing based on a premise that use condition information is generated in the copy destination recording medium.

"Check out" is a type of copying processing in which the number of times of copying is limited, and contents are copied after the number of times of copying is decremented by one. The difference between "copying with a limited number of times of copying" and "check out" is that for "check out", it is possible to increment the number of times of copying. The number of times of copying is incremented after a processing (called "check in") is performed to make it impossible to play back the contents copied and recorded on the recording medium.

(Q) The AV streams described in the embodiments may be VOBs (Video Objects) complying with a DVD-Video standard or a DVD-Video Recording standard, VOBs are program streams compliant with ISO/IEC13818-1 obtained by multiplexing video and audio streams. Also, in each embodiment, AV streams may be referred to as "AV Clips", and in which case the stream management information may be referred to as "Clip information". In addition, video streams in AV streams may be in MPEG-4 format, WMV format, or the like. Furthermore, audio streams may be in a Linear-PCM format, Dolby-AC3 format, MP3 format, or MPEG-AAC format.

The CELL information described in the embodiments specifies a starting point and an ending point of each playback section using time information; however, it is acceptable to specify a starting point and an ending point of each playback section using logical addresses in a BD-ROM. Further, each "CELL" described in the embodiments may be referred to as a "PlayItem".

(R) In the layer model shown in FIG. 44, it is acceptable to position the Browser mode and the Movie mode over the Java mode. The reason for this is that executing the Movie mode on the Java mode will not cause any problem since, especially, the load put on a playback apparatus by interpretation of a dynamic scenario in the Movie mode and execution of control procedure based on a dynamic scenario is light. Another reason is that, in the course of development of playback apparatuses and movie productions, it would be sufficient to guarantee operation in only one mode.

Further, it is acceptable to execute the processing in the Java mode with only the Java mode, without having the three modes. The reason is that it is not necessary to have the Movie mode particularly since, even in the Java mode, it is possible to have playback control in synchronization with playback of PLs. Furthermore, control with dynamic scenarios may be only in the Movie mode or only in the Browser mode.

(S) The "TMAP" in the stream management information may be referred to as an "EP_map". In such a case, it is desirable to express a playback starting time of an ACCESS UNIT with a time stamp (Presentation Time Stamp) on a piece of picture data positioned at the head of the ACCESS UNIT. In addition, it is desirable to express the address in an ACCESS UNIT as a serial packet number (SPN) of a PES packet.

(T) As for the configuration of the playback apparatus, it is described that only a current dynamic scenario is stored in the dynamic scenario memory 20 and that only current stream management information and current PL information are stored in the static scenario memory 10; however, it is acceptable to store in advance, like in a cache memory, a plurality of scenarios, pieces of stream management information, and pieces of PL information. With this arrangement, it is possible to shorten the time lag that may be experienced before these kinds of data are read from a BD-ROM.

(U) In order to continuously play back two or more CELLs that constitute a PL, it is desirable to process these CELLs so that these CELLs are connected with one another seamlessly. In order to process the CELLs to have seamless connection, duplicate portions of an ending portion of a preceding playback section and a starting portion of a following playback section in video data are generated in advance, and these duplicate portions are re-encoded. As additional information, it is acceptable to refer to the duplicate portions generated for the purpose of seamless connection as Bridge Clips.

Here, it is desirable to set the ending portion and the starting portion in the following manner.

In the preceding AV stream, ACCESS UNITs starting from an ACCESS UNIT that includes the Out point of the preceding playback section and up to the second ACCESS UNIT from the ACCESS UNIT is set as the ending portion. In the following CELL information #x+1, an ACCESS UNIT that includes the In point of the following playback section is set as the starting portion. The reason why the ending portion and the starting portion are set as above is described in the publication of the U.S. Pat. No. 6,148,140 which is the prior art by the same applicant. The publication may be referred to for the details.

Further, it is desirable to prepare seamless connection information for the duplicate portions generated for the purpose of seamless connection. The seamless connection information includes the playback starting time of the first video frame, the playback ending time of the last video frame, the starting time of an audio gap, the time length of the audio gap, and the position information of the audio gap. By defining such seamless connection information, it is possible to calculate a difference (STC-Offset) between the time stamps of the playback sections from the playback starting time of the first video frame and the playback ending time of the last video frame and set the time stamp difference in the playback apparatus. Further, it is possible to prevent audio interruption that may occur during a shift from one section to another by controlling the audio decoder with reference to the audio gap information.

(V) The movie productions described in the embodiments represent all productions that are expressed with images, such as television movies and game software. The reason for this is that the movie productions described in the embodiments (i) are expressed in such a manner so as to cause visual or audio-visual effects through, for example, displays with a cathode ray tube or liquid crystal displays, and (ii) exist while maintaining their identity by somehow uniting themselves with a corporeal thing i.e. a BD-ROM, and (iii) are put in the state where they are reproducible; therefore, the requirements for existence forms of movie reproductions are satisfied.

However, the substantial elements of the present invention are not limited to the fact that the data represents a movie production; therefore, the video data in the present invention may be images in a security monitor camera or images in a home-use video camera.

(W) In the embodiments, a user operation is received through a remote controller; however, it is acceptable to receive a user operation through a front panel of a playback apparatus. It is acceptable to receive designation by a user through an input device such as a keyboard, a touch panel, a mouse, a pad, a track ball, or the like. In such cases, it is acceptable to receive user operations represented as clicks and drags.

(X) The movie productions described in the embodiments may be obtained by encoding analog image signals broadcasted by analog broadcast. The movie productions may be of stream data constituted with transport streams broadcasted by digital broadcast.

Contents may be obtained by encoding analog/digital image signals recorded on a videotape. Further, contents may be obtained by encoding analog/digital image signals taken directly from a video camera. Besides, the present invention is applicable to digital work distributed from a distribution server.

(Y) The Java module 24 may be a Java platform incorporated into a device for the purposes of receiving satellite broadcast. In the case where the Java module 24 is such a Java platform, the playback apparatus of the present invention also serves in the processing by an MHP-oriented STB.

Further, the Java module 24 may be a Java platform incorporated into a device for the purposes of controlling the processing of a mobile phone. In the case where the Java module 24 is such a Java platform, the playback apparatus of the present invention also serves in the processing by a mobile phone.

Furthermore, the Browser module 25 may be browser software that is of a type to be incorporated into a personal computer, such as Internet Explorer by Microsoft.

(Z) It should be noted that it is desirable to transmit an update kit with the use of SSL (Secure Socket Layer). A WWW server 500 being compatible with SSL has a digital certificate pre-installed, and transmits a digital certificate to the playback apparatus 200 when having received an SSL request from the playback apparatus 200. In the digital certificate, a public key is encrypted, and the playback apparatus 200 authenticates the certificate. As a result of the authentication, if a proper public key is obtained, it is judged that the WWW server 500 is reliable. Then, the playback apparatus 200 transmits a common key that is encrypted with the public key. The WWW server 500 decrypts, with a secret key, the encrypted common key having been transmitted and shares the common key with the playback apparatus 200. The update kit is transmitted and received with the use of the common key that is shared in this manner. A common key is used for the transmission and reception of the update kit so that the encryption processing can be performed at a high speed. As additional information, HTTP, mail, FTP, and Telnet are applicable to the transmission and reception of the data. Here, it is also acceptable to describe such processing by the playback apparatus 200 with a dynamic scenario in a Java mode or a dynamic scenario in a Browser mode so as to supply it on a BD-ROM.

It is preferable that accounting settlement for distribution of an update kit is performed on a premise of having electronic commercial transactions. In such a case, merchant software is incorporated into the WWW server 500, and wallet software is incorporated into the playback apparatus 200. Also, the network shown in FIG. 1 is connected to a payment gateway provided at a banking institution. Credit card settlements are realized by using SET (Secure Electronic Transactions) in such a network. The playback apparatus 200 transmits order information to the server 500 and also transmits accounting settlement information to the payment gateway. When having received the order information, the server 500 transmits an update kit to the playback apparatus 200. Since the order information and the accounting settlement information are transmitted separately, it is possible to enhance the security level of the settlement. It is also acceptable to describe such processing by the playback apparatus 200 with a dynamic scenario in a Java mode or a dynamic scenario in a Browser mode so as to supply it on a BD-ROM.

It is acceptable to develop a movie production into an on-line game by adding an update kit including a dynamic scenario to the movie production recorded on a BD-ROM. The dynamic scenario included in an update kit not only has a PL played back but also obtains data from a WEB site and has CG rendered.

Such a game has world-wide expansion via the Internet unlike a closed space of a BD-ROM and is able to have users entertained for a long period to come.

REFERENCE NUMBERS

1: BD Drive
2: BD buffer
3: Demultiplexer
4: Video Decoder
5: Picture Plane
6: Audio Decoder
7: Image Decoder
8: Image Plane
9: Adder
10: Static Scenario memory
11: Download Unit
13: HD buffer
14: Demultiplexer
15: Switch
15: Video Plane
16: Control Unit
17: Switch
18: Switch
19: Streaming Buffer
20: Dynamic Scenario Memory
21: Playback Control Engine
23: DVD-like Module
24: Java Module
25: Browser Module
26: Module Manager
30: SD Memory Card
200: Playback Apparatus
300: Television
400: Remote Controller
500: WWW Server
600: Home Server

INDUSTRIAL APPLICABILITY

The playback apparatus of the present invention performs the playback processing for a virtual package in which an update kit is added to what is recorded on an optical disc, and effectively enhances the added value to the optical disc; therefore, it is possible to supply movie discs to markets more intensely, and to energize the movie market and the markets for commercial-off-the-shelf devices. Accordingly, the playback apparatus of the present invention has high applicability in movie industries and the industries of commercial-off-the-shelf devices.

The invention claimed is:

1. A recording method for recording a first digital stream and first playlist information on a recording medium having a package area using a computer-based recording apparatus, wherein
   identifying the package area by a predetermined file path;
   generating, with a generating unit, the predetermined file path to contain disc identification information, the disc identification information indicates, to a playback apparatus, a read-only optical disc to be used in combination with the package area by the playback apparatus to generate a virtual package; and
   providing, in the first playlist information that identifies by showing correspondence between a file in the package area and a file on the optical disc, a second digital stream that is recorded on the optical disk and is to be played back in synchronization with the first digital stream, wherein
   the first playlist information includes information defining a playback path comprising a playback section of the first digital stream and a playback section of the second digital stream, and
   the first playlist information is used in place of second playlist information recorded on the optical disc, by the playback apparatus to generate the virtual package, wherein the virtual package is generated by replacing a file included in the optical disc with a corresponding file that is (i) contained in the package area and (ii) accessed by a same file name as that used to access the corresponding file included in the optical disc.

2. The recording method according to claim 1, wherein
   the playback path information included in the first playlist information indicating a starting point and an ending point of the playback section in the first digital stream in correspondence with a starting point and an ending point of the playback section in the second digital stream.

3. The recording method according to claim 2, wherein
   the package area includes a program recorded therein, and the program shows a procedure for playback control using the second playlist information recorded on the optical disc or the first playlist information recorded in the package area.

4. The recording method according to claim 1, wherein
the playback path information included in the first playlist information indicating a starting point and an ending point of the playback section in the first digital stream in correspondence with a starting point and an ending point of the playback section in the second digital stream.

5. The recording method according to claim 1, wherein the second digital stream includes video data and audio data and the first digital stream includes audio data.

6. The recording method according to claim 1, wherein the second digital stream includes video data and sub-image data, and the first digital stream includes sub-image data.

7. The recording method according to claim 1, wherein the second digital stream includes video data and audio data and the first digital stream includes audio data.

8. The recording method according to claim 1, wherein the second digital stream includes video data and sub-image data, and the first digital stream includes sub-image data.

9. The recording method according to claim 1, wherein the first digital stream, the second digital stream, the first playlist information, the second playlist information are each contained in a file recorded in the package area, and the files containing the first digital stream and the first playlist information are each accessed by a file path containing a file name not included in a file layout of the optical disc.

10. A playback apparatus for playback of a first digital stream and a second digital stream in synchronization, the playback apparatus comprising:
a mounting unit operable to mount an optical disc to the playback apparatus;
a secondary recording medium that is used in combination with the optical disc;
a generating unit operable to generate a package area on the secondary recording medium in such a manner that the package area is specified by a file path containing disc identification information that identifies the mounted optical disc;
a downloading unit operable to download, from a network server into the package area, an update kit used to upgrade the optical disc;
a reading unit; and
a playback unit, wherein
the first digital stream is recorded in the optical disc with first playlist information,
the update kit includes the second digital stream and second playlist information,
the second playlist information (i) shows correspondence between a file containing the first digital stream on the optical disc and a file containing the second digital stream in the package area, and (ii) includes information defining a playback path comprising a playback section of the first digital stream and a playback section of the second digital stream,
the second playlist information is used, in place of the first playlist information, to create a virtual package,
the reading unit is operable to read, based on the second playlist information included in the update kit, the first digital stream from the optical disc and the second digital stream from the package area, and
the playback unit is operable to execute, with reference to a time stamp attached to data contained in the first digital stream and a time stamp attached to data contained in the second digital stream, playback of the respective pieces of data in synchronization, wherein
the upgrading of the optical disc is to perform file replacement to the file layout of the optical disc,
the file replacement is to replace a file included in the file layout with a corresponding file that is (i) contained in the package area and (ii) accessed by a same file name as that used to access the corresponding file included in the file layout.

11. The playback apparatus according to claim 10,
wherein the second playlist information shows (i) correspondence between files in the package area and files on the optical disc and (ii) a stream identifier identifying one of elementary streams multiplexed into the second digital stream,
the playback unit includes:
a first demultiplexer operable to demultiplex a part of the first digital stream to obtain a video stream; and
a second demultiplexer operable to demultiplex a part of the second digital stream read by the reading unit to separate the elementary stream identified by the stream identifier shown by the second playlist information,
the synchronous playback by the playback unit is performed with reference to a time stamp attached to data included in the video stream and a time stamp attached to data included in the elementary stream separated from the second digital stream.

12. The playback apparatus according to claim 10, wherein the second playlist information shows (i) correspondence between files in the package area and files on the optical disc and (ii) a stream identifier identifying one of elementary streams multiplexed into the second digital stream,
the playback unit includes:
a first demultiplexer operable to demultiplex a part of the first digital stream to obtain a video stream; and
a second demultiplexer operable to demultiplex a part of the second digital stream read by the reading unit to separate the elementary stream identified by the stream identifier shown by the second playlist information,
the synchronous playback by the playback unit is performed with reference to a time stamp attached to data included in the video stream and a time stamp attached to data included in the elementary stream separated from the second digital stream.

13. A playback method by a playback apparatus for playback of a first digital stream and a second digital stream in synchronization by a computer having an optical disc mounted thereto and a secondary recording medium used in combination with the optical disc, the playback method comprising the steps of
generating a package area on the secondary recording medium in such a manner that the package area is specified by a file path containing disc identification information that identifies the mounted optical disc;
downloading, from a network server into the package area, as update kit used to upgrade the optical disc;
reading, and
playing back, wherein
the first digital stream is recorded on the optical disc with first playlist information,
the update kit includes the second digital stream and second playlist information,
the second playlist information (i) shows correspondence between a file containing the first digital stream on the optical disc and a file containing the second digital stream in the package area, and (ii) includes information defining a playback path comprising a playback section of the first digital stream and a playback section of the second digital stream,
the second playlist information is used, in place of the first playlist information, to generate a virtual package, in the reading step, the first digital stream is read from the optical disc and the second digital stream is read from the package area both based on the second playlist information included in the update kit, and in the playback step, with reference to a time stamp attached to data included in the first digital stream and a time stamp attached to data included in the second digital stream, the respective pieces of data are played back in synchronization, wherein the upgrading of the optical disc is to perform file replacement to the file layout of the optical disc, the file replacement is to replace a file included in the file layout with a corresponding file that is (i) contained in the package area and (ii) accessed by a same file name as that used to access the corresponding file included in the file layout.

* * * * *

UNITED STATES PATENT AND TRADEMARK OFFICE
CERTIFICATE OF CORRECTION

| | | |
|---|---|---|
| PATENT NO. | : 7,639,923 B2 | Page 1 of 1 |
| APPLICATION NO. | : 10/528969 | |
| DATED | : December 29, 2009 | |
| INVENTOR(S) | : Wataru Ikeda et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 498 days.

Delete the phrase "by 498 days" and insert -- by 688 days --

On the Title Page, Related U.S. Application Data:
Please add the following Item:
  (60) Provisional application No. 60/413,153 filed on September 25, 2002.

Column 54, line 46 (Claim 13): "the steps of" should read -- the steps of: --

Signed and Sealed this

Twenty-fourth Day of August, 2010

David J. Kappos
*Director of the United States Patent and Trademark Office*